(12) United States Patent
Wang et al.

(10) Patent No.: US 11,274,380 B2
(45) Date of Patent: Mar. 15, 2022

(54) NOZZLE PLATE FOR FIBER FORMATION

(71) Applicant: 4C Air, Inc., Sunnyvale, CA (US)

(72) Inventors: Qiqi Wang, Santa Clara, CA (US); Lei Liao, Sunnyvale, CA (US); Baoqiong Guan, Shanghai (CN)

(73) Assignee: 4C Air, Inc., Sunnyvale, CA (US)

( * ) Notice: Subject to any disclaimer, the term of this patent is extended or adjusted under 35 U.S.C. 154(b) by 631 days.

(21) Appl. No.: 16/096,626

(22) PCT Filed: Aug. 30, 2018

(86) PCT No.: PCT/CN2018/103320
§ 371 (c)(1),
(2) Date: Oct. 25, 2018

(87) PCT Pub. No.: WO2019/047768
PCT Pub. Date: Mar. 14, 2019

(65) Prior Publication Data
US 2021/0230773 A1    Jul. 29, 2021

(30) Foreign Application Priority Data
Sep. 5, 2017 (WO) ................ PCT/CN2017/100445

(51) Int. Cl.
*D01D 4/02* (2006.01)
*D01D 5/00* (2006.01)
(Continued)

(52) U.S. Cl.
CPC ........... *D01D 5/0069* (2013.01); *B29C 48/05* (2019.02); *B29C 48/2566* (2019.02);
(Continued)

(58) Field of Classification Search
CPC ................ B29C 48/05; B29C 48/2566; B29C 48/25686; B29C 48/302; D01D 4/02; D01D 4/027; D01D 4/06; D01D 5/08
(Continued)

(56) References Cited

U.S. PATENT DOCUMENTS

| 5,945,054 A | * | 8/1999 | Meerman | ................ | D01D 4/02 264/184 |
| 2016/0083868 A1 | | 3/2016 | Park | | |

FOREIGN PATENT DOCUMENTS

| CN | 101812734 A | 8/2010 |
| CN | 102206878 A | 10/2011 |

(Continued)

OTHER PUBLICATIONS

Anonymous, "Spinning Pack Modification", Research Disclosure, Kenneth Mason Publications, Hampshire, UK, GB, No. 331, Nov. 1, 1991, p. 832.
(Continued)

*Primary Examiner* — Leo B Tentoni
(74) *Attorney, Agent, or Firm* — Sheppard Mullin Richter & Hampton LLP

(57) ABSTRACT

Disclosed herein are customizable kits of parts for the fabrication of polymer fibers. In some embodiments, the kits provided herein comprise a scaffold comprising first and second opposite surfaces and one or more pores extending through the first and second surfaces, wherein each pore comprises a first channel and a first conjunction interface. The kits additionally comprise a plurality of nozzles, wherein each nozzle comprises a second channel and a second conjunction interface, and wherein the second interface can be removably and stably coupled to the first conjunction interface of each pore while allowing a fluid through the first channel and the second channel. The kits further comprise a plurality of closure structures, wherein
(Continued)

each closure structure comprises a third conjunction interface, and wherein the third interface can be removably and stably coupled to the first conjunction interface of each pore to seal the pore. In some embodiments, at least the second channel of each nozzle has an internal diameter configured to allow formation of a fiber.

11 Claims, 32 Drawing Sheets

(51) Int. Cl.
  *D01D 4/06* (2006.01)
  *D01D 5/08* (2006.01)
  *B29C 48/05* (2019.01)
  *B29C 48/25* (2019.01)
  *B29C 48/30* (2019.01)
  *D04H 1/728* (2012.01)

(52) U.S. Cl.
  CPC ...... *B29C 48/25686* (2019.02); *B29C 48/302* (2019.02); *D01D 4/027* (2013.01); *D01D 4/06* (2013.01); *D01D 5/08* (2013.01); *D01D 5/003* (2013.01); *D04H 1/728* (2013.01)

(58) Field of Classification Search
  USPC .......... 264/176.1; 425/191, 192 S, 463, 464, 425/466
  See application file for complete search history.

(56) References Cited

FOREIGN PATENT DOCUMENTS

| | | |
|---|---|---|
| CN | 105088366 A | 11/2015 |
| EP | 2987894 A1 | 2/2016 |
| EP | 307587 A1 | 10/2016 |
| JP | 20070303031 A | 11/2007 |
| WO | 20160170493 A1 | 10/2016 |

OTHER PUBLICATIONS

Extended European Search Report for EP Application 18854881.2 dated Apr. 22, 2021, 9 pages.
International Search Report and Written Opinion of PCT/CN2018/103320 dated Nov. 29, 2018 (11 pages).

* cited by examiner

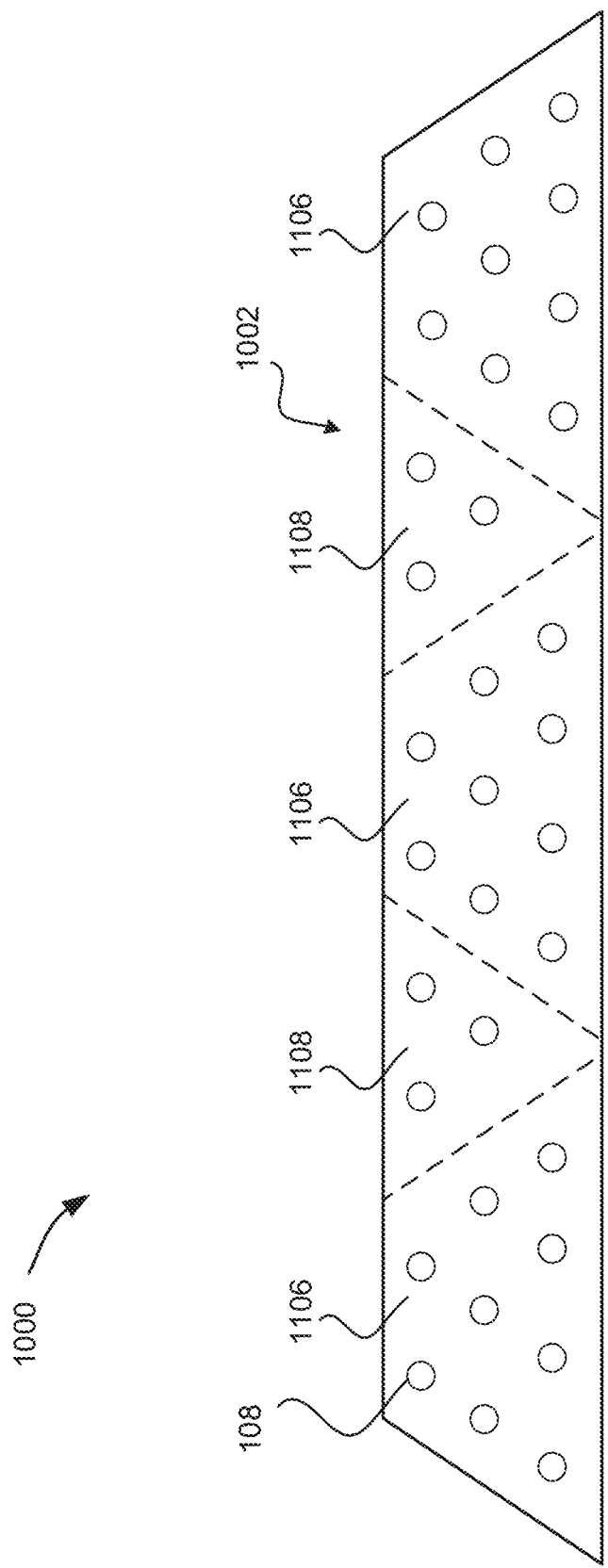

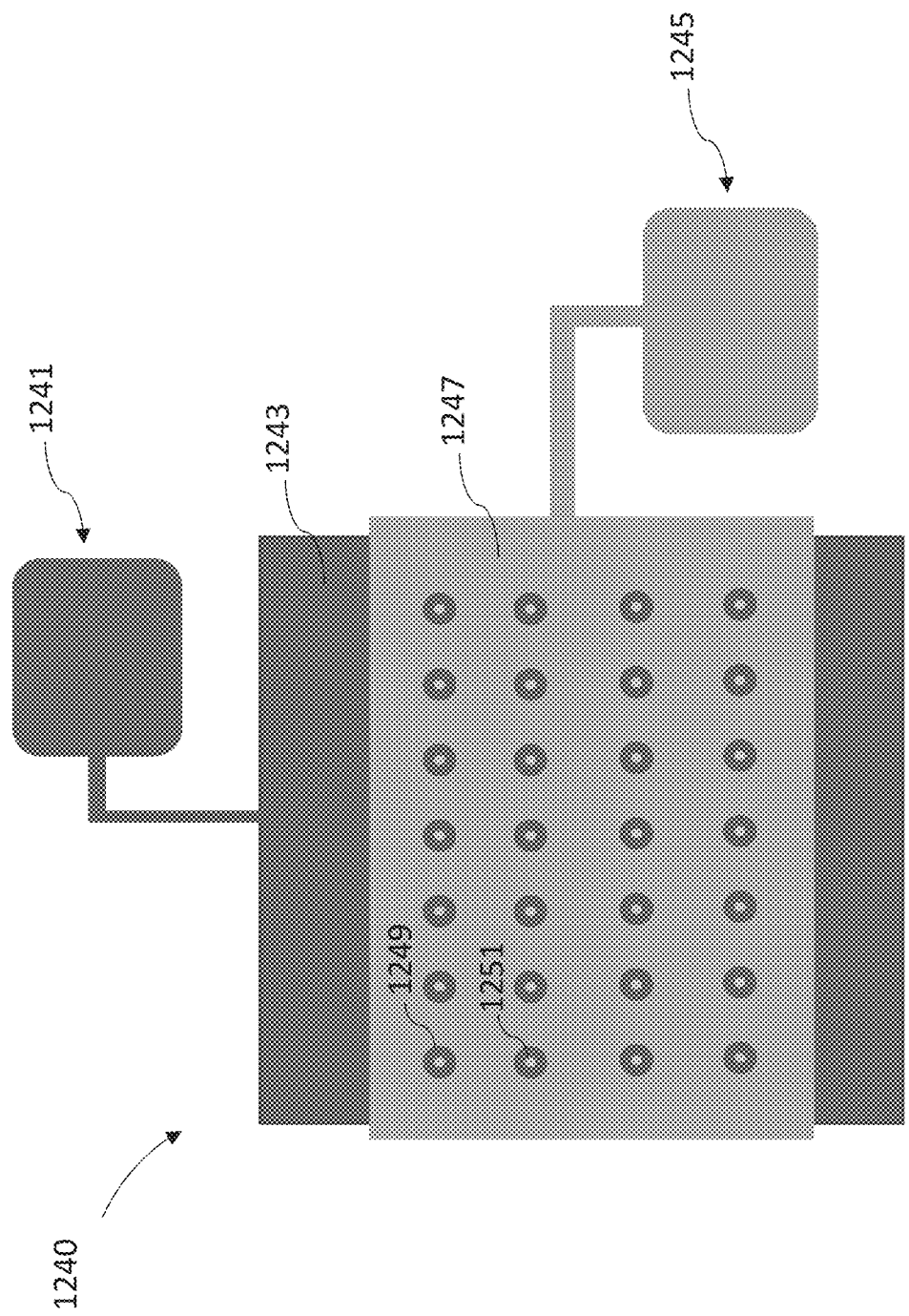

NOZZLE PLATE FOR FIBER FORMATION

CROSS REFERENCE TO RELATED APPLICATION

This application is a U.S. National Stage Application under 35 U.S.C. § 371 of International Application No. PCT/CN2018/103320, filed Aug. 30, 2018, which application claims the benefit of International Application No. PCT/CN2017/100445, filed Sep. 5, 2017, the contents of each of which are hereby incorporated by reference in their entirety to the present disclosure.

BACKGROUND

Fiber spinning devices are used to extrude a fluid, e.g., a polymer solution or polymer melt, to form a fiber. Such devices typically include a reservoir operatively coupled to a plate comprising a plurality of spinnerets, where the reservoir contains the fluid to be extruded. Streams of the viscous fluid exit via the spinnerets of the plate into air or a liquid, thereby leading to a phase inversion which allows the fluid to solidify into fiber form. Fiber spinning devices may also include a collection means (e.g., a bath, platform, etc.) to collect the formed fibers.

Fibers, e.g., polymer fibers, are used in a variety of diverse applications. For instance, polymer assemblies or webs are used in filters, medical and protective garments, insulation, ceiling tiles, battery separator media, tissue engineering scaffolds, etc. Accordingly, it is often necessary and/or desirable to be able to finely tune the characteristics and attributes associated with the fibers. There is thus a need in the art for a general and customizable fiber spinning device for highly tunable fiber formation.

SUMMARY

The present disclosure provides unique and customizable systems, devices, and kits for the fabrication of fibers.

Accordingly, in one embodiment, provided herein is a kit of parts comprising a scaffold comprising first and second opposite surfaces and one or more pores extending through the first and second surfaces, wherein each pore comprises a first channel and a first conjunction interface. The kit of parts additionally comprises a plurality of nozzles, wherein each nozzle comprises a second channel and a second conjunction interface, and wherein the second interface can be removably and stably coupled to the first conjunction interface of each pore, while allowing a fluid through the first channel and the second channel. The kit further comprises a plurality of closure structures, wherein each closure structure comprises a third conjunction interface, and wherein the third interface can be removably and stably coupled to the first conjunction interface of each pore, thereby sealing the pore. In some embodiments, at least the second channel of each nozzle has an internal diameter configured to allow formation of a fiber.

In some embodiments, the scaffold comprises one or more sections, each of which comprises at least one of the pores.

In some embodiments, the scaffold comprises at least one section comprising no pores.

In some embodiments, each section of the scaffold independently has a shape selected from a rectangle, a triangle, a parallelogram, an echelon, a hexagon, an octagon, and an irregular shape.

In some embodiments, each section of the scaffold is an independent plate.

In some embodiments, each pore of the scaffold comprises a removable connector comprising the first conjunction interface. In some embodiments, at least part of the removable connector of each pore extends beyond (e.g., protrudes below) the second surface of the scaffold. For instance, the removable connector may comprise a first region having an upper surface and a lower surface, where the lower surface of said first region is positioned a certain distance below/lower than the second surface of the nozzle plate, and the upper surface of said first region is positioned above/higher than the second surface of the nozzle plate. In some embodiments, the first conjunction interface is located within the first region of the removable connector.

In some embodiments, the first conjunction interface of each pore comprises a male or a female threaded fitting, a Luer Taper fitting, a ground joint, a male or female national pipe thread (NPT) fitting, or a male or female push-in connector, and the second and the third conjunction interface of each nozzle and closure structure, respectively, comprise a corresponding female or male threaded fitting, a Luer Taper fitting, a ground joint, a corresponding female or male NPT fitting, or a corresponding female or male push-in connector.

In some embodiments, an average distance between adjacent pores of the scaffold is at least 100 micrometers.

In some embodiments, at least one of the first channel of each pore and the second channel of each nozzle has an internal diameter less than 3 centimeters.

Also provided herein, in one embodiment, is a system comprising a scaffold comprising first and second opposite surfaces and a plurality of pores extending through the first and second surfaces, wherein each pore comprises a first channel and a first conjunction interface. The system additionally comprises a plurality of nozzles, wherein each nozzle comprises a second channel and a second conjunction interface, and wherein the second interfaces are removably and stably coupled to the first conjunction interfaces of a portion of the pores, while allowing a fluid through the first channel and the second channel. The system further comprises a plurality of closure structures, wherein each closure structure comprises a third conjunction interface, and wherein the third interfaces are removably and stably coupled to the first conjunction interface of the remaining pores and thereby sealing the remaining pores. In some embodiments, at least the second channel of each nozzle has an internal diameter configured to allow formation of a fiber.

Additionally provided herein, in one embodiment, is an apparatus, comprising: a scaffold comprising first and second opposite surfaces, the first surface in fluidic communication with at least one source of a polymer material; and a plurality of pores extending through the scaffold from the first surface to the second surface and configured to transport the polymer material, wherein each pore comprises a conjunction system individually/independently configured to permit or prevent extrusion of the polymer material therefrom.

In some embodiments, the scaffold comprises one or more sections, each of which comprises one or more of the pores.

In some embodiments, the scaffold comprises at least one section comprising no pores.

In some embodiments, each section of the scaffold independently has a shape selected from a rectangle, a triangle, a parallelogram, an echelon, a hexagon, an octagon, and an irregular shape.

In some embodiments, the scaffold comprises at least two sections having different shapes as one another.

In some embodiments, each section of the scaffold is an independent plate.

In some embodiments, in at least one of the sections of the scaffold comprising pores, said pores are arranged according to a predetermined pattern. In some embodiments, the pattern is selected from a rectangle, a triangle, a parallelogram, an echelon, a hexagon, an octagon, and combinations thereof.

In some embodiments, in at least one of the sections of the scaffold comprising pores, said pores are arranged according to a random pattern.

In some embodiments, each pore of the scaffold independently comprises a transverse cross-sectional shape selected from a circle, a rectangle, a triangle, a parallelogram, an echelon, a hexagon, an octagon, and an irregular shape.

In some embodiments, one or more of the pores of the scaffold may have a first cross-sectional shape near or at the first surface of the nozzle plate, and a second cross-sectional shape near or at the second surface of the nozzle plate. In some embodiments, the first cross-sectional shape is different than the second cross-sectional shape. In some embodiments, the first and second cross-sectional shapes are each independently selected from a circle, a rectangle, a triangle, a parallelogram, an echelon, a hexagon, an octagon, and an irregular shape.

In some embodiments, each conjunction system independently comprises a selectable on and off configuration, wherein the on configuration permits extrusion of the polymer material from the conjunction system and the off configuration prevents said extrusion.

In some embodiments, each conjunction system of a pore in the on configuration comprises at least one removable nozzle, the at least one removable nozzle comprising an channel having an input end configured to receive the polymer material and an output end from which the polymer material is extruded. In some embodiments, a width of the channel is uniform from the input end to the output end. In some embodiments, a width of the channel increases from the input end to the output end. In some embodiments, a width of the channel decreases from the input end to the output end.

In some embodiments, at least one conjunction system in the on configuration comprises a fitting to which the at least one removable nozzle is coupled. In some embodiments, the fitting is a threaded fitting, a Luer Taper, a ground joint, a national pipe thread (NPT) fitting, or a push-in connector.

In some embodiments, at least one conjunction system in the on configuration comprises the at least one removable nozzle directly coupled to at least a portion of its respective pore.

In some embodiments, the conjunction system of at least one of the pores of the scaffold is in the on configuration.

In some embodiments, the conjunction system of a majority of the pores of the scaffold is in the on configuration.

In some embodiments, the conjunction system of each of the pores of the scaffold is in the on configuration.

In some embodiments, each conjunction system in the off configuration comprises a removable closure structure configured to seal its respective pore.

In some embodiments, at least one conjunction system in the off configuration comprises a fitting to which the removable closure structure is coupled. In some embodiments, the fitting is a threaded fitting, a Luer Taper, a ground joint, a national pipe thread (NPT) fitting, or a push-in connector.

In some embodiments, at least one conjunction system in the off configuration comprises the removable closure structure directly coupled to its respective pore.

In some embodiments, the conjunction system of at least one of the pores of the scaffold is in the off configuration.

In some embodiments, the conjunction system of a majority of the pores of the scaffold is in the off configuration.

In some embodiments, the conjunction system of each of the pores of the scaffold is in the off configuration.

In some embodiments, an average distance between adjacent pores in the scaffold is at least 100 micrometers.

Further provided herein, in one embodiment, is a method, comprising contacting a first surface of a scaffold with at least one source of a polymeric material, wherein the scaffold comprises a second surface opposite the first surface and plurality of pores extending through the first and second surfaces. Each pore comprises a first channel, and a first conjunction interface configured to couple with a second conjunction interface of a removable nozzle or a third conjunction interface of a removable closure structure. The method additionally comprises coupling the first conjunction interfaces of a portion of the pores to the second conjunction interfaces of a plurality of removable nozzles. Each removable nozzle comprises a second channel in fluidic communication with the first channel of the pore to which it is coupled, wherein at least the second channels of the nozzles have an internal diameter configured to allow formation of a fiber from the polymeric material. The method also comprises coupling the first conjunction interfaces of any remaining pores with the third conjunction interfaces of a plurality of removable closure structures, wherein each removable closure structure is configured to seal the pore to which it is coupled; and extruding the polymeric material from the second channels of the removable nozzles to form the fibers.

In some embodiments, each pore comprises a removable connector comprising the first conjunction interface. In some embodiments, at least a portion of the removable connector of each pore extends beyond (e.g., protrudes below) the second surface of the scaffold. For instance, the first conjunction interface may comprise a first region having an upper surface and a lower surface, where the lower surface of said first region is positioned a certain distance below/lower than the second surface of the nozzle plate and the upper surface of said first region is positioned above/higher than the second surface of the nozzle plate. In some embodiments, the first conjunction interface is located within the first region of the removable connector.

In some embodiments, the first conjunction interfaces of each pore comprise a male or female threaded fitting, a Luer Taper fitting, a ground joint, a male or female national pipe thread (NPT) fitting, or a male or female push-in connector, and the second and third conjunction interfaces of each nozzle and closure structure, respectively, comprise a corresponding female or male threaded fitting, a Luer Taper fitting, a ground joint, a corresponding female or male NPT fitting, or a corresponding female or male push-in connector.

In some embodiments, an average distance between adjacent pores is at least 100 micrometers.

In some embodiments, the scaffold comprises one or more sections each independently comprising a shape selected from a rectangle, a triangle, a parallelogram, an echelon, a hexagon, an octagon, and an irregular shape.

In some embodiments, at least one of the sections comprises one or more of the pores.

In some embodiments, at least one of the sections comprise no pores.

In some embodiments, each section is an independent plate.

Another embodiment of the present disclosure provides a bi-channel electrospinning nozzle, comprising a core unit and a shell unit, wherein: the core unit comprises: a shell cover having a base and a peripheral wall around the base, wherein the base has an opening; a magnetic plate disposed on the bottom of the base of the shell cover, wherein the magnetic plate has an opening at least partially overlapping with the opening of the base of the shell cover; a core polymer reservoir disposed over the base and within the peripheral wall of the shell cover, wherein the core polymer reservoir is connected to a core channel cover going through the openings of the base of the shell cover and the magnetic plate, and wherein the core channel cover encloses a core channel configured to allow a core polymer fluid in the core polymer reservoir to flow into a proximal end of the core channel and be ejected at a distal end of the core channel; wherein the shell cover, the magnetic plate and the core polymer reservoir form a shell polymer reservoir, and the shell unit comprises a top portion and a shell channel cover enclosing a shell channel, wherein the top portion comprises a material for magnetically and removably attached to the magnetic plate while allowing the core channel cover to go through the shell channel. In some embodiments, the shell cover, the magnetic plate and the core polymer reservoir are secured together with one or more screws.

Another embodiment provides a bi-channel electrospinning nozzle, comprising a core unit and a shell unit, wherein: the core unit comprises a core polymer reservoir connected to a core channel cover that encloses a core channel configured to allow a core polymer fluid in the core polymer reservoir to flow into a proximal end of the core channel and be ejected at a distal end of the core channel, and the shell unit comprises: a shell cover having a base and a top portion, wherein the top portion has an opening and the shell cover encloses a shell channel; and an attachment plate disposed above the top portion of the shell cover, wherein the attachment plate has an opening at least partially overlapping with the opening of the top portion of the shell cover, wherein the openings of the top portion of the shell cover and the attachment plate have suitable size and shape to allow the top portion of the shell cover and the attachment to slide on an external surface of the core channel cover. In some embodiments, the attachment plate is made of a flexible material. In some embodiments, the nozzle further comprises a shell polymer tube for connecting the shell channel to a shell polymer supply.

Yet in another embodiment, a bi-channel electrospinning nozzle is provided, comprising a core unit and a shell unit, wherein: the core unit comprises: a core channel cover enclosing a core channel, wherein the core channel cover has a proximal end and the distal end; a spacer surrounding a distal portion of the core channel cover; and a first shell channel cover surrounding a proximate portion of the core channel cover, wherein an internal surface of the first shell channel cover and an external surface of the core channel cover form a shell channel, and wherein a distal portion of the first shell channel cover comprises one or more openings connecting the first shell channel and the external space; and the shell unit comprises a second shell channel cover comprising a proximal end and a distal portion that is configured to be removably attached to the proximal portion of the first shell channel cover while allowing the proximal end of the core channel cover to go through an internal shell channel of the shell unit.

In some embodiments, the core unit further comprises a fasten screw and a first gasket disposed outside the first shell channel cover. In some embodiments, the core unit further comprises a second gasket larger in diameter than the spacer, disposed between the spacer and the shell channel cover.

Nozzle systems are also provided, in one embodiment, which comprises one or more nozzles of one of the above embodiments inserted to a scaffold, wherein the scaffold comprises a shell polymer reservoir embedded between a first plate and a second plate, and a core polymer reservoir embedded between the second plate and a third plate, wherein the spacer is inserted into an opening in the second plate such that the distal end of the core channel is in fluid communication with the core polymer reservoir, and wherein the first shell channel cover is partially disposed in the first plate such that the openings allow the shell channel to be in fluid communication with the shell polymer reservoir.

BRIEF DESCRIPTION OF THE DRAWINGS

Exemplary and non-limiting embodiments of the inventions may be more readily understood by referring to the accompanying drawings, in which:

FIGS. 11A-11D show exemplary embodiments in which the kit of FIG. 10 comprises a scaffold with different shaped sections therein.

FIG. 12A shows a bi-channel nozzle and FIG. 12B-D show a few different configurations for assembling nozzles on a nozzle plate.

DETAILED DESCRIPTION

Described herein are devices, systems, and kits for fiber formation, as well as methods of using the same. These unique fiber formation devices, systems, and kits described herein are highly customizable to allow for tunable polymeric fiber formation. Exemplary devices, systems, and kits may include one or more nozzle plates, or a scaffold, each comprising a plurality of pores configured to transport a fluid, such as a polymer solution or polymer melt. The shape and size of the scaffold or nozzle plate(s), as well as each individual pore, may be customized. The pattern/arrangement of the pores may also be customized. Further, each pore may independently comprise a conjunction system, which can be selectably configured to permit or prevent extrusion of the fluid from the respective pore. The ability to customize each of these elements allows the characteristics of the formed fibers (e.g., fiber diameter, shape, orientation/alignment, complexity of the resulting fiber patterns, multi-fiber structures, etc.) to be tailored and/or finely tuned.

1. Nozzle Plate

Figure 1A:
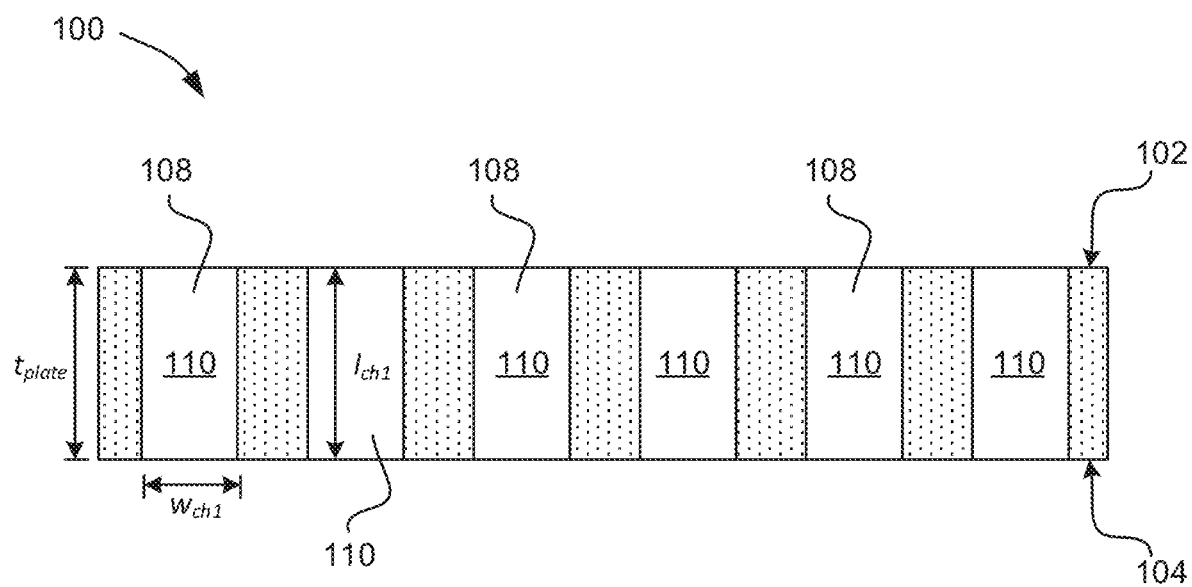
FIG. 1A shows a cross-sectional side view of a nozzle plate, according to one embodiment.
Figure 1B:
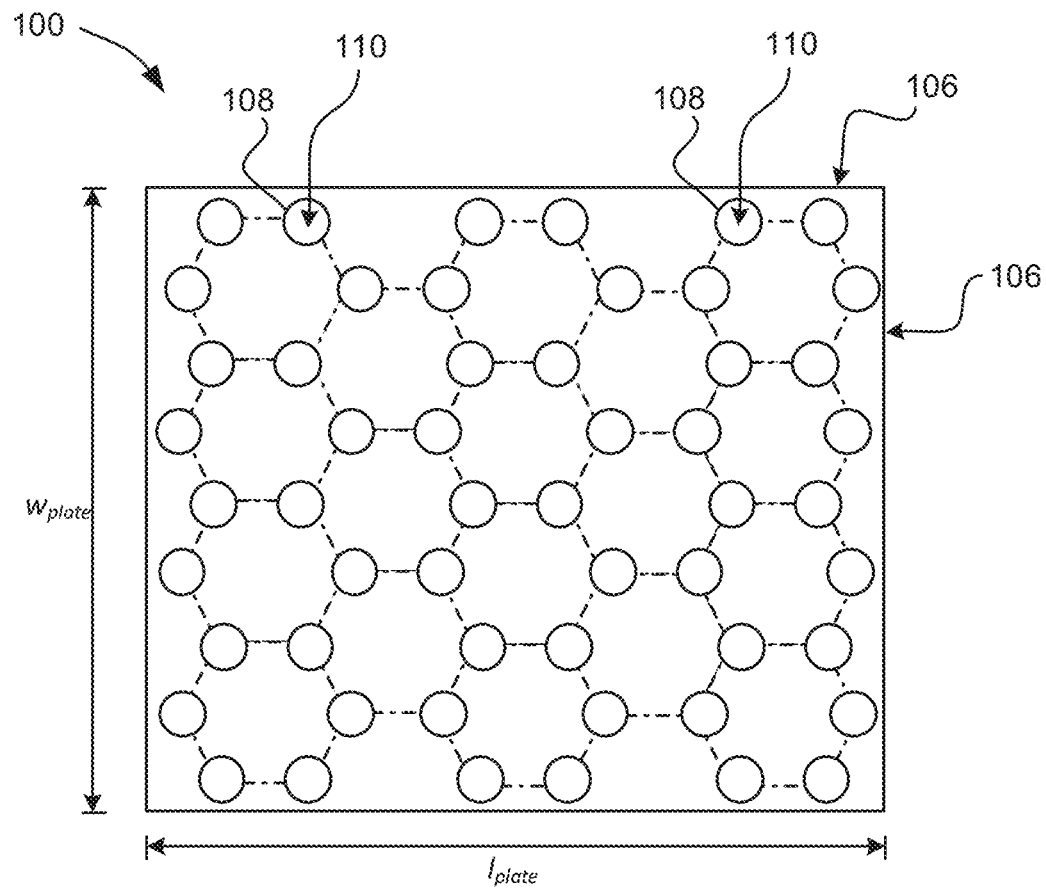
FIG. 1B shows a top view of the nozzle plate, according to one embodiment.
Figure 2A:
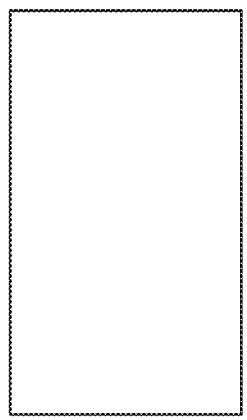
FIGS. 2A-2H show exemplary shapes that a nozzle plate, as described herein, and/or components thereof may take.
Figure 2B:
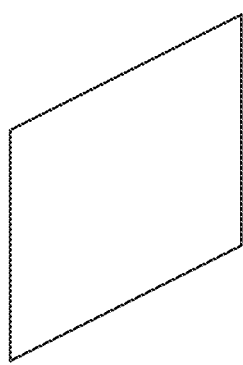
Figure 2C:
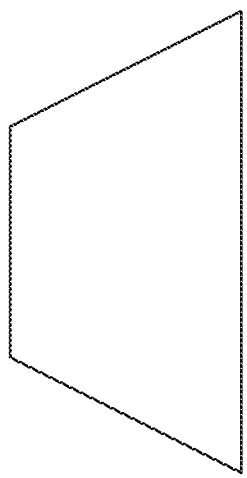
Figure 2D:
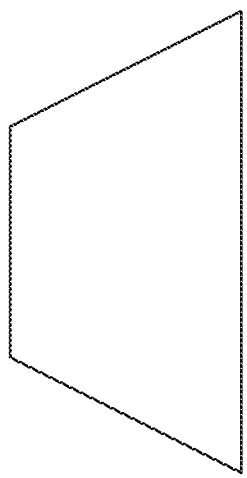
Figure 2E:
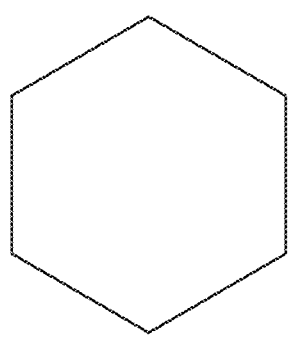
Figure 2F:
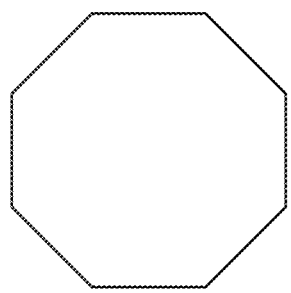
Figure 2G:
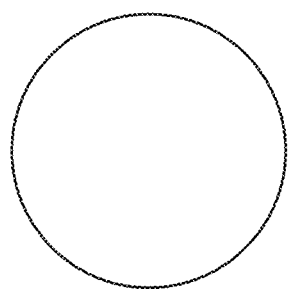
Figure 2H:
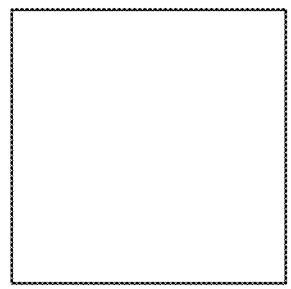

Referring now to FIGS. 1A-1B, a cross-sectional, side view of a nozzle plate 100 (FIG. 1A), and a top view of the nozzle plate 100 is shown in accordance with one embodiment. The nozzle plate 100 or components/features thereof may be implemented in combination with, or as an alternative to, other devices/features/components described herein, such as those described with reference to other embodiments and FIGS. The nozzle plate 100 may additionally be utilized in any of the methods for making and/or using such devices/components/features described herein. The nozzle plate 100 may also be used in various applications and/or in permutations, which may or may not be noted in the illustrative embodiments described herein. For instance, the nozzle plate 100 may include more or less features/components than those shown in FIGS. 1A-1B, in some embodiments. Moreover, the nozzle plate 100 is not limited to the size, shape, number of components, etc. specifically shown in FIGS. 1A-1B.

As shown in FIGS. 1A-1B, the nozzle plate 100 comprises a first surface 102 opposite a second surface 104. In some embodiments, the first and second surfaces 102, 104 are oriented substantially parallel with one another. In some embodiments, the first surface 102 and/or the second surface 104 may have one or more curved (e.g., convex or concave) regions.

As show in the embodiment of FIGS. 1A-1B, the nozzle plate 100, and particularly the outer periphery 106 thereof, may have a substantially square shape. However, in some embodiments, the nozzle plate 100 may have any number of suitable shapes. For example, as shown in FIGS. 2A-2H, the nozzle plate 100 may have a shape selected from a rectangle (FIG. 2A), a triangle (FIG. 2B), a parallelogram (FIG. 2C), an echelon (FIG. 2D), a hexagon (FIG. 2E), an octagon (FIG. 2F), a circle (FIG. 2G), a square (FIG. 2H), or an irregular shape (not shown).

In some embodiments, the nozzle plate 100 may have a substantially rectangular shape. In some embodiments, the nozzle plate 100 may have a substantially triangular shape. In some embodiments, the nozzle plate 100 may have a substantially parallelogram shape. In some embodiments, the nozzle plate 100 may have a substantially echelon shape. In some embodiments, the nozzle plate 100 may have a substantially hexagonal shape. In some embodiments, the nozzle plate 100 may have a substantially octagonal shape. In some embodiments, the nozzle plate 100 may have a substantially circular shape. In some embodiments, the nozzle plate 100 may have a substantially irregular shape. It is of note that the nozzle plate 100 is not limited to the aforementioned shapes, but may have any suitable shape as would become apparent to one having skill in the art upon reading the present disclosure.

With continued reference to FIGS. 1A-1B, the nozzle plate 100 may have a length, $l_{plate}$, and a width, $w_{plate}$, each independently no more than about 10 cm, no more than about 50 cm, no more than about 100 cm, no more than about 150 cm, no more than about 200 cm, no more than about 250 cm, no more than about 300 cm, no more than about 350 cm, no more than about 400 cm, no more than about 450 cm, no more than about 500 cm, no more than about 550 cm, no more than about 600 cm, no more than about 650 cm, no more than about 700 cm, no more than about 750 cm, no more than about 800 cm, no more than about 850 cm, no more than about 900 cm, no more than about 950 cm, no more than about 1000 cm, no more than about 1500 cm, no more than about 2000 cm, etc.

In some embodiments, the nozzle plate 100 may have a length, $l_{plate}$, and a width, $w_{plate}$, each independently ranging from about 20 cm to about 200 cm, about 30 to about 100 cm, or about 40 to about 80 cm. In some embodiments, the length, $l_{plate}$, and the width, $w_{plate}$, of the nozzle plate 100 may each independently be in a range including and between any two of the following: about 10 cm, about 20 cm, about 40 cm, about 60 cm, about 80 cm, about 100 cm, about 120 cm, about 140 cm, about 160 cm, about 180 cm, about 200 µm, about 220 cm, about 240 cm, about 260 cm, about 280 cm, about 300 cm, about 320 cm, about 340 cm, about 360 cm, about 380 cm, about 400 cm, about 420 cm, about 440 cm, about 460 cm, 4 about 80 cm, about 500 cm, about 520 cm, about 540 cm, about 560 cm, about 580 cm, about 600 cm, about 620 cm, about 640 cm, about 660 cm, about 680 cm, about 700 cm, about 720 cm, about 740 cm, about 760 cm, about 780 cm, about 800 cm, about 820 cm, about 840 cm, about 860 cm, about 880 cm, about 900 cm, about 920 cm, about 940 cm, about 960 cm, about 980 cm, about 1000 cm, about 1100 cm, about 1200 cm, about 1300 cm, about 1400 cm, about 1500 cm, about 1600 cm, about 1700 cm, about 1800 cm, about 1900 cm, and about 2000 cm.

In the embodiment of FIGS. 1A-1B, the nozzle plate 100 has a substantially square shape, thus the width, $w_{plate}$, and the length, $l_{plate}$, thereof may be about equal. However, as discussed herein, the shape of the nozzle plate 100 is not limited to a square and make take on any number of suitable shapes. As such, the width, $w_{plate}$, of the nozzle plate 100 may be greater than, about equal to, or less than the length, $l_{plate}$, thereof. For instance, in an exemplary embodiment in which the nozzle plate 100 has a substantially rectangular shape, the length, $l_{plate}$, of the nozzle plate 100 may be about in the range from about 20 cm to about 200 cm, and the width, $w_{plate}$, thereof may be about in the range of from about 20 cm to about 200 cm, provided that $l_{plate}$ is not about equal to $w_{plate}$.

In some embodiments, the maximum dimension of the nozzle plate 100 may be in a range from about 20 cm to about 200 cm, about 30 to about 100 cm, or about 30 cm to about 80 cm. In some embodiments, the maximum dimension of the nozzle plate 100 may be in a range including and between any two of the following: about 10 cm, about 20 cm, about 40 cm, about 60 cm, about 80 cm, about 100 cm, about 120 cm, about 140 cm, about 160 cm, about 180 cm, about 200 μm, about 220 cm, about 240 cm, about 260 cm, about 280 cm, about 300 cm, about 320 cm, about 340 cm, about 360 cm, about 380 cm, about 400 cm, about 420 cm, about 440 cm, about 460 cm, 4 about 80 cm, about 500 cm, about 520 cm, about 540 cm, about 560 cm, about 580 cm, about 600 cm, about 620 cm, about 640 cm, about 660 cm, about 680 cm, about 700 cm, about 720 cm, about 740 cm, about 760 cm, about 780 cm, about 800 cm, about 820 cm, about 840 cm, about 860 cm, about 880 cm, about 900 cm, about 920 cm, about 940 cm, about 960 cm, about 980 cm, about 1000 cm, about 1100 cm, about 1200 cm, about 1300 cm, about 1400 cm, about 1500 cm, about 1600 cm, about 1700 cm, about 1800 cm, about 1900 cm, and about 2000 cm.

In some embodiments, the nozzle plate 100 may have a thickness, $t_{plate}$, of no more than about 0.5 cm, no more than about 1 cm, no more than about 2 cm, no more than about 4 cm, no more than about 4 cm, no more than about 6 cm, no more than about 8 cm, no more than about 10 cm, etc.

In some embodiments, the thickness, $t_{plate}$, of the nozzle plate 100 may be in a range from about 0.5 cm to about 10.0 cm. In some embodiments, the thickness, $t_{plate}$, of the nozzle plate 100 may be in a range including and between any two of the following: about 0.5 cm, about 1.0 cm, about 1.2 cm, about 1.4 cm, about 1.6 cm, about 1.8 cm, about 2.0 cm, about 2.2 cm, about 2.4 cm, about 2.6 cm, about 2.8 cm, about 3.0 cm, about 3.2 cm, about 3.4 cm, about 3.6 cm, about 3.8 cm, about 4.0 cm, about 4.2 cm, about 4.4 cm, about 4.6 cm, about 4.8 cm, about 5.0 cm, about 5.2 cm, about 5.4 cm, about 5.6 cm, about 5.8 cm, about 5.0 cm, about 6.2 cm, about 6.4 cm, about 6.6 cm, about 6.8 cm, about 7.0 cm, about 7.2 cm, about 7.4 cm, about 7.6 cm, about 7.8 cm, about 8.0 cm, about 8.2 cm, about 8.4 cm, about 8.6 cm, about 8.8 cm, about 9.0 cm, about 9.2 cm, about 9.4 cm, about 9.6 cm, about 9.8 cm, and about 10.0 cm.

In some embodiments, the nozzle plate 100 may be comprised of a metallic material, or a non-metallic material, or a combination thereof. In some embodiments, the nozzle plate 100 may be comprised of one or more materials chosen from (but not limited to) steel, high-grade steel, iron alloy(s) such as stainless steel, chromium-nickel steel(s), or nickel steel(s), inconel, sintered metal, aluminum, copper, tin, titanium, tantalum, silicon carbide, glass, noble metal(s) (e.g., gold, silver, or platinum), and any combinations thereof. In some embodiments, the nozzle plate 100 may be comprised of one or more materials chosen from (but not limited to) ceramic, plastic materials (e.g., polyethylene, polypropylene, polystyrene and polyvinyl chloride and polycarbonate, polytetrafluoroethylene, polyamides, polyesters and polyurethanes, acrylonitrile butadiene styrene, polyoxymethylene, cyclic olefin copolymer, poly(methyl methacrylate, etc.), wood, glass, stone, and any combinations thereof. In some embodiments, the nozzle plate 100 may be comprised of other such suitable materials as would become apparent to one having skill in the art upon reading the present disclosure.

As also shown in FIGS. 1A-1B, the nozzle plate 100 comprises one or more pores 108 extending through the first and second surfaces 102, 104. In some embodiments, the nozzle plate 100 comprises a plurality of the pores 108. In some embodiments, the nozzle plate 100 comprises at least about 20, at least about 25, at least about 30, at least about 35, at least about 40, at least about 45, at least about 50, at least about 55, at least about 60, at least about 65, at least about 70, at least about 75, at least about 80, at least about 85, at least about 90, at least about 95, at least about 100, at least about 120, at least about 140, at least about 160, at least about 180, at least about 200, at least about 220, at least about 240, at least about 260, at least about 280, at least about 300, at least about 350, at least about 400, at least about 450, at least about 500, at least about 550, at least about 600, at least about 650, at least about 700, at least about 750, at least about 800, at least about 850, at least about 900, at least about 950, at least about 1000, at least about 1100, at least about 1200, at least about 1300, at least about 1400, at least about 1500, at least about 1600, at least about 1700, at least about 1800, at least about 1900, at least about 2000, at least about 2100, at least about 2200, at least about 2300, at least about 2400, at least about 2500, at least about 2600, at least about 2700, at least about 2800, at least about 2900, at least about 3000, at least about 3100, at least about 3200, at least about 3300, at least about 3400, at least about 3500, at least about 3600, at least about 3700, at least about 3800, at least about 3900, at least about 4000, at least about 4100, at least about 4200, at least about 4300, at least about 4400, at least about 4500, at least about 4600, at least about 4700, at least about 4800, at least about 4900, at least about 5000 etc. pores 108.

In some embodiments, the number of pores 108 in the nozzle plate 100 may be in a range from about 20 pores to about 500 pores. In some embodiments, the number of pores 108 in the nozzle plate 100 may be in a range including and between any two of the following: about 20 pores, about 40 pores, about 60 pores, about 80 pores, about 100 pores, about 120 pores, about 140 pores, about 160 pores, about 180 pores, about 200 pores, about 220 pores, about 240 pores, about 260 pores, about 280 pores, about 300 pores, about 320 pores, about 340 pores, about 360 pores, about 380 pores, about 400 pores, about 420 pores, about 440 pores, about 460 pores, about 480 pores, about 500 pores, about 520 pores, about 540 pores, about 560 pores, about 580 pores, about 600 pores, about 620 pores, about 640 pores, about 660 pores, about 680 pores, about 700 pores, about 720 pores, about 740 pores, about 760 pores, about 780 pores, about 800 pores, about 820 pores, about 840 pores, about 860 pores, about 880 pores, about 900 pores, about 920 pores, about 940 pores, about 960 pores, about 980 pores, about 1000 pores, about 1050 pores, about 1100 pores, about 1150 pores, about 1200 pores, about 1250 pores, about 1300 pores, about 1350 pores, about 1400 pores, about 1450 pores, about 1500 pores, about 1550 pores, about 1600 pores, about 1650 pores, about 1700 pores, about 1750 pores, about 1800 pores, about 1850 pores, about 1900 pores, about 1950 pores, about 2000 pores, about 2050 pores, about 2100 pores, about 2150 pores, about 2200 pores, about 2250 pores, about 2300 pores, about 2350 pores, about 2400 pores, about 2450 pores, about 2500 pores, about 2550 pores, about 2600 pores, about 2650 pores, about 2700 pores, about 2750 pores, about 2800 pores, about 2850 pores, about 2900 pores, about 2950 pores, about 3000 pores, about 3050 pores, about 3100 pores, about 3150 pores, about 3200 pores, about 3250 pores, about 3300 pores, about 3350 pores, about 3400 pores, about 3450 pores, about 3500 pores, about 3550 pores, about 3600 pores, about 3650 pores, about 3700 pores, about 3750 pores, about 3800 pores, about 3850 pores, about 3900 pores, about 3950 pores, about 4000 pores, about 4050 pores, about 4100 pores, about 4150 pores, about 4200 pores, about 4250 pores, about 4300 pores, about 4350 pores, about 4400 pores, about 4450 pores, about 4500 pores, about 4550 pores, about 4600 pores, about 4650 pores, about 4700 pores, about 4750 pores, about 4800 pores, about 4850 pores, about 4900 pores, about 4950 pores, and about 5000 pores.

Figure 3B:
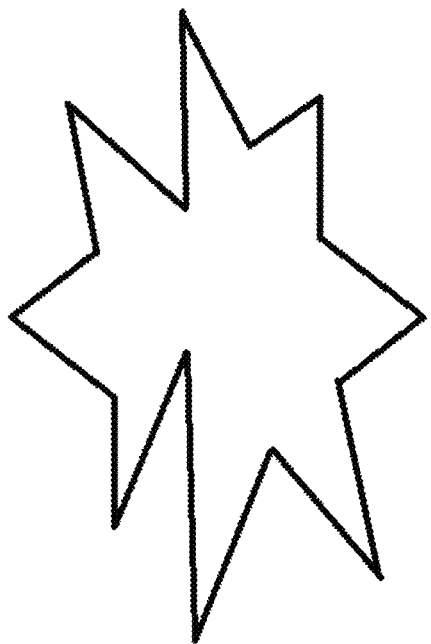
FIGS. 3A-3C show exemplary irregular shapes that at least the pores of a nozzle plate may take.
Figure 3C:
Figure 3A:
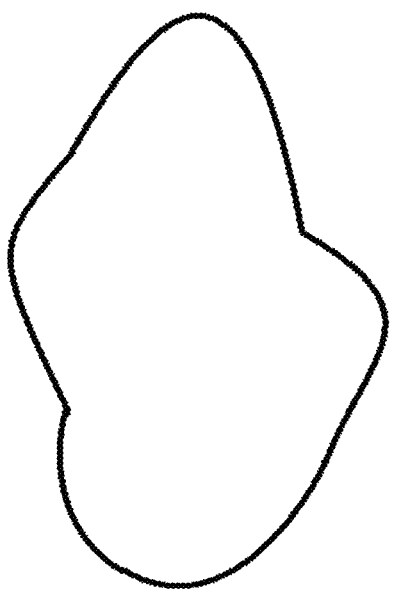

As show in the embodiment of FIGS. 1A-1B, each pore 108, and particularly the outer periphery thereof, may have a substantially circular shape. However, in some embodiments, each pore 108 may independently have any number of suitable shapes. For example, in some embodiments, each pore 108 may independently have a shape selected from those recited in FIGS. 2A-2G, namely a rectangle (FIG. 2A), a triangle (FIG. 2B), a parallelogram (FIG. 2C), an echelon (FIG. 2D), a hexagon (FIG. 2E), an octagon (FIG. 2F), a circle (FIG. 2G), a square (FIG. 2H), or an irregular shape. Non-limiting examples of irregular shaped pores 108 are provided in FIGS. 3A-3C. In some embodiments, the shape of at least one of the pores may reflect a desired name, symbol, graphic/image, etc., as shown, e.g., in FIG. 3C. It is of note that each pore 108 is not limited to the aforementioned shapes, but may have any suitable shape as would become apparent to one having skill in the art upon reading the present disclosure.

In some embodiments, at least one, a plurality, or a majority of the pores 108 may have a substantially rectangular shape. In some embodiments, at least one, a plurality, or a majority of each of the pores 108 may have a substantially triangular shape. In some embodiments, at least one, a plurality, or a majority of the pores 108 may have a substantially parallelogram shape. In some embodiments, at least one, a plurality, or a majority of the pores 108 may have a substantially echelon shape. In some embodiments, at least one, a plurality, or a majority of the pores 108 may have a substantially hexagonal shape. In some embodiments, at least one, a plurality, or a majority of the pores 108 may have a substantially octagonal shape. In some embodiments, at least one, a plurality, or a majority of the pores 108 may have a substantially circular shape. In some embodiments, at least one, a plurality, or a majority of the pores 108 may have a substantially square shape. In some embodiments, at least one, a plurality, or a majority of the pores 108 may have a substantially irregular shape. In some embodiments, at least one, a plurality, or a majority of the pores 108 may have a shape reflecting a desired name, symbol, or graphic/image.

In some embodiments, each pore 108 may have a substantially rectangular shape. In some embodiments, each pore 108 may have a substantially triangular shape. In some embodiments, each pore 108 may have a substantially parallelogram shape. In some embodiments, each pore 108 may have a substantially echelon shape. In some embodiments, each pore 108 may have a substantially hexagonal shape. In some embodiments, each pore 108 may have a substantially octagonal shape. In some embodiments, each pore 108 may have a substantially circular shape. In some embodiments, each pore 108 may have a substantially square shape. In some embodiments, each pore 108 may have a substantially irregular shape. In some embodiments, each pore 108 may have a shape reflecting a desired name, symbol, or graphic/image.

In some embodiments, at least two of the pores 108 may have different shapes as one another. In some embodiments, a plurality of the pores 108 may have different shapes as one another. In some embodiments, each of the pores 108 may have a different shape.

In some embodiments, one or more of the pores 108 may have a first cross-sectional shape at or near the first surface 102 and a second cross-sectional shape at or near the second surface 104. In some embodiments, this first cross-sectional shape may be different than the second cross-sectional shape. In some embodiments, the first cross-sectional shape and the second cross-sectional shape may each be independently have a shape selected from those recited in FIGS. 2A-2G, namely a rectangle (FIG. 2A), a triangle (FIG. 2B), a parallelogram (FIG. 2C), an echelon (FIG. 2D), a hexagon (FIG. 2E), an octagon (FIG. 2F), a circle (FIG. 2G), a square (FIG. 2H), or an irregular shape. In some embodiments, each of the pores 108 may have a first cross-sectional shape at or near the first surface 102 and a second cross-sectional shape at or near the second surface 104, where the first and second cross-sectional shapes are different from one another.

With continued reference to FIGS. 1A-1B, the pores 108 may be arranged according to a predetermined pattern. For instance, in the particular embodiment shown in FIGS. 1A-1B, the pores 108 are arranged according to a substantially hexagonal pattern. In some embodiments, e.g., as shown in FIGS. 4A-4H, the pores 108 may be arranged according to a substantially triangular pattern (FIG. 4A), a substantially parallelogram pattern (FIG. 4B), a substantially echelon pattern (FIG. 4C), a substantially hexagonal pattern (FIG. 4D), or a substantially square pattern (FIG. 4E). Accordingly, in some embodiments, the pores 108 may be arranged according to a substantially triangular pattern. In some embodiments, the pores 108 may be arranged according to a substantially parallelogram pattern. In some embodiments, the pores 108 may be arranged according to a substantially echelon pattern. in some embodiments, the pores 108 may be arranged according to a substantially hexagonal pattern. In some embodiments, the pores 108 may be arranged according to or a substantially square pattern.

In some embodiments, the pores 108 may be arranged according to a combination of any of the aforementioned patterns. Such combinations may include, but are not limited to, a combination of octagonal and rectangular patterns (FIG. 4F), a combination of echelon and triangular patterns (FIG. 4G), and a combination of hexagonal and parallelogram patterns (FIG. 4H). In some embodiments, the pores 108 may be arranged according to a random or irregular pattern, e.g., as shown in FIG. 4I.

With continued reference to FIGS. 1A-1B, in some embodiments, an average distance between adjacent pores 108 may be at least about 1 µm, at least about 10 µm, at least about 50 µm, at least about 100 µm, at least about 150 µm, at least about 200 µm, at least about 250 µm, at least about 300 µm, at least about 350 µm, at least about 400 µm, at least about 450 µm, at least about 500 µm, at least about 550 µm, at least about 600 µm, at least about 650 µm, at least about 700 µm, at least about 750 µm, at least about 800 µm, at least about 850 µm, at least about 900 µm, at least about 950 µm, at least about 0.1 cm, at least about 0.5 cm, at least about 1 cm, at least about 5 cm, at least about 10 cm, at least about 15 cm, at least about 20 cm, at least about 25 cm, at least about 30 cm, at least about 35 cm, at least about 40 cm, at least about 45 cm, at least about 50 cm, at least about 55 cm, at least about 60 cm, at least about 65 cm, at least about 70 cm, at least about 75 cm, at least about 80 cm, at least about 85 cm, at least about 90 cm, at least about 95 cm, at least about 100 cm, at least about 150 cm, at least about 200 cm, at least about 250, at least about 300 cm, at least about 350, at least about 400 cm, at least about 450, at least about 500 cm, etc.

In some embodiments an average distance between adjacent pores 108 may be in a range from about 1 cm to about 50 cm. In some embodiments an average distance between adjacent pores 108 may be in a range including and between any two of the following: about 0.1 µm, about 0.5 µm, about 20 µm, about 40 µm, about 60 µm, about 80 µm, about 100 µm, about 120 µm, about 140 µm, about 160 µm, about 180 µm, about 200 µm, about 220 µm, about 240 µm, about 260 µm, about 280 µm, about 300 µm, about 320 µm, about 340 µm, about 360 µm, about 380 µm, about 400 µm, about 420 µm, about 440 µm, about 460 µm, about 480 µm, about 500 µm, about 520 µm, about 540 µm, about 560 µm, about 580 µm, about 600 µm, about 620 µm, about 640 µm, about 660 µm, about 680 µm, about 700 µm, about 720 µm, about 740 µm, about 760 µm, about 780 µm, about 800 µm, about 920 µm, about 940 µm, about 960 µm, about 980 µm, about 0.1 cm, about 0.5 cm, about 1 cm, about 2 cm, about 4 cm, about 6 cm, about 8 cm, about 10 cm, about 20 cm, about 30 cm, about 40 cm, about 50 cm, about 60 cm, about 70 cm, about 80 cm, about 90 cm, about 100 cm, about 120 cm, about 140 cm, about 160 cm, about 180 cm, about 200 cm, about 220 cm, about 240 cm, about 260 cm, about 280 cm, about 300 cm, about 320 cm, about 340 cm, about 360 cm, about 380 cm, about 400 cm, about 420 cm, about 440 cm, about 460 cm, about 480 cm, and about 500 cm.

In some embodiments, the distance between the pores 108 may be substantially uniform, such as in the case where the pores 108 are arranged according to a square pattern.

In some embodiments, the distance between certain pores may not be uniform. Non uniform distances between certain pores 108 may occur, for example, where the pores 108 are arranged according to a rectangular pattern, a parallelogram pattern, an echelon pattern, etc. Accordingly, reference is made again to FIGS. 4A-4H, where the average pore distances, $d_1$, $d_2$, and $d_3$ (when present) may each independently be at least about 1 µm, at least about 10 µm, at least about 50 µm, at least about 100 µm, at least about 150 µm, at least about 200 µm, at least about 250 µm, at least about 300 µm, at least about 350 µm, at least about 400 µm, at least about 450 µm, at least about 500 µm, at least about 550 µm, at least about 600 µm, at least about 650 µm, at least about 700 µm, at least about 750 µm, at least about 800 µm, at least about 850 µm, at least about 900 µm, at least about 950 µm, at least about 0.1 cm, at least about 0.5 cm, at least about 1 cm, at least about 5 cm, at least about 10 cm, at least about 15 cm, at least about 20 cm, at least about 25 cm, at least about 30 cm, at least about 35 cm, at least about 40 cm, at least about 45 cm, at least about 50 cm, at least about 55 cm, at least about 60 cm, at least about 65 cm, at least about 70 cm, at least about 75 cm, at least about 80 cm, at least about 85 cm, at least about 90 cm, at least about 95 cm, at least about 100 cm, at least about 150 cm, at least about 200 cm, at least about 250, at least about 300 cm, at least about 350, at least about 400 cm, at least about 450, at least about 500 cm, etc. In some embodiments, the average pore distances, $d_1$, $d_2$, and $d_3$ (when present) may each independently be in a range from about 1 cm to about 50 cm.

In some embodiments, the average pore distances, $d_1$, $d_2$, and $d_3$ (when present) may each independently be in a range from about 1 cm to about 50 cm. In some embodiments, the average pore distances, $d_1$, $d_2$, and $d_3$ (when present) may each independently be in a range including and between any two of the following: about 0.1 µm, about 0.5 µm, about 20 µm, about 40 µm, about 60 µm, about 80 µm, about 100 µm, about 120 µm, about 140 µm, about 160 µm, about 180 µm, about 200 µm, about 220 µm, about 240 µm, about 260 µm, about 280 µm, about 300 µm, about 320 µm, about 340 µm, about 360 µm, about 380 µm, about 400 µm, about 420 µm, about 440 µm, about 460 µm, about 480 µm, about 500 µm, about 520 µm, about 540 µm, about 560 µm, about 580 µm, about 600 µm, about 620 µm, about 640 µm, about 660 µm, about 680 µm, about 700 µm, about 720 µm, about 740 µm, about 760 µm, about 780 µm, about 800 µm, about 920 µm, about 940 µm, about 960 µm, about 980 µm, about 0.1 cm, about 0.5 cm, about 1 cm, about 2 cm, about 4 cm, about 6 cm, about 8 cm, about 10 cm, about 20 cm, about 30 cm, about 40 cm, about 50 cm, about 60 cm, about 70 cm, about 80 cm, about 90 cm, about 100 cm, about 120 cm, about 140 cm, about 160 cm, about 180 cm, about 200 cm, about 220 cm, about 240 cm, about 260 cm, about 280 cm, about 300 cm, about 320 cm, about 340 cm, about 360 cm, about 380 cm, about 400 cm, about 420 cm, about 440 cm, about 460 cm, about 480 cm, and about 500 cm.

Figure 4A:
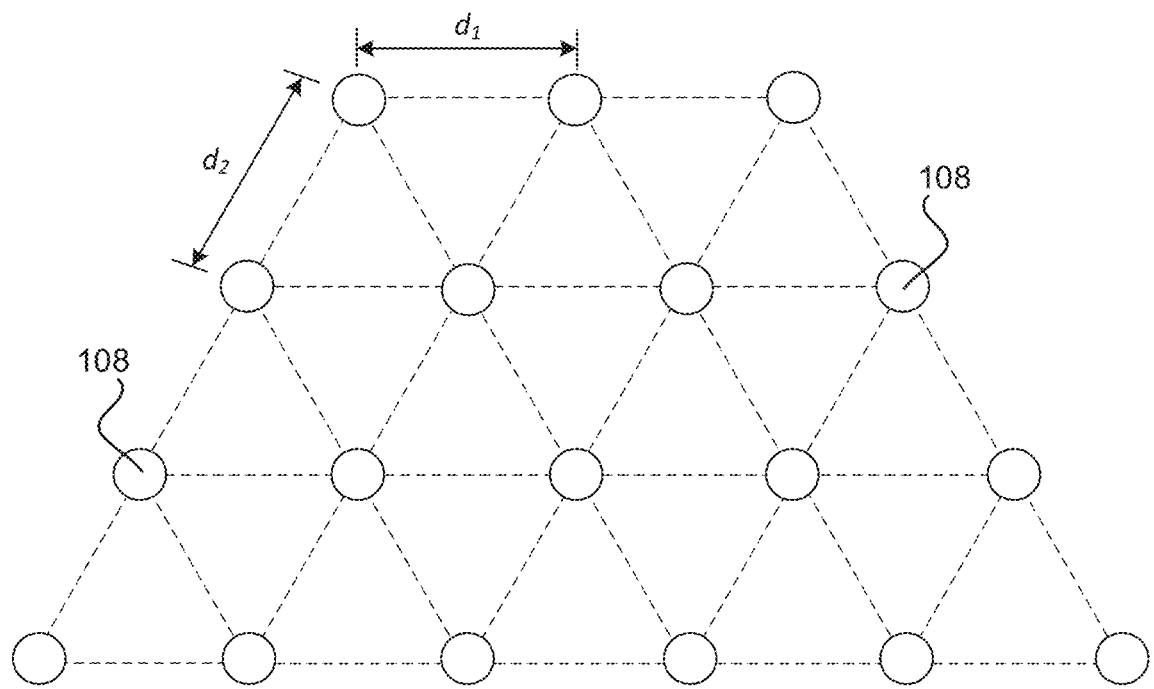
FIGS. 4A-4E show exemplary patterns for the arrangement of the pores of a nozzle plate.
Figure 4B:
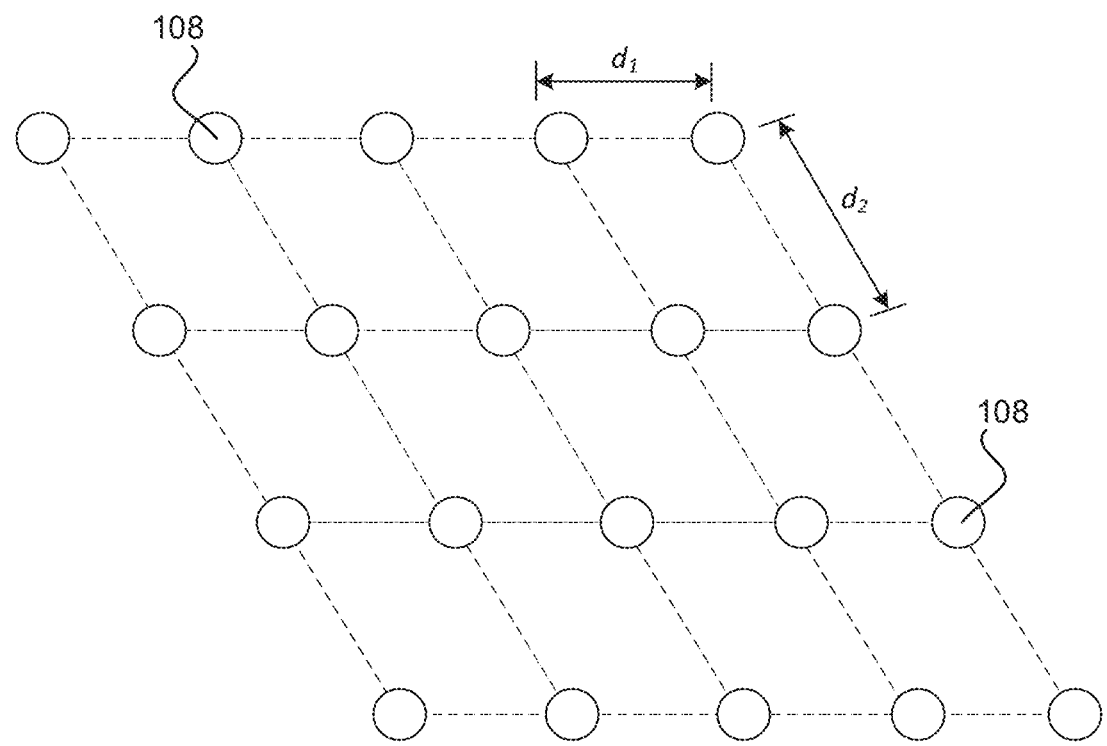
Figure 4C:
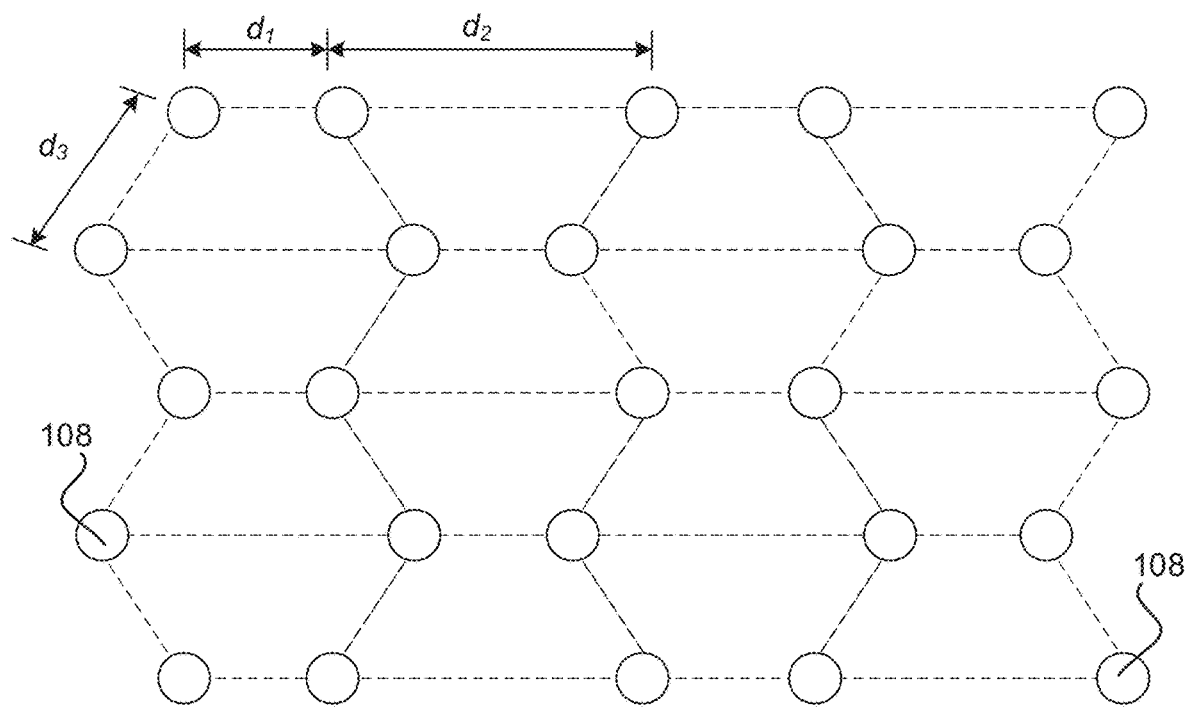
Figure 4D:
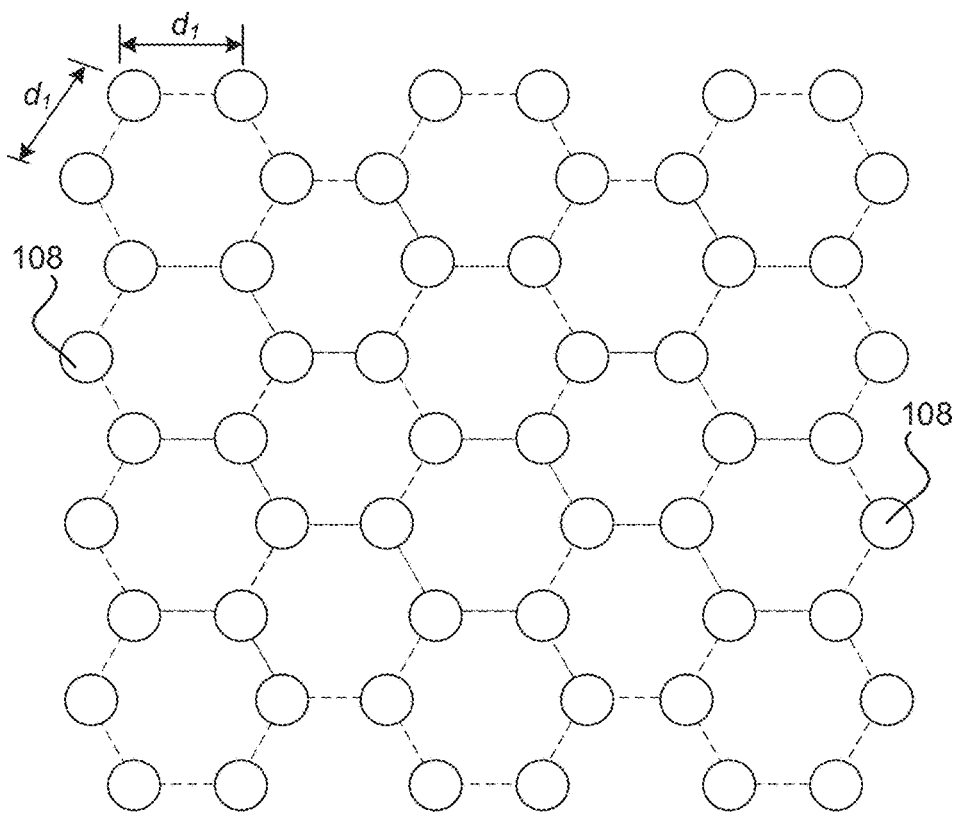
Figure 4E:
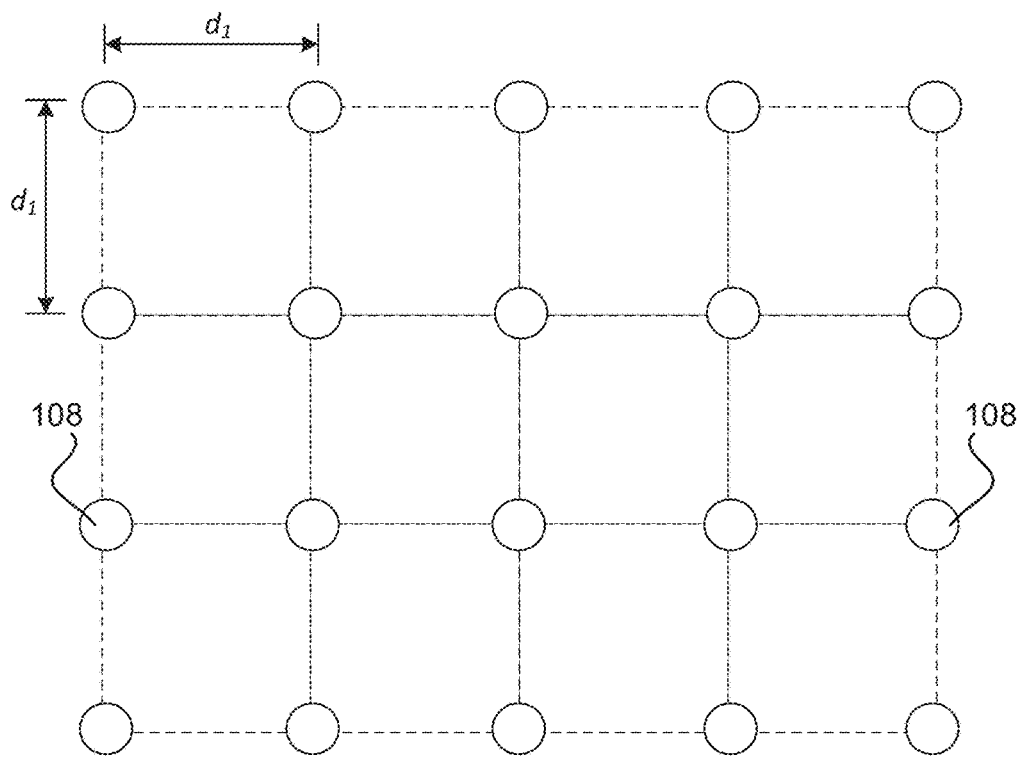
Figure 4F:
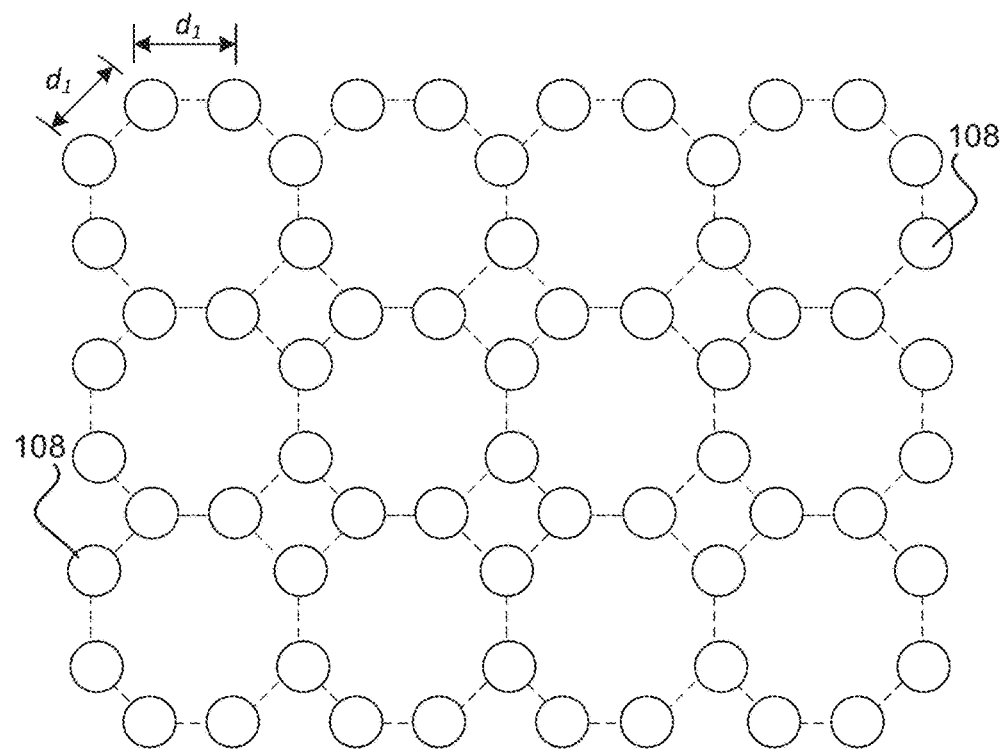
FIGS. 4F-4H shows exemplary combinations of patterns for the arrangement of the pores of a nozzle plate.
Figure 4G:
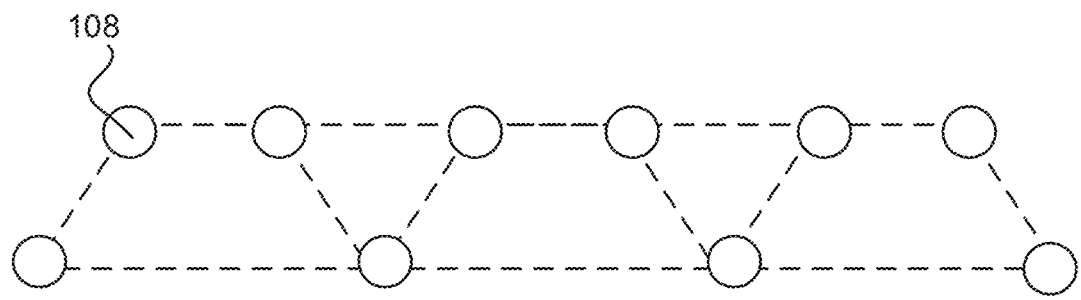
Figure 4H:
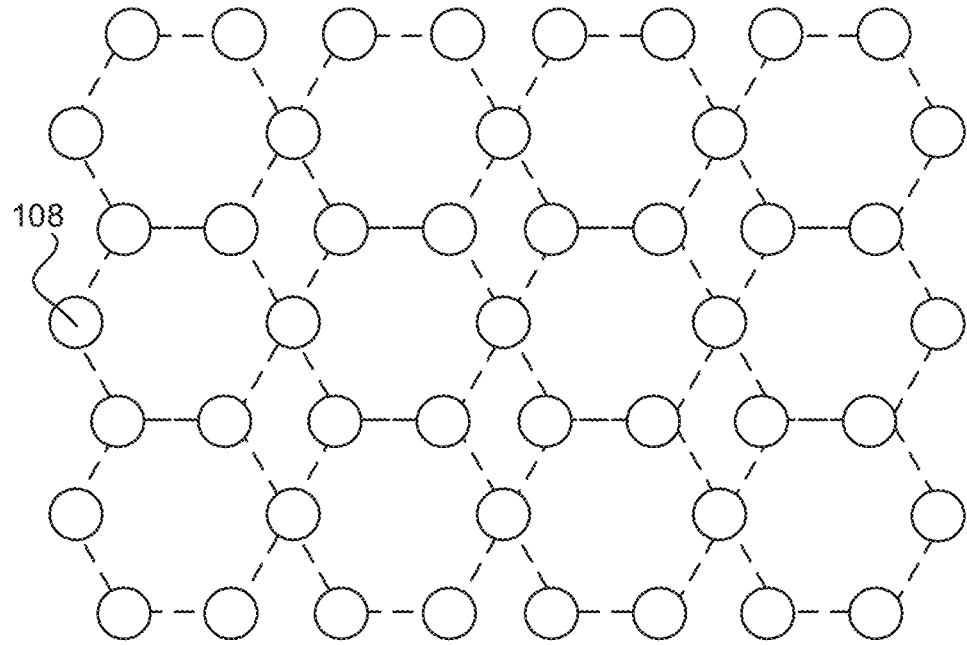
Figure 4I:
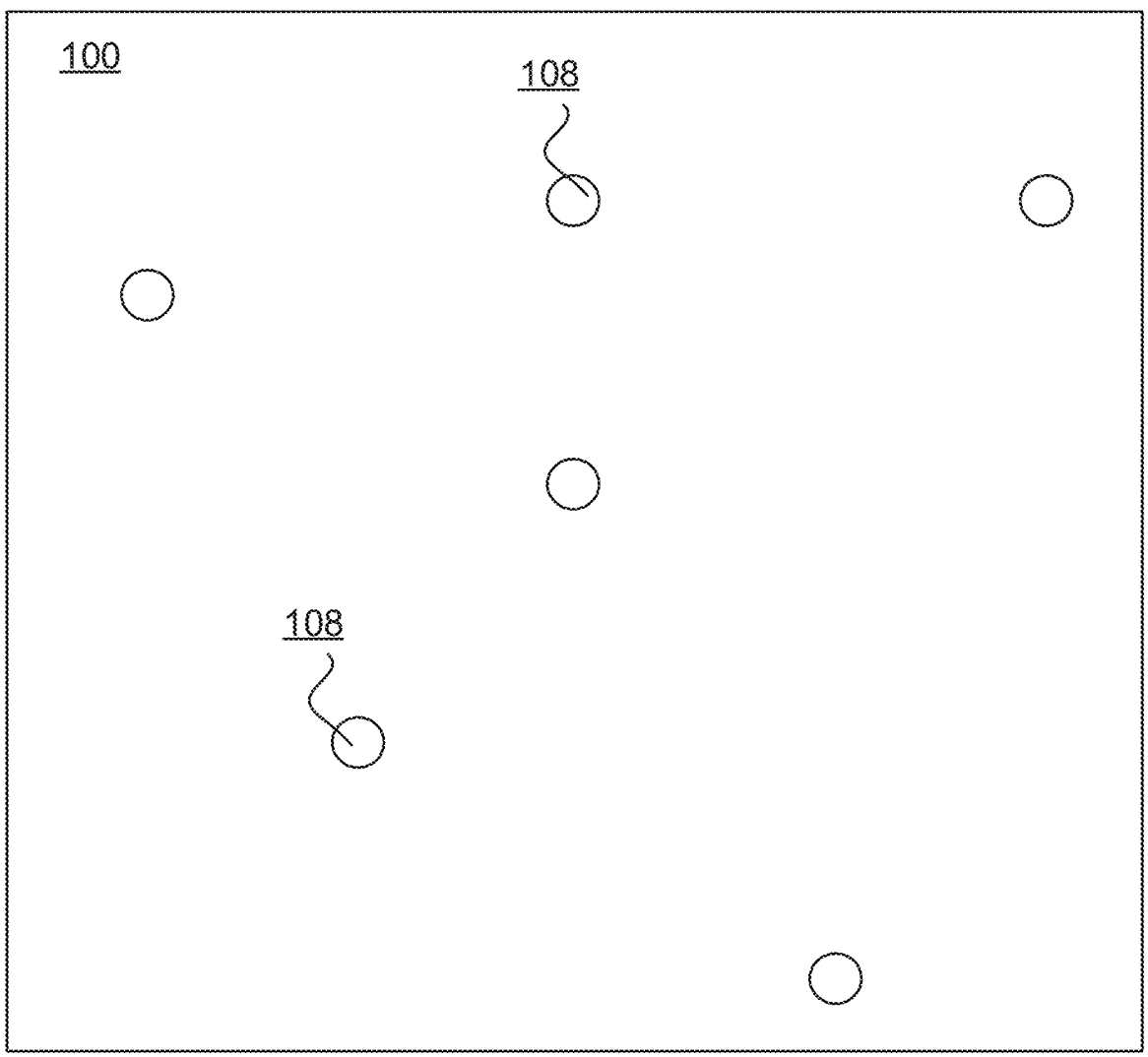
FIG. 4I shows an exemplary random pattern for the arrangement of the pores of a nozzle plate.

In some embodiments, the pores 108 may be arranged according to a rectangular pattern (e.g., as shown in FIG. 4B), where the average pore distances, $d_1$ or $d_2$, are each in a range from about 1 µm to about 500 cm, provided that $d_1$ is less than $d_2$ or vice versa.

With continued reference to FIGS. 1A-1B, each pore 108 comprises a first channel 110. As discussed herein, the nozzle plate 100 may be used to extrude fibers in some embodiments. In such embodiments, a reservoir of a fluid (e.g., a polymer solution or polymer melt) to be formed into fiber may be operatively coupled to the nozzle plate 100, and particularly to the first surface 102 thereof. The first channel 110 of each pore 108 may be in fluidic communication with such reservoir and capable of allowing passage of said fluid through the first channel 110.

In some embodiments, the first channel 110 of each pore 108 may have a diameter configured to form a fiber. Given that the each pore 108 may independently have a shape as disclosed herein, the diameter of the first channel 110 of each pore 108 may correspond to a maximum width, $w_{ch1}$, of the channel as indicated in FIGS. 1A-1B. In some embodiments, the first channels 100 of the pores 108 may each independently have a diameter (or maximum width, $w_{ch1}$) that is least about 10 µm, at least about 50 µm, at least about 100 µm, at least about 150 µm, at least about 200 µm, at least about 250 µm, at least about 300 µm, at least about 350 µm, at least about 400 µm, at least about 450 µm, at least about 500 µm, at least about 550 µm, at least about 600 µm, at least about 650 µm, at least about 700 µm, at least about 750 µm, at least about 800 µm, at least about 850 µm, at least about 900 µm, at least about 950 µm, at least about 0.1 cm, at least about 0.5 cm, at least about 1 cm, at least about 1.5 cm, at least about 2 cm, at least about 2.5 cm, etc.

In some embodiments, the diameter (or maximum width, $w_{ch1}$) of the first channel 110 of each pore 108 may be less than about 3 cm.

In some embodiments, the first channels 100 of the pores 108 may each independently have a diameter (or maximum width, $w_{ch1}$) that ranges from about 10 μm to about 3 cm. In some embodiments, the first channels 100 of the pores 108 may each independently have a diameter (or maximum width, $w_{ch1}$) in a range including and between any two of the following: about 10 μm, about 20 μm, about 40 μm, about 60 μm, about 80 μm, about 100 μm, about 120 μm, about 140 μm, about 160 μm, about 180 μm, about 200 μm, about 220 μm, about 240 μm, about 260 μm, about 280 μm, about 300 μm, about 320 μm, about 340 μm, about 360 μm, about 380 μm, about 400 μm, about 420 μm, about 440 μm, about 460 μm, about 480 μm, about 500 μm, about 520 μm, about 540 μm, about 560 μm, about 580 μm, about 600 μm, about 620 μm, about 640 μm, about 660 μm, about 680 μm, about 700 μm, about 720 μm, about 740 μm, about 760 μm, about 780 μm, about 800 μm, about 820 μm, about 840 μm, about 860 μm, about 880 μm, about 900 μm, about 0.1 cm, about 0.2 cm, about 0.4 cm, about 0.8 cm, about 1 cm, about 1.2 cm, about 1.4 cm, about 1.6 cm, about 1.8 cm, about 2 cm, about 2.2. cm, about 2.4 cm, about 2.6 cm, about 2.8 cm, and about 3 cm.

In some embodiments, the average diameter, maximum width, and/or average width of the first channel 110 of one or more of the pores 108 may be substantially uniform along the length, $l_{ch1}$, thereof.

In some embodiments, the average diameter, maximum width, and/or average width of the first channel 110 of one or more of the pores 108 may not be substantially uniform along the length, $l_{ch1}$, thereof. For instance, in some embodiments, the average diameter, maximum width, and/or average width of the first channel 110 of one or more of the pores 108 may increase from the first surface 102 to the second surface 104. In some embodiments, the average diameter, maximum width, and/or average width of the first channel 110 of one or more of the pores 108 may decrease from the first surface 102 to the second surface 104.

As shown in the embodiment of FIGS. 1A-1B, the first channel 110 of one or more of the pores 108 may be oriented substantially perpendicular to the plane extending along the first surface 102 and/or the second surface 104 of the nozzle plate 100. In some embodiments, however, the first channel 110 of one or more of the pores 108 may not form a right angle relative to the plane extending along the first surface 102 and/or the second surface 104 of the nozzle plate 100, thereby allowing fibers to be extruded therefrom at an acute angle. The ability to customize the relative angle of the first channel 110 of each of the pores 108 may facilitate the tuning of the orientation/alignment of the formed fibers. Thus, in some embodiments, the first channel 110 of one or more of the pores 108 may be oriented from about 10° to about 90° relative to the plane extending along the first surface 102 and/or the second surface 104 of the nozzle plate 100.

While not shown in FIGS. 1A-1B, one or more of the pores 108 of the nozzle plate 100 may comprise a conjunction system for stably and removably coupling a removable component (e.g., a removable connector, a removable nozzle (e.g., needle nozzle), or a removable closure structure as described infra) to the respective pore 108. This conjunction system may be particularly configured to permit or prevent extrusion of a fiber via the nozzle plate 100.

In some embodiments, a plurality of the pores 108 each comprise a conjunction system. In some embodiments, at least one of the pores 108 does not comprise a conjunction system. In some embodiments, each of the pores 108 comprise a conjunction system.

Figure 5A:
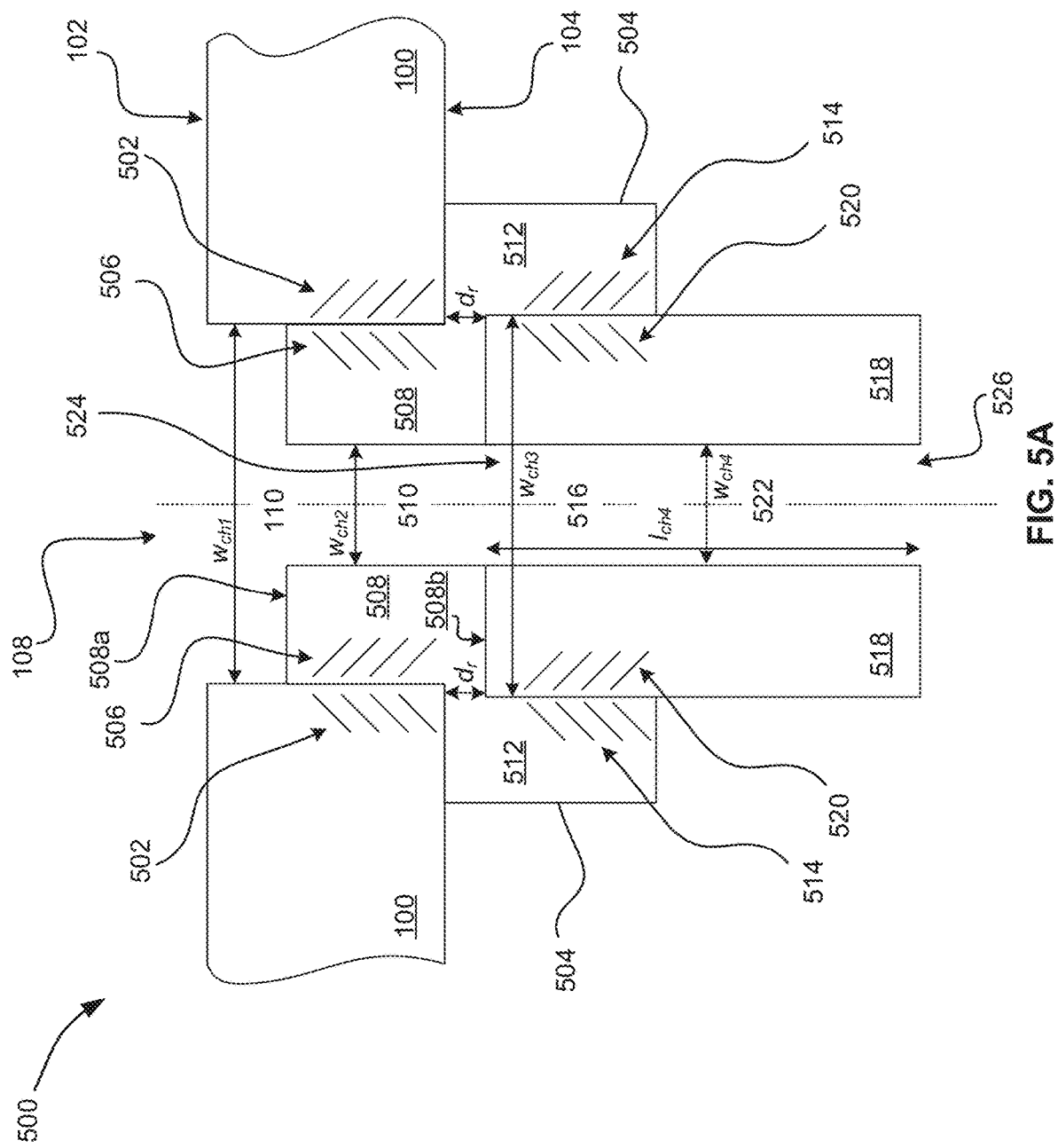
FIGS. 5A-5B show an exploded, cross-sectional view of a pore comprising a three-component conjunction system, according to one embodiment.
Figure 5B:
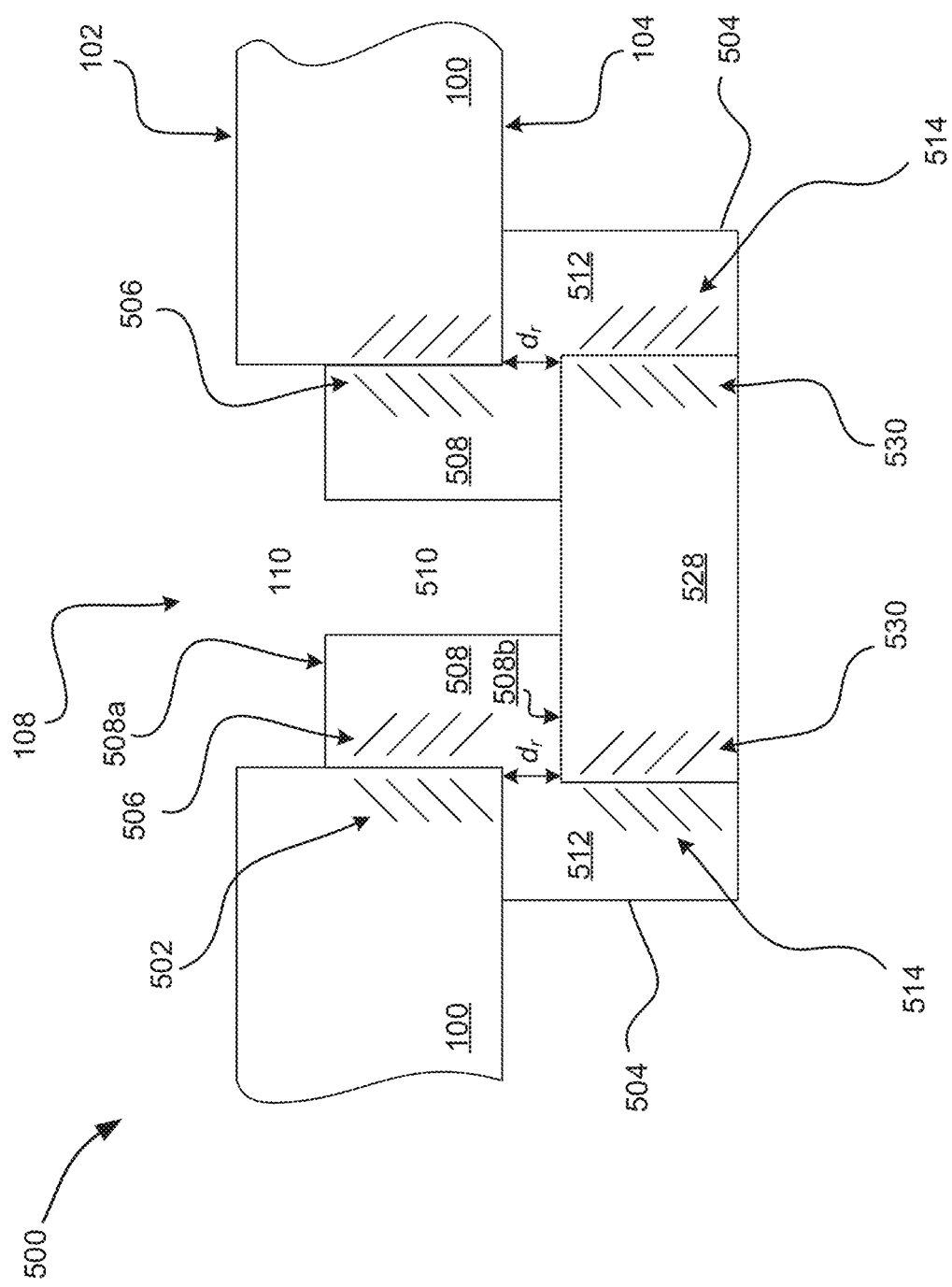

FIGS. 5A-5B provide an exploded, cross-sectional view of a pore 108 comprising a three-component conjunction system 500 according to one exemplary embodiment. The conjunction system 500 comprises a first conjunction interface 502 ("first component") located in the first channel 110 of the respective pore 108. In some embodiments, the first conjunction interface 502 may be located in the first channel 110 of the pore 108 primarily near the second surface 104 of the nozzle plate 100. In some embodiments, the first conjunction interface 502 may extend along the entire length of the first channel 110 of the respective pore 108.

The first conjunction interface 502 may be configured to couple to another conjunction interface of a removable component, such as a removable connector, a removable nozzle (e.g., needle nozzle), or a removable closure structure. In some embodiments, the first conjunction interface 502 may therefore comprise a female or male threaded fitting, a female or male national pipe thread (NPT) fitting, a Luer Taper fitting, a ground joint, a female or male push-in connector, or any like fitting as would become apparent to one having skill in the art upon reading the present disclosure.

In some embodiments, the first conjunction interface 502 may comprise a female or male threaded fitting. In some embodiments, the first conjunction interface 502 may comprise a female or male national pipe thread (NPT) fitting. In some embodiments, the first conjunction interface 502 may comprise a Luer Taper fitting. In some embodiments, the first conjunction interface 502 may comprise a ground joint. In some embodiments, the first conjunction interface 502 may comprise a female or male push-in connector.

As also shown in FIGS. 5A-5B, the conjunction system 500 comprises a removable, intermediate connector 504 (the "second component"). The connector 504 comprises a second conjunction interface 506 that stably and removably couples to the first conjunction interface 502 of the respective pore 108. In some embodiments, the first and second conjunction interfaces 502, 506 may comprise corresponding male or female fittings. For instance, in one embodiment, the first conjunction interface 502 may comprise a female NPT fitting, and the second conjunction interface 506 may comprise a corresponding male NPT fitting. Accordingly, in some embodiments, the second conjunction interface 506 may comprise a corresponding male or female threaded fitting, a corresponding male or female pipe thread (NPT) fitting, a Luer Taper fitting, a ground joint, a corresponding male or female push-in connector, or any like fitting as would become apparent to one having skill in the art upon reading the present disclosure.

In some embodiments, the second conjunction interface 506 may comprise a corresponding male or female threaded fitting. In some embodiments, the second conjunction interface 506 may comprise a corresponding male or female national pipe thread (NPT) fitting. In some embodiments, the second conjunction interface 506 may comprise a Luer Taper fitting. In some embodiments, the second conjunction interface 506 may comprise a ground joint. In some embodiments, the second conjunction interface 506 may comprise a corresponding male or female push-in connector.

As shown in FIGS. 5A-5B, the connector 504 comprises a first region 508 in which the second conjunction interface 506 is located. The first region 508 also comprises a second channel 510. In some embodiments, the second channel 510 may be in fluidic communication with the first channel 110 of the pore 108. Accordingly, a fluid (e.g., a fluid to be formed into fiber) supplied to the nozzle plate 100, and particularly to the first surface 102 thereof, may be able to flow through at least the first and second channels 110, 510.

In some embodiments, the second channel 510 of the connector 504 may comprise a diameter (or maximum width, $w_{ch2}$) that is less than the diameter (or maximum width, $w_{ch1}$) of the first channel 110 of the respective pore 108. In some embodiments, the second channel 510 of the connector 504 may comprise a diameter (or maximum width, $w_{ch2}$) that is from about 0.1% to about 99% of the diameter (or maximum width, $w_{ch1}$).

In some embodiments, the second channel 510 of the connector 504 may comprise a diameter configured to form a fiber.

In some embodiments, the second channel 510 of the connector 504 may comprise a diameter (or maximum width, $w_{ch2}$) that may be at least about 10 µm, at least about 50 µm, at least about 100 µm, at least about 150 µm, at least about 200 µm, at least about 250 µm, at least about 300 µm, at least about 350 µm, at least about 400 µm, at least about 450 µm, at least about 500 µm, at least about 550 µm, at least about 600 µm, at least about 650 µm, at least about 700 µm, at least about 750 µm, at least about 800 µm, at least about 850 µm, at least about 900 µm, at least about 950 µm, at least about 0.1 cm, at least about 0.5 cm, at least about 1 cm, at least about 1.5 cm, at least about 2 cm.

In some embodiments, the diameter (or maximum width, $w_{ch2}$) of the second channel 510 of the connector 504 may be in a range from about 10 µm to about 2 cm. In some embodiments, the diameter (or maximum width, $w_{ch2}$) of the second channel 510 of the connector 504 may be in a range from about 50 µm to about 1 cm. In some embodiments, the diameter (or maximum width, $w_{ch2}$) of the second channel 510 may be in a range including and between any two of the following: about 10 µm, about 20 µm, about 40 µm, about 60 µm, about 80 µm, about 100 µm, about 120 µm, about 140 µm, about 160 µm, about 180 µm, about 200 µm, about 220 µm, about 240 µm, about 260 µm, about 280 µm, about 300 µm, about 320 µm, about 340 µm, about 360 µm, about 380 µm, about 400 µm, about 420 µm, about 440 µm, about 460 µm, about 480 µm, about 500 µm, about 520 µm, about 540 µm, about 560 µm, about 580 µm, about 600 µm, about 620 µm, about 640 µm, about 660 µm, about 680 µm, about 700 µm, about 720 µm, about 740 µm, about 760 µm, about 780 µm, about 800 µm, about 820 µm, about 840 µm, about 860 µm, about 880 µm, about 900 µm, about 0.1 cm, about 0.2 cm, about 0.4 cm, about 0.8 cm, about 1 cm, about 1.2 cm, about 1.4 cm, about 1.6 cm, about 1.8 cm, and about 2 cm.

In some embodiments, the shape of the first region 508 of the connector 504 may be substantially the same and/or substantially mirror the shape of the respective pore 108 to allow the first region 508 of the connector 504 to effectively couple with the pore 108.

In some embodiments, at least a part/portion of the first region 508 of the connector 504 may extend a predetermined amount beyond (e.g., protrude below) the second surface 104 of the nozzle plate 100. For instance, as shown, in the embodiment of FIG. 5A-5B, the first region 508 of the connector 504 may comprise an upper surface 508a and a lower surface 508b. The lower surface 508b of the first region 508 of the connector 504 may extend a certain distance, $d_r$, below/lower than the second surface 104 of the nozzle plate 100. The upper surface 508a of the first region 508 of the connector 504 may also extend a certain distance above/higher than the second surface 104 of the nozzle plate 100 and up to the first surface 102 thereof.

As further shown in FIGS. 5A-5B, the connector 504 may additionally comprise a second region 512 positioned below the first region 508. The second region 512 may be located below the second surface 104 of the nozzle plate 100. In some embodiments, at least a portion of the second region 512 may also be vertically offset from the first region 508 of the connector 504, and in contact with, or in close proximity to, the second surface 104 of the nozzle plate 100.

The second region 512 of the connector 504 may comprise a third conjunction interface 514 and a third channel 516. In some embodiments, the third conjunction interface 514 may comprise a female or male threaded fitting, a female or male national pipe thread (NPT) fitting, a Luer Taper fitting, a ground joint, a female or male push-in connector, or any like fitting as would become apparent to one having skill in the art upon reading the present disclosure.

In some embodiments, the third conjunction interface 514 may comprise a female or male threaded fitting. In some embodiments, the third conjunction interface 514 may comprise a female or male national pipe thread (NPT) fitting. In some embodiments, the third conjunction interface 514 may comprise a Luer Taper fitting. In some embodiments, the third conjunction interface 514 may comprise a ground joint. In some embodiments, the third conjunction interface 514 may comprise a female or male push-in connector. In some embodiments, the third conjunction interface 514 of the connector 504 may comprise the same type of fitting/fastener as the first conjunction interface 110 of the pore 108.

In some embodiments, the third channel 516 of the connector 504 may comprise a diameter (or maximum width, $w_{ch3}$) that is greater than the diameter (or maximum width, $w_{ch2}$) of the second channel 510 of the connector 504. In some embodiments, the diameter (or maximum width, $w_{ch3}$) of the third channel 516 may be about equal to or greater than the diameter (or maximum width, $w_{ch1}$) of the first channel 110 of the respective pore 108. In some embodiments, the diameter (or maximum width, $w_{ch3}$) of the third channel 516 may be about equal to the diameter (or maximum width, $w_{ch1}$) of the first channel 110 of the respective pore 108. In some embodiments, the diameter (or maximum width, $w_{ch3}$) of the third channel 516 may be greater than the diameter (or maximum width, $w_{ch1}$) of the first channel 110 of the respective pore 108.

In some embodiments, the connector 504 may be comprised of a metal, metal alloy, ceramic, plastic, wood, glass, any combinations thereof, etc. In some embodiments, the connector 504 may be comprised of the same material, or comprise one or more of the same materials, as the nozzle plate 100.

The conjunction system 500 may additionally comprise a removable third component configured to extrude or prevent the extrusion of a fiber. As shown in the embodiment of FIG. 5A, this third component may be a nozzle 518. The nozzle 518 may comprise a fourth conjunction interface 520 that stably and removable couples to the third conjunction interface 514 of the connector 504. In some embodiments, the third and fourth conjunction interfaces 514, 520 may comprise corresponding male or female fittings. For instance, in one embodiment, the third conjunction interface 514 may comprise a female NPT fitting, and the fourth conjunction interface 520 may comprise a corresponding male NPT fitting. Accordingly, in some embodiments, the fourth conjunction interface 520 may comprise a corresponding male or female threaded fitting, a corresponding male or female pipe thread (NPT) fitting, a Luer Taper fitting, a ground joint, a corresponding male or female push-in connector, or any like fitting as would become apparent to one having skill in the art upon reading the present disclosure.

In some embodiments, the fourth conjunction interface 520 may comprise a corresponding male or female threaded fitting. In some embodiments, the fourth conjunction interface 520 may comprise a corresponding male or female national pipe thread (NPT) fitting. In some embodiments, the fourth conjunction interface 520 may comprise a Luer Taper fitting. In some embodiments, the fourth conjunction interface 520 may comprise a ground joint. In some embodiments, the fourth conjunction interface 520 may comprise a corresponding male or female push-in connector.

The nozzle 518 may also comprise a fourth channel 522. In some embodiments, the fourth channel 522 may be in fluidic communication with the first channel 110 of the pore 108 and the second channel 510 of the connector 504. Accordingly, a fluid (e.g., a fluid to be formed into fiber) supplied to the nozzle plate 100, and particularly to the first surface 102 thereof, may be able to flow through the first, second, and fourth channels 110, 510, 522.

In some embodiments, the fourth channel 522 of the nozzle 518 may comprise a diameter (or maximum width, $w_{ch4}$) that is less than the diameter (or maximum width, $w_{ch1}$) of the first channel 110 of the respective pore 108. In some embodiments, the fourth channel 522 of the connector 504 may comprise a diameter (or maximum width, $w_{ch4}$) that is from about 0.1% to about 99% of the diameter (or maximum width, $w_{ch1}$) of the first channel 110 of the respective pore 108.

In some embodiments, the fourth channel 522 of the nozzle 518 may comprise a diameter (or maximum width, $w_{ch4}$) that is smaller than, about equal to, or greater than the diameter (or maximum width, $w_{ch2}$) of the second channel 510 of the connector 504. In some embodiments, the diameter (or maximum width, $w_{ch4}$) of the fourth channel 522 of the nozzle 518 may be about equal to the diameter (or maximum width, $w_{ch2}$) of the second channel 510 of the connector 504. In some embodiments, the diameter (or maximum width, $w_{ch4}$) of the fourth channel 522 of the nozzle 518 and/or the diameter (or maximum width, $w_{ch2}$) of the second channel 510 of the connector 504 may be less than about 3 cm.

In some embodiments, the fourth channel 522 of the nozzle 518 comprises a diameter configured to form a fiber.

In some embodiments, the fourth channel 522 of the nozzle 518 may comprise a diameter (or maximum width, $w_{ch4}$) that may be at least about 10 µm, at least about 50 µm, at least about 100 µm, at least about 150 µm, at least about 200 µm, at least about 250 µm, at least about 300 µm, at least about 350 µm, at least about 400 µm, at least about 450 µm, at least about 500 µm, at least about 550 µm, at least about 600 µm, at least about 650 µm, at least about 700 µm, at least about 750 µm, at least about 800 µm, at least about 850 µm, at least about 900 µm, at least about 950 µm, at least about 0.1 cm, at least about 0.5 cm, at least about 1 cm, at least about 1.5 cm, at least about 2 cm.

In some embodiments, the diameter (or maximum width, $w_{ch4}$) of the fourth channel 522 of the nozzle 518 may be in a range from about 10 µm to about 2 cm. In some embodiments, the diameter (or maximum width, $w_{ch2}$) of the fourth channel 522 of the nozzle 518 may be in a range from about 50 µm to about 1 cm. In some embodiments, the diameter (or maximum width, $w_{ch2}$) of the fourth channel 522 may be in a range including and between any two of the following: about 10 µm, about 20 µm, about 40 µm, about 60 µm, about 80 µm, about 100 µm, about 120 µm, about 140 µm, about 160 µm, about 180 µm, about 200 µm, about 220 µm, about 240 µm, about 260 µm, about 280 µm, about 300 µm, about 320 µm, about 340 µm, about 360 µm, about 380 µm, about 400 µm, about 420 µm, about 440 µm, about 460 µm, about 480 µm, about 500 µm, about 520 µm, about 540 µm, about 560 µm, about 580 µm, about 600 µm, about 620 µm, about 640 µm, about 660 µm, about 680 µm, about 700 µm, about 720 µm, about 740 µm, about 760 µm, about 780 µm, about 800 µm, about 820 µm, about 840 µm, about 860 µm, about 880 µm, about 900 µm, about 0.1 cm, about 0.2 cm, about 0.4 cm, about 0.8 cm, about 1 cm, about 1.2 cm, about 1.4 cm, about 1.6 cm, about 1.8 cm, and about 2 cm.

Figure 6A:
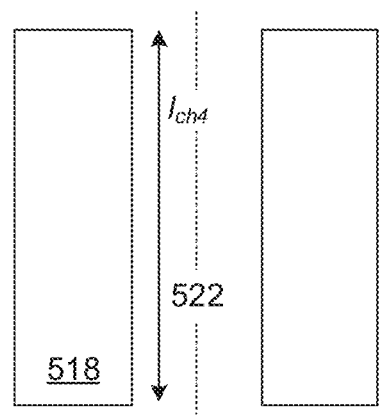
FIG. 6A shows an exploded, cross-sectional view of a pore having a substantially uniform diameter along a length thereof, according to one embodiment.

In some embodiments, the average diameter, maximum width, and/or average width of the fourth channel 522 of the nozzle 518 may be substantially uniform along the length, $l_{ch4}$, thereof (see, e.g., FIG. 6A).

Figure 6B:
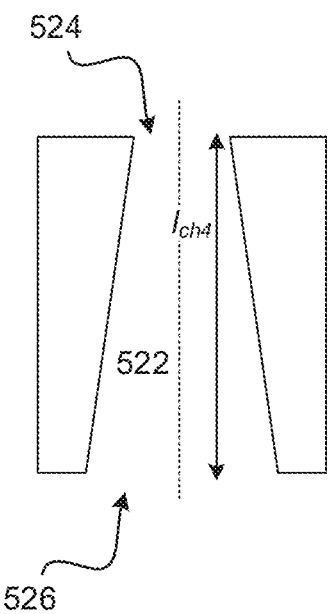
FIGS. 6B-6C show an exploded, cross-sectional view of a pore having a diameter that increases from an input to an output end thereof, according to one embodiment.
Figure 6C:
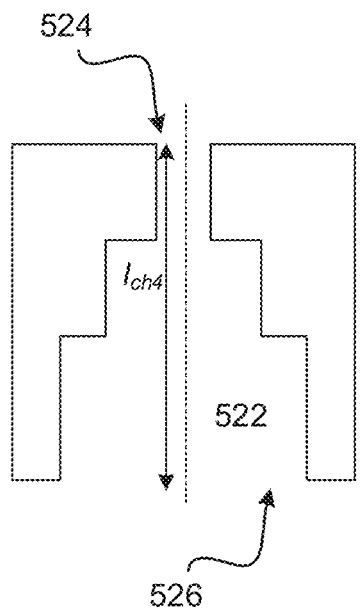
Figure 6D:
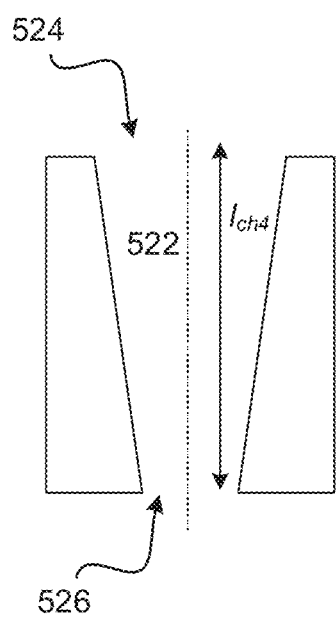
FIGS. 6D-6E show an exploded, cross-sectional view of a pore having a diameter that decreases from an input to an output end thereof, according to one embodiment.
Figure 6E:
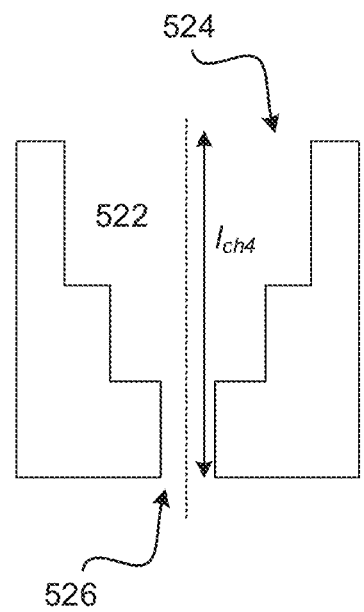

In some embodiments, the average diameter, maximum width, and/or average width fourth channel 522 of the nozzle 518 may not be substantially uniform along the length, $l_{ch4}$, thereof. For instance, the nozzle 518 may comprise an input end 524 configured to receive a fluid and an output end 526 from which the fluid may be extruded/spun to form a fiber. In some embodiments, the average diameter, maximum width, and/or average width of the fourth channel 522 of the nozzle 518 may increase from the input end 524 to the output end 526 of the nozzle 518 (see, e.g., FIGS. 6B-6C). In some embodiments, the average diameter, maximum width, and/or average width of the fourth channel 522 of the nozzle 518 may decrease from the input end 524 to the output end 526 of the nozzle 518 (see, e.g., FIGS. 6D-6E).

In some embodiments, the shape of the nozzle 518, and particularly fourth channel 522 thereof, may have any suitable shape as described herein. In some embodiments, the shape of the fourth channel 522 of the nozzle 518 may be a shape as described in FIGS. 2A-2H, or an irregular shape.

In some embodiments, the nozzle 518 may be comprised of a metal, metal alloy, ceramic, plastic, wood, glass, any combinations thereof, etc. In some embodiments, the nozzle 518 may be comprised of the same material, or comprise or one or more of the same materials, as the nozzle plate 100 and/or the connector 504.

In some embodiments the nozzle 518 may be any suitable nozzle (e.g., a needle nozzle, coaxial nozzle, conducting nozzle, non-conducting nozzle, etc.) configured to form fibers via spinning techniques (wet spinning, dry spinning, gel spinning, electrospinning, etc.) as known in the art.

In some embodiments, more than one nozzle 518 may be removably coupled to the connector 504, and particularly the third conjunction interface 514 thereof.

FIG. 5B provides an embodiment in which the third, removable component of the conjunction system 500 is a closure structure 528. The closure structure 528 may comprise a fifth conjunction interface 530 that stably and removable couples to the third conjunction interface 514 of the connector 504. In some embodiments, the third and fifth conjunction interfaces 514, 530 may comprise corresponding male or female fittings. For instance, in one embodiment, the fifth conjunction interface 530 may comprise a female NPT fitting, and fifth conjunction interface 530 may comprise a corresponding male NPT fitting. Accordingly, in some embodiments, the fifth conjunction interface 530 may comprise a corresponding male or female threaded fitting, a corresponding male or female pipe thread (NPT) fitting, a Luer Taper fitting, a ground joint, a corresponding male or female push-in connector, or any like fitting as would become apparent to one having skill in the art upon reading the present disclosure.

In some embodiments, fifth conjunction interface 530 may comprise a corresponding male or female threaded fitting. In some embodiments, fifth conjunction interface 530 may comprise a corresponding male or female national pipe thread (NPT) fitting. In some embodiments, fifth conjunction interface 530 may comprise a Luer Taper fitting. In some embodiments, fifth conjunction interface 530 may comprise a ground joint. In some embodiments, fifth conjunction interface 530 may comprise a corresponding male or female push-in connector.

As shown in FIG. 5B, the closure structure 528 does not comprise any channel, and thus prevents the flow of any fluid therethrough. For instance, in embodiments in which a fluid (e.g., a fluid to be formed into fiber) is supplied to the nozzle plate 100, and particularly to the first surface 102 thereof, the fluid may flow through at least the first and second channels 110, 510 of the pore and connector 504, respectively. However, where a removable closure structure 528 is coupled to the connector 504, the fluid will not be allowed to flow through said closure structure and exit the nozzle plate 100.

In some embodiments, the closure structure 528 may be a plug, a head screw or any like fastener as would become apparent to one having skill in the art upon reading the present disclosure.

In some embodiments, the closure structure 528 may be comprised of a metal, metal alloy, ceramic, plastic, wood, glass, any combinations thereof, etc. In some embodiments, the closure structure 528 may be comprised of the same material, or comprise or one or more of the same materials, as the nozzle plate 100 and/or the connector 504 and/or the nozzle 518.

In embodiments in which the conjunction system 500 comprises at least one nozzle 518 removably coupled to the connector 504, the conjunction system is considered to be in an "on configuration" that allows for the formation (extrusion/spinning) of fibers. In embodiments in which the conjunction system 500 comprises a closure structure 528 removably coupled to the connector 504, the conjunction system 500 is considered to be in an "off configuration" that prevents the formation (extrusion/spinning) of fibers. One advantage of such conjunction system 500, is that the on and off configuration is selectable given that the nozzle 518 and closure structure 528 are each removable and thus may be attached to the connector 504 at will. Accordingly, in embodiments in which at least some of the pores 108 of the nozzle plate 100 each comprises a conjunction system 500, the conjunction systems 500 may each be individually/independently selected to be in the "on" or "off" configuration, thereby allowing a greater degree of control in the characteristics and complexity of the resulting fiber pattern.

Figure 7A:
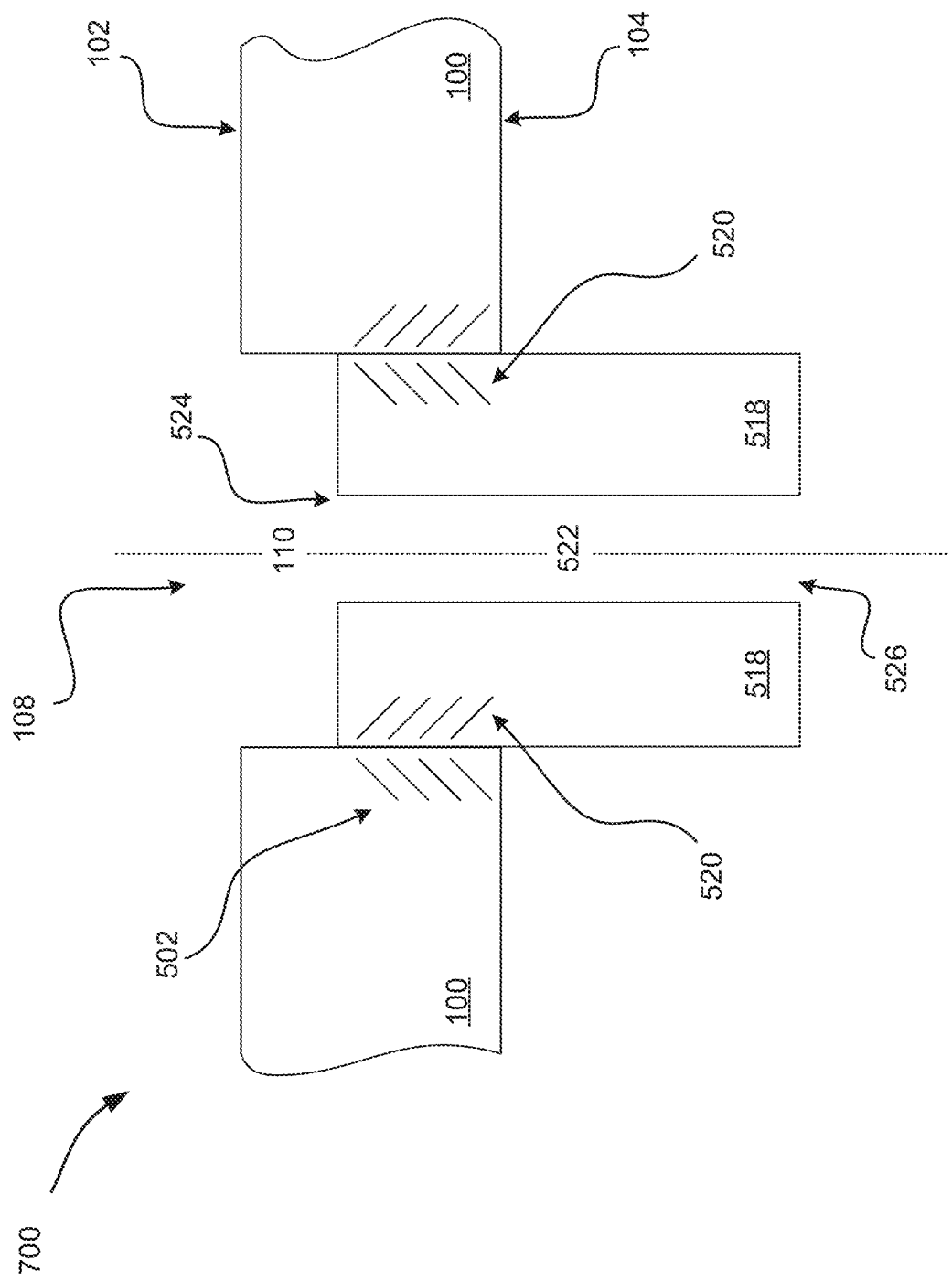
FIGS. 7A-7B show an exploded, cross-sectional view of a pore comprising a two-component conjunction system, according to one embodiment.
Figure 7B:
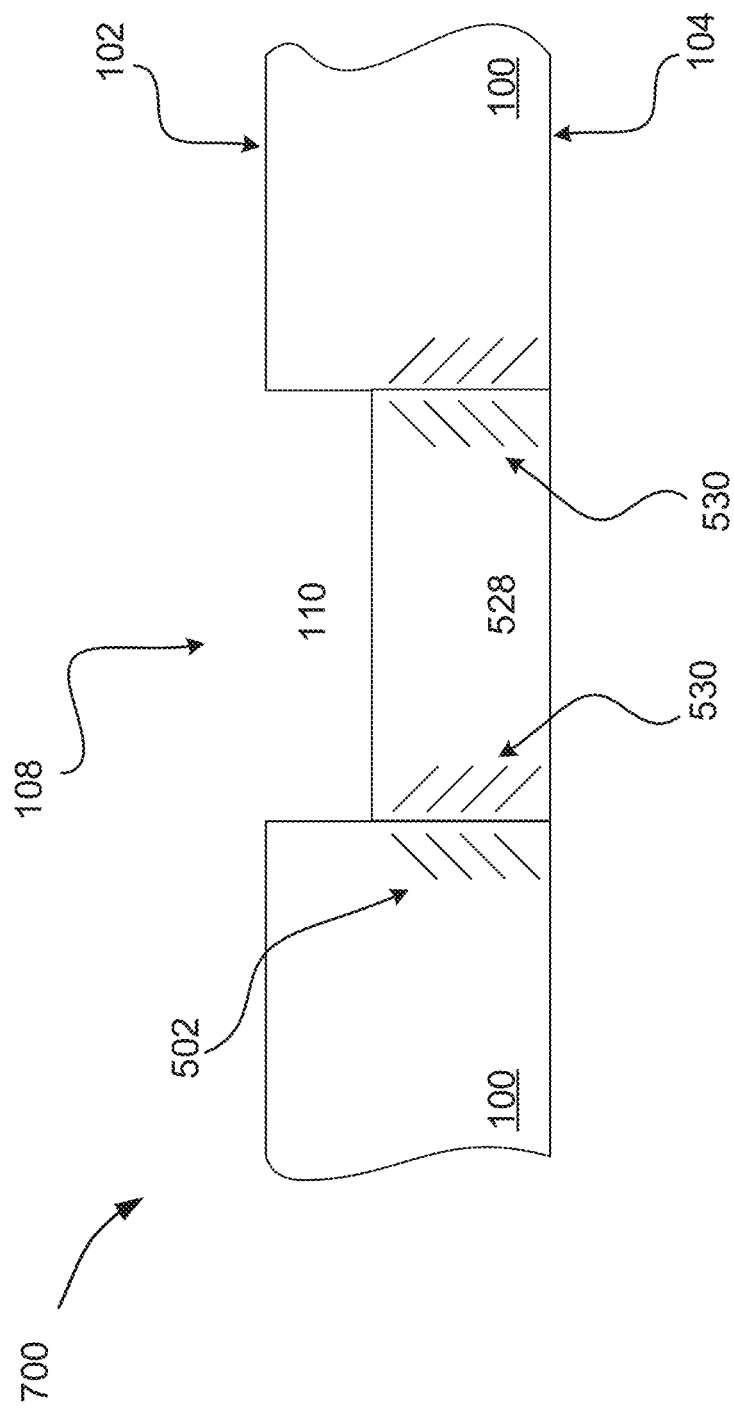

FIGS. 7A-7B provide an exploded, cross-sectional view of a pore 108 comprising a two-component conjunction system 700 according to one exemplary embodiment. The two-component conjunction system 700 does not comprise the intermediate, removable connector 504 of the three-component conjunction system 500 of FIGS. 5A-5B, but is otherwise substantially the same. As the two-component conjunction system 700 is a variation of the three-component conjunction system 500, like components and features are assigned the same reference number.

As shown in FIGS. 7A-7B, the conjunction system 700 comprises a first conjunction interface 502 ("first component"), as described herein, located in the first channel 110 of the respective pore 108. Given that the conjunction system 700 does not comprise a connector 504, as described herein, the first conjunction interface may be directly coupled to the corresponding conjunction interface of a removable nozzle 518, as described herein, or the corresponding conjunction interface of a removable closure structure 528, as described herein.

FIG. 7A shows an embodiment in which the fourth conjunction interface 520 of a nozzle 518 is stably and removably coupled to the first conjunction interface 110 of the respective pore 108. The conjunction system 700 as embodied in FIG. 7A is accordingly in the "on" configuration and thus capable of fiber formation. In some embodiments, the average diameter, maximum width, and/or average width of the fourth channel 522 of the nozzle 518 may be substantially uniform along the length, $l_{ch4}$, thereof (see, e.g., FIG. 6A), may increase from the input end 524 to the output end 526 of the nozzle 518 (see, e.g., FIGS. 6B-6C), or may decrease from the input end 524 to the output end 526 of the nozzle 518 (see, e.g., FIGS. 6D-6E). Moreover, the shape of the nozzle 518, and particularly fourth channel 522 thereof, may have any suitable shape as described herein, such as those described in FIGS. 2A-2H, or an irregular shape.

FIG. 7B shows an embodiment in which the fifth conjunction interface 530 of a closure structure 528, as described herein, is stably and removably coupled to the first conjunction interface 110 of the respective pore 108. The conjunction system 700 as embodied in FIG. 7B is accordingly in the "off" configuration and thus prohibits/prevents fiber formation.

Figure 8A:
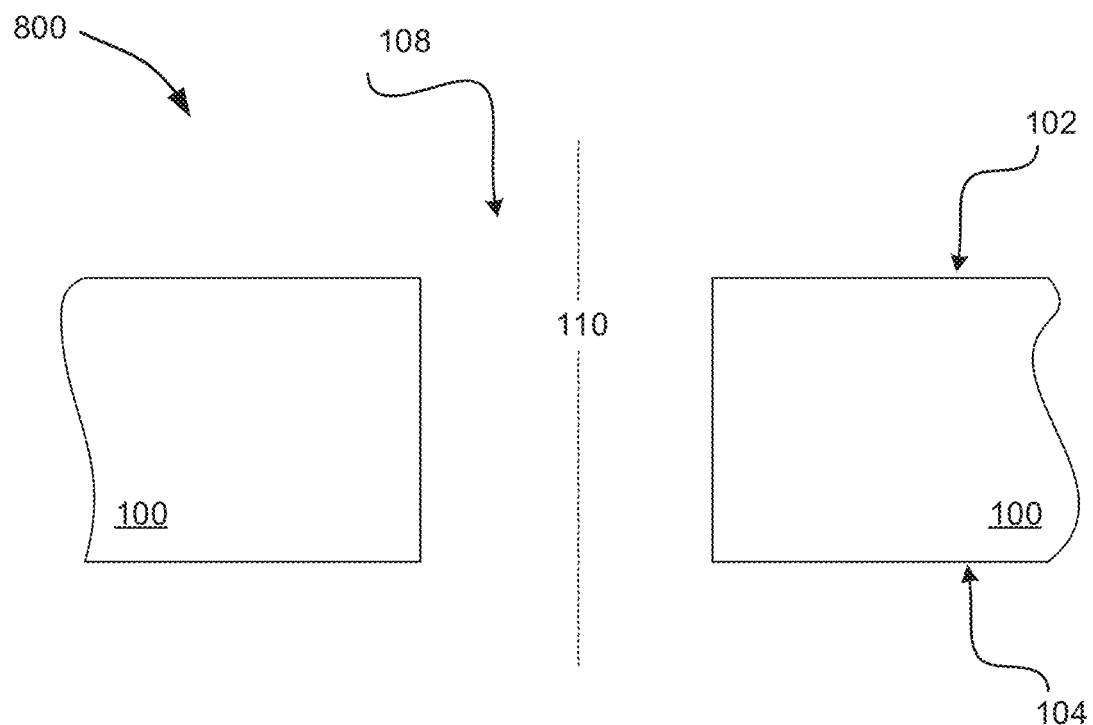
FIGS. 8A-8B show an exploded, cross-sectional view of a pore comprising a one-component conjunction system, according to one embodiment.
Figure 8B:
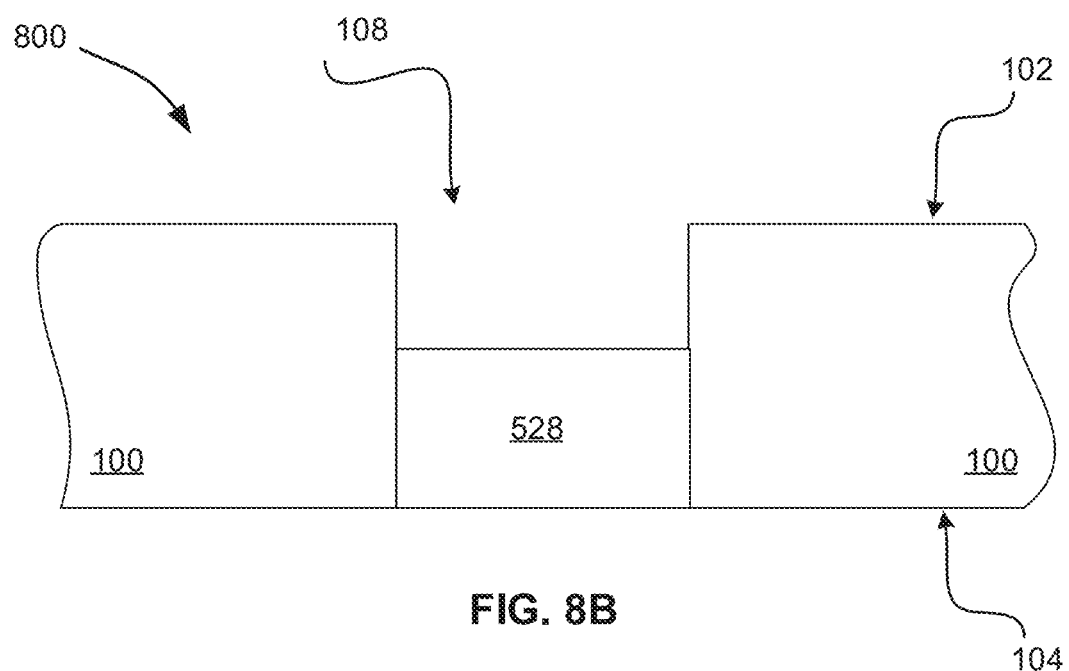

FIGS. 8A-8B provide an exploded, cross-sectional view of a pore 108 comprising a one-component conjunction system 800 according to one exemplary embodiment. For the conjunction system 800, the pore 108 provides the flow channel for the fluid (e.g., extrusion/spinning solution), as particularly shown in FIG. 8A. In some embodiments, the shape of the flow channel may have any suitable shape as described herein, such as those described in FIGS. 2A-2H, or an irregular shape. In some embodiments, the shape of the flow channel may be selected based on the desired shape of the fibers to be extruded. Additionally, in some embodiments, the average diameter, maximum width, and/or average width of this flow channel may be substantially uniform or non-uniform along the length thereof.

FIG. 8B shows an embodiment in which a closure structure 528, as described herein, is inserted in, and effectively plugs, the pore 108 so as to prevent the flow of any fluid therethrough.

Again with reference to FIGS. 1A-1B, the nozzle plate 100 may comprise a plurality of pores 108, each of which may independently comprise a conjunction system as described herein (e.g., conjunction systems 500, 700, or 800). In some embodiments, each of the pores 108 may comprise the same type of conjunction system. In some embodiments, at least two of the pores 108 may comprise different conjunction systems from one another.

As evident from the preceding FIGS., one advantage of the nozzle plate 100 is the degree of customizability of each of the components thereof. For instance, the shape and size of the nozzle plate 100 may be customized, as well as the pattern/arrangement of the pores 108. Further, each pore 108 may be individually/independently customized at least with respect to: shape, size, and the type of conjunction system (e.g., conjunction systems 500, 700, or 800). Further still, the conjunction systems of the pores may be each individually/independently selected to be in an "on" configuration to allow fiber formation, or in an "off" configuration to prevent fiber formation.

For example, in some embodiments, the nozzle plate 100 may comprise a plurality of pores 108, wherein i) at least one of the pores 108 comprises a three-component conjunction system 500 as described, e.g., in FIGS. 5A-5B, and at least one of the pores 108 comprises a two-component conjunction system 700 as described, e.g., in FIGS. 7A-7B;

ii) at least one of the pores 108 comprises a three-component conjunction system 500, and at least one of the pores 108 comprises a one-component conjunction system 800 as described, e.g., in FIGS. 8A-8B;

iii) at least one of the pores 108 comprises a two-component conjunction system 700, and at least one of the pores 108 comprises a one-component conjunction system 800; or iv) at least at least one of the pores 108 comprises a three-component conjunction system 500, at least one of the pores 108 comprises a two-component conjunction system 700, and at least one of the pores 108 comprises a one-component conjunction system 800.

It is of note, that the conjunction systems (whether conjunction system 500, 700, or 800) may each independently be in an "on" configuration (e.g., have a nozzle coupled thereto) or in an "off" configuration (e.g., have a closure structure coupled thereto).

Figure 9A:
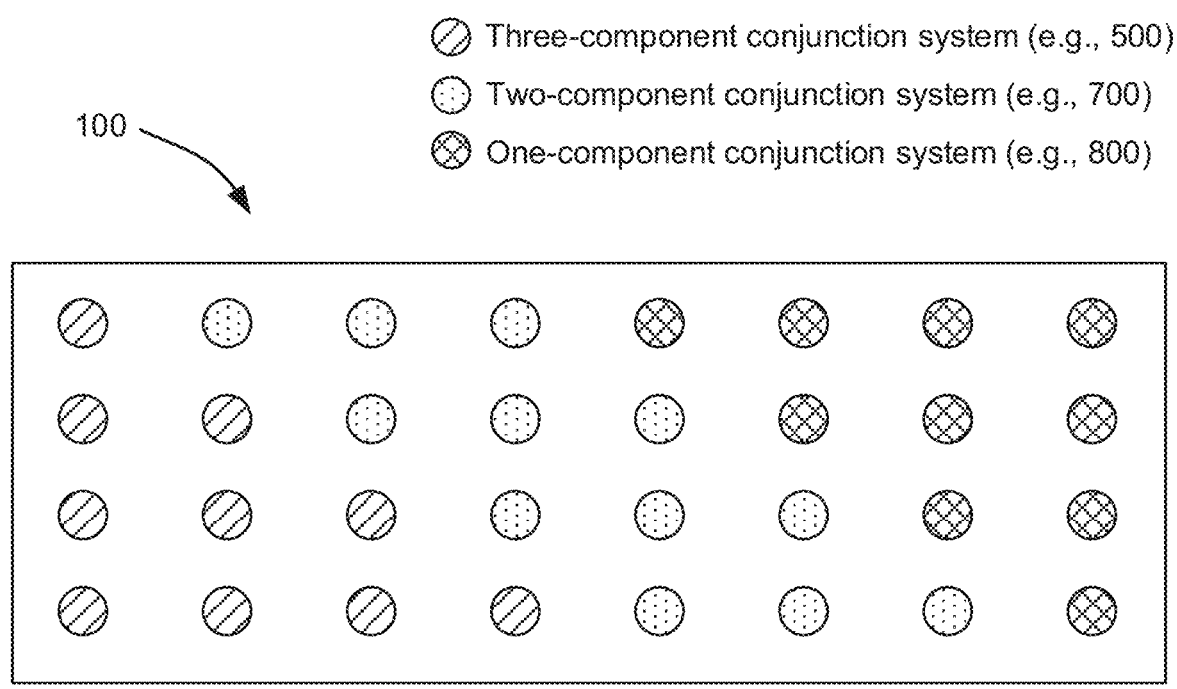
FIG. 9A shows a nozzle plate comprising a substantially rectangular shape with pores arranged in a substantially rectangular pattern, where a first plurality of the pores each comprise a three-component conjunction system, a second plurality of the pores each comprise a two-component conjunction system, and a third plurality of the pores each comprise a one-component conjunction system, according to one embodiment.

FIG. 9A provides an illustrative embodiment in which the nozzle plate 100 comprises a substantially rectangular shape with pores 108 arranged in a substantially rectangular pattern, wherein: a first plurality of the pores 108 each comprise a three-component conjunction system 500 as described, e.g., in FIGS. 5A-5B; a second plurality of the pores 108 each comprise a two-component conjunction system 700 as described, e.g., in FIGS. 7A-7B; and a third plurality of the pores 108 each comprise a one-component junction system 800 as described, e.g., in FIGS. 8A-8B.

Figure 9B:
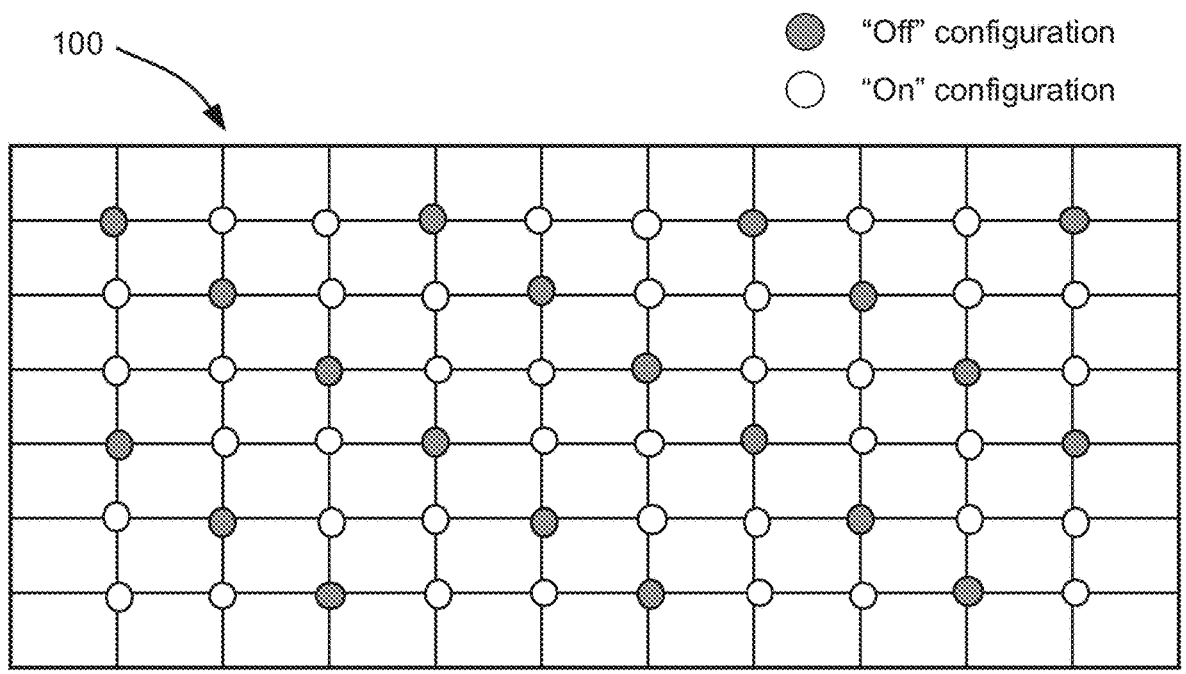
FIG. 9B shows a nozzle plate comprising a substantially rectangular shape with pores arranged in a substantially rectangular pattern, where each pore comprises a conjunction system configured in either an "on" or "off" configuration, according to one embodiment.

FIG. 9B provides another illustrative embodiment in which the nozzle plate 100 comprises a substantially rectangular shape with pores 108 arranged in a substantially rectangular pattern, where some of the conjunction systems of said pores 108 are in the "on" configuration and some are in the "off" configuration. As noted above, the conjunction systems, whether in the "on" of "off" configuration, may each independently be a three-component conjunction system 500, a two-component conjunction system 700, or a one-component conjunction system 800.

Figure 9C:
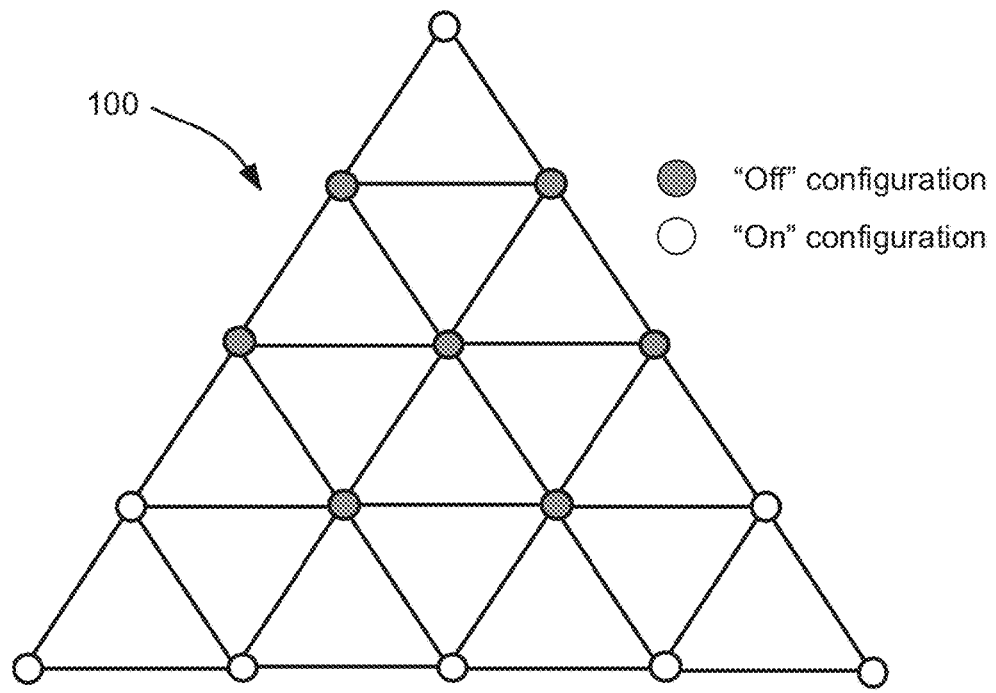
FIG. 9C shows a nozzle plate comprising a substantially triangular shape with pores arranged in a substantially triangular pattern, where each pore comprises a conjunction system configured in either an "on" or "off" configuration, according to one embodiment.

FIG. 9C provides yet another illustrative embodiment in which the nozzle plate 100 comprises a substantially triangular shape with pores 108 arranged in a substantially triangular pattern, where some of the conjunction systems of said pores 108 are in the "on" configuration and some are in the "off" configuration. Again, as noted above, the conjunction systems, whether in the "on" of "off" configuration, may each independently be a three-component conjunction system 500, a two-component conjunction system 700, or a one-component conjunction system 800.

The availability of such unique customization enables characteristics (e.g., fiber diameters, fiber shapes, complexity of the resulting fiber patterns, etc.) of the extruded fibers to be tailored and/or finely tuned.

In yet further embodiments, the nozzle plate 100 may be configured for use with one or more additional nozzle plate 100, as discussed in greater detail below.

2. Scaffold

Figure 10A:
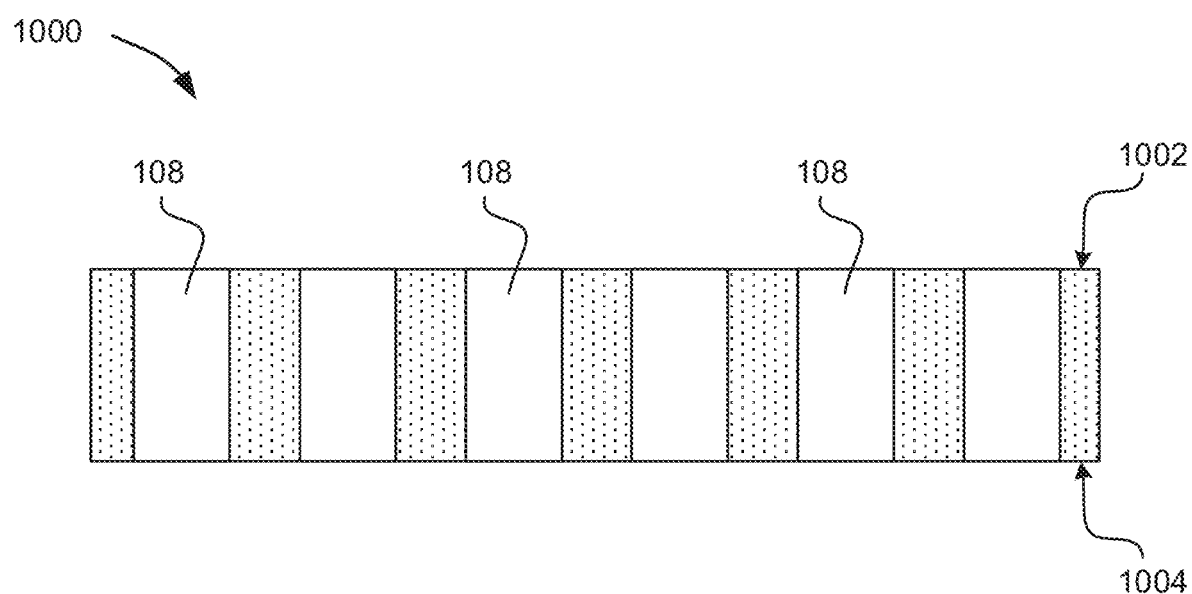
FIG. 10A shows a cross-sectional side view of a kit of parts configured for fiber formation, according to one embodiment.
Figure 10B:
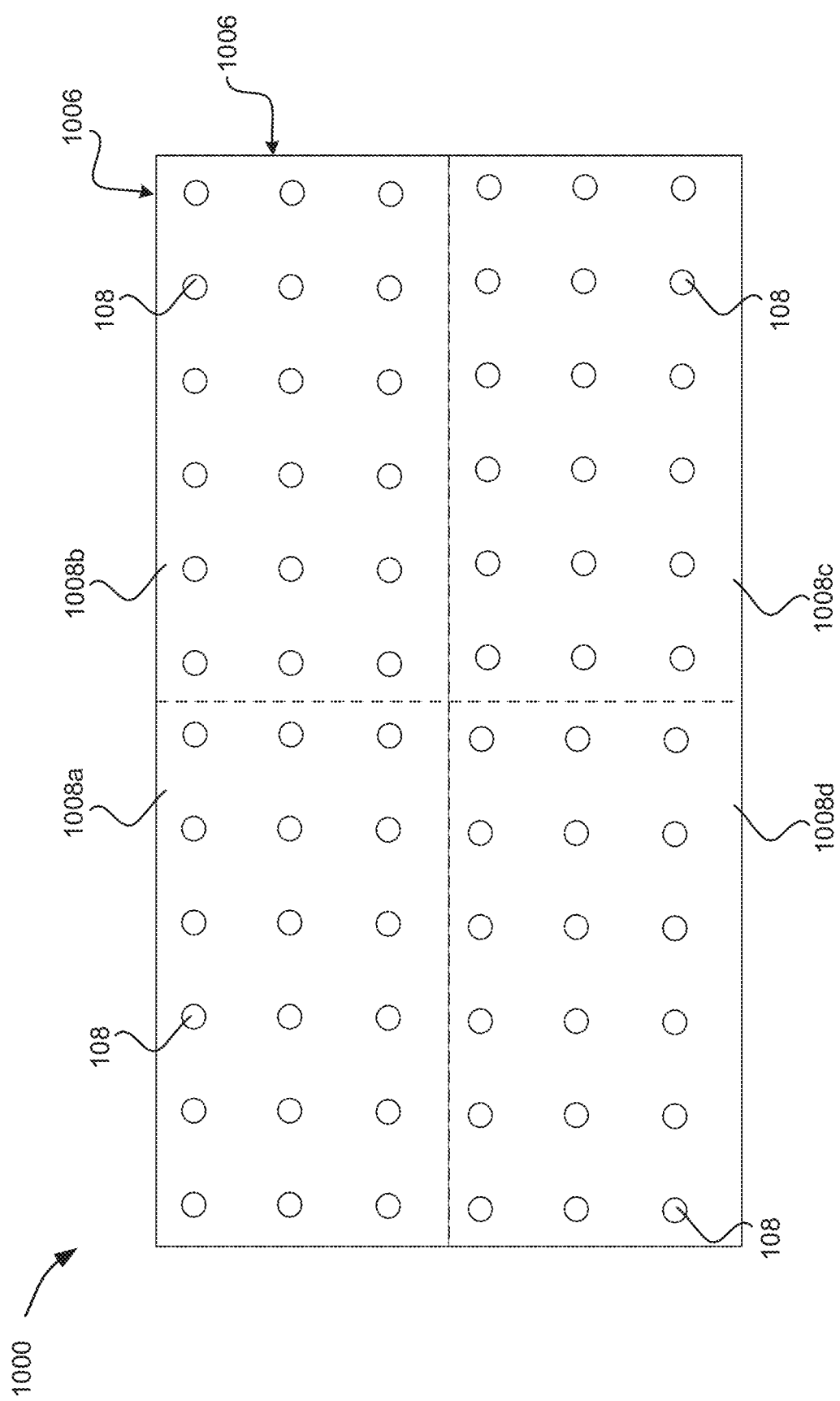
FIG. 10B shows a tope view of the kit of parts, according to one embodiment.

Referring now to FIGS. 10A-10B, a cross-sectional, side view of a scaffold 1000 (FIG. 10A) and a top view of the scaffold 1000 (FIG. 10B) is shown in accordance with one embodiment. The scaffold 1000 or components/features thereof may be implemented in combination with, or as an alternative to, other devices/features/components described herein, such as those described with reference to other embodiments and FIGS. The scaffold 1000 may additionally be utilized in any of the methods for making and/or using such devices/components/features described herein. The scaffold 1000 may also be used in various applications and/or in permutations, which may or may not be noted in the illustrative embodiments described herein. For instance, the scaffold 1000 may include more or less features/components than those shown in FIGS. 10A-10B, in some embodiments. Moreover, the scaffold 1000 is not limited to the size, shape, number of components, etc. specifically shown in FIGS. 10A-10B.

It is of note that the scaffold 1000 may comprise features/components as described in the preceding FIGS, thus like components and features are assigned the same reference number.

As shown in FIGS. 10A-10B, the scaffold 1000 comprises first and second opposite surfaces 1002, 1004. In some embodiments, the first and second surfaces 1002, 1004 are oriented substantially parallel with one another. In some embodiments, the first surface 1002 and/or the second surface 1004 may have one or more curved (e.g., convex or concave) regions.

As show in the embodiment of FIGS. 10A-10B, the scaffold 1000, and particularly the outer periphery 1006 thereof, may have a substantially rectangular shape. However, in some embodiments, the scaffold 1000 may have a shape as described in FIGS. 2A-2H, or an irregular shape (not shown).

As also shown in FIGS. 10A-10B, the scaffold 100 comprises one or more pores 108, as described herein, and which extend through the first and second surfaces 1004, 1006. In some embodiments, each pore 108 of the scaffold 1000 may independently comprise a conjunction system, as described herein.

In some embodiments, at least one of the pores 108 of the scaffold 1000 may have a conjunction system in the "on" configuration, as described herein. In some embodiments, a plurality of the pores 108 of the scaffold 1000 may have a conjunction system in the "on" configuration, as described herein. In some embodiments, each of the pores 108 of the scaffold 1000 may have a conjunction system in the "on" configuration, as described herein.

In some embodiments, at least one of the pores 108 of the scaffold 1000 may have a conjunction system in the "off" configuration, as described herein. In some embodiments, a plurality of the pores 108 of the scaffold 1000 may have a conjunction system in the "off" configuration, as described herein. In some embodiments, each of the pores 108 of the scaffold 1000 may have a conjunction system in the "off" configuration, as described herein.

In some embodiments, at least one of the pores 108 of the scaffold 1000 may have a conjunction system in the "on" configuration, as described herein, and at least one of the pores 108 may have a conjunction system in the "off" configuration. In some embodiments, a first plurality of the pores 108 of the scaffold 1000 may have a conjunction system in the "on" configuration, as described herein, and a second plurality of the pores 108 may have a conjunction system in the "off" configuration.

As additionally shown in FIGS. 10A-10B, the scaffold 1000 may comprise one of more sections 1008a-1008d.

While only four sections are shown in FIGS. 10A-10B, it is of note that the scaffold may comprise more of less sections as desired.

In the embodiment of FIGS. 10A-10B, each of the sections 1008a-1008d may comprise at least one of the pores 108. However, in other embodiments, the scaffold 1000 may comprise one of more sections that have no pores 108.

For each section of the scaffold 1000 comprising pores 108 (e.g., sections 1008a-1008d), the pores 108 therein may be arranged according to a predetermined pattern. For instance, as shown in FIGS. 10A-10B, the pores 108 of each section 1008a-1008d may be arranged according to a rectangular pattern. In some embodiments, each section of the scaffold 100 may independently have a pattern of pores 108 as described in FIGS. 4A-4H, a combination of one or more of the patterns as described in FIGS. 4A-4H, or a random or irregular pattern (see, e.g., 4L).

In some embodiments, each of the pore-containing sections (e.g., sections 1008a-1008d) of the scaffold 1000 may comprise substantially the same pattern as one another. In some embodiments, at least two of the pore-containing sections of the scaffold 100 may comprise different patterns as one another. In some embodiments, each of the pore-containing sections of the scaffold 1000 may comprise the same pattern as one another. In some embodiments, at least one of the sections of the scaffold 100 may comprise pores arranged according to a random pattern.

In some embodiments, the number of pores 108 in each pore-containing section may be independently varied. In some embodiments, each pore-containing section may comprise the same number of pores. In some embodiments, at least two pore-containing sections may comprise a different number of pores. In some embodiments, each of the pore-containing sections may comprise a different number of pores.

In some embodiments, each section of the scaffold 1000 may have a substantially rectangular shape, as shown, e.g., in FIGS. 10A-10B. However, in some embodiments, each section of the scaffold 1000 may independently have a shape as described in FIGS. 2A-2H, or an irregular shape (not shown).

In some embodiments, each section of the scaffold 1000 may have substantially the same shape. In some embodiments, at least two sections of the scaffold 1000 may comprise different shapes as one another. In some embodiments, each section of the scaffold 1000 may have different shapes as one another.

Figure 11A:
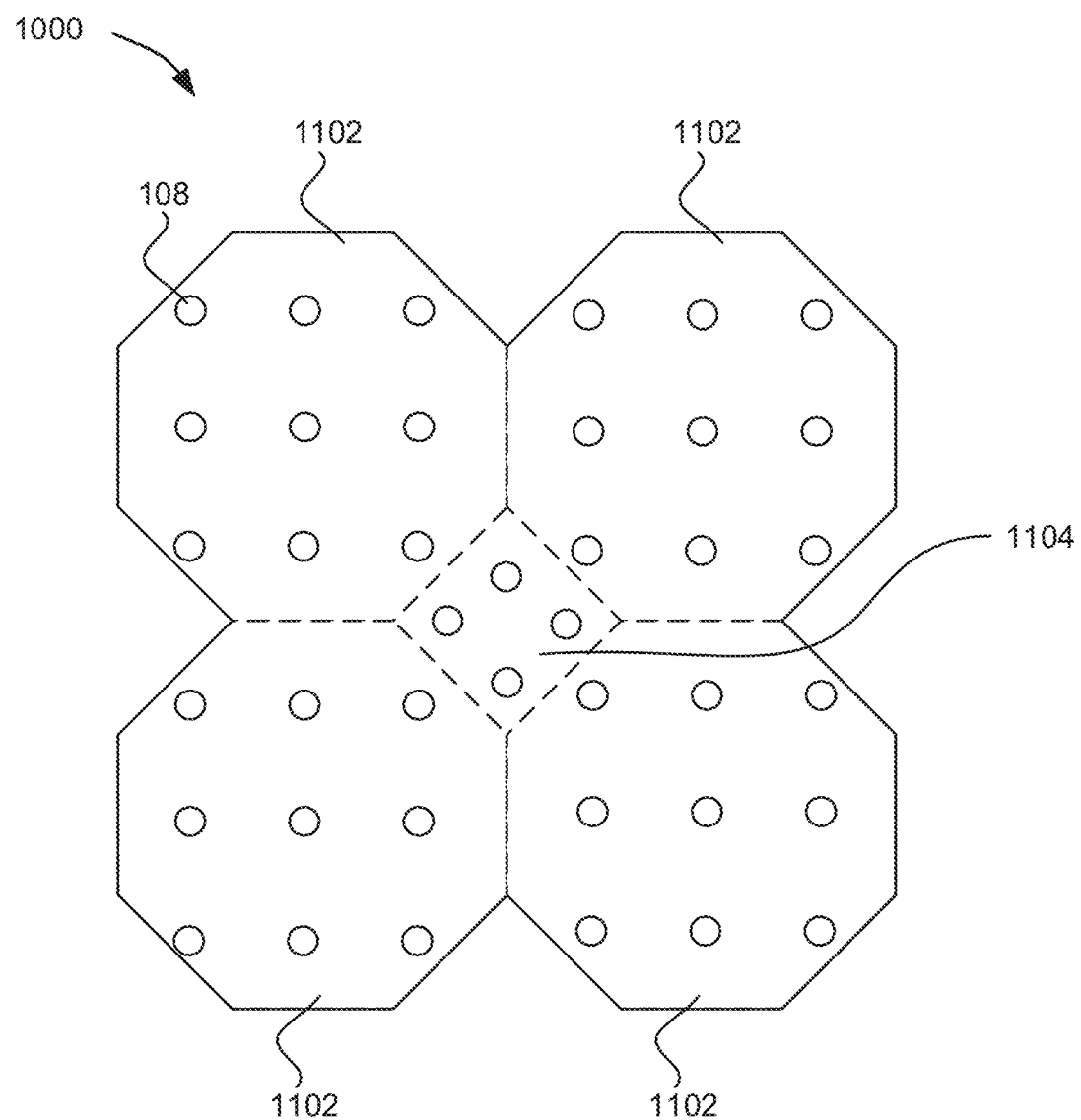
Figure 11C:
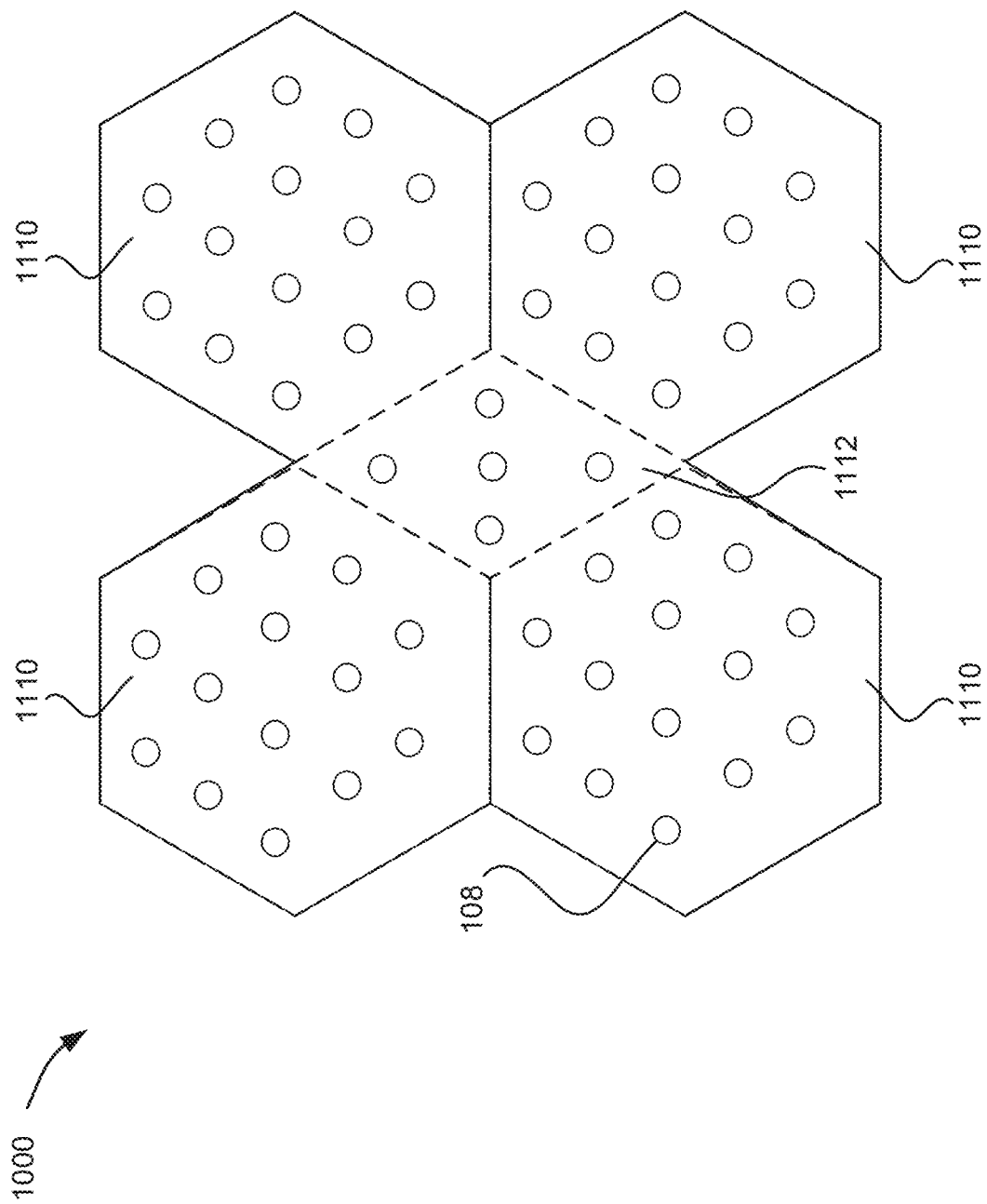
Figure 11D:
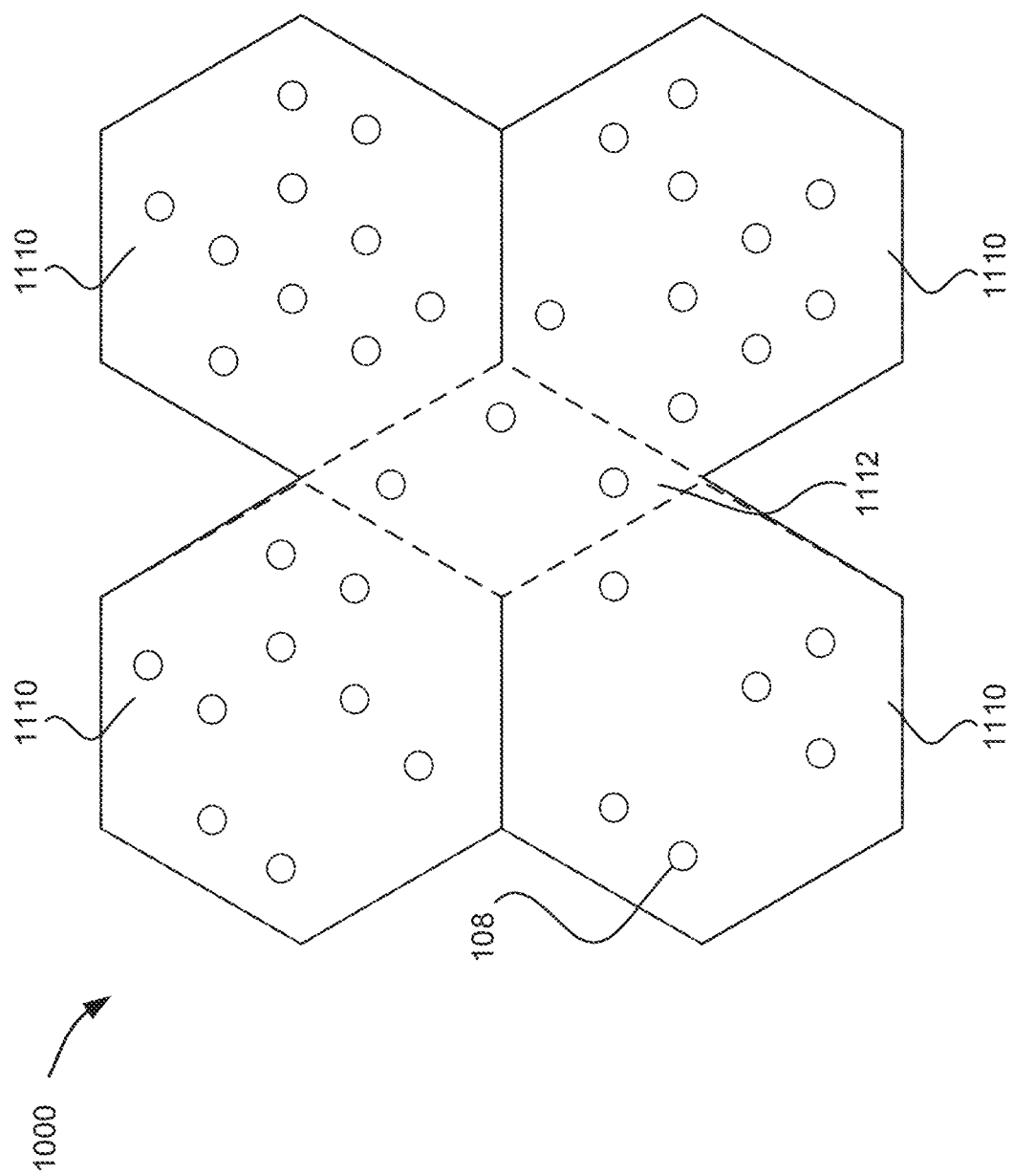

Exemplary embodiments in which the scaffold 1000 comprises different shaped sections are provided in FIGS. 11A-11D. For instance, FIG. 11A shows an embodiment in which the scaffold 1000 comprises sections 1102, 1104 having a substantially octagonal and square shape, respectively. FIG. 11B shows an embodiment in which the scaffold 1000 comprises sections 1106, 1108 having a substantially echelon and triangular shape, respectively. FIG. 11C shows an embodiment in which the scaffold 1000 comprises sections 1110, 1112 having a substantially hexagonal and parallelogram shape, respectively. FIG. 11D further shows a variation of the embodiment of FIG. 11C in which each of the sections 1110, 1112 comprises a random pattern of pores 108 therein.

In some embodiments, one or more sections of the scaffold 1000 are independent nozzle plates, as described herein. In some embodiments, each of the sections of the scaffold 1000 are independent nozzle plates, as described herein.

In embodiments where one or more sections of the scaffold 1000 are independent nozzle plates, as described herein, the nozzle plates may be coupled to the scaffold 1000 and/or adjacent nozzle plates by means of detachable fastenings (e.g., clamps, etc.) for easy exchange of the plates. In some embodiments, however, the nozzle plates may be permanently coupled (e.g., welded, glued, etc.) to the scaffold 1000 and/or adjacent nozzle plates.

3. Bi-Channel Nozzles and Nozzle Plates

New nozzles are also provided that include two channels, herein referred to as bi-channel nozzles. Such bi-channel nozzles can be used to supply two sources of fluids (e.g., polymer solution or polymer melt) for forming fibers by electrospinning. Such formed fibers accordingly include two components. In some embodiments, the two fluids are different, such as having different polymer or different hydrophilicity.

In some embodiments, one channel is enclosed by the other channel, such that one component of the fiber is enclosed by the other component. Such bi-component fibers see broad industrial applications. The inside channel is then referred to as the "core channel", and the outside channel is referred to as the "shell channel". Likewise, the inside component of the fiber is referred to as "core component" and the outside component is referred to as the "shell component; the polymer going through the core channel is referred to the "core polymer" and the polymer going through the shell channel is referred to as the "shell polymer".

Figure 12A:
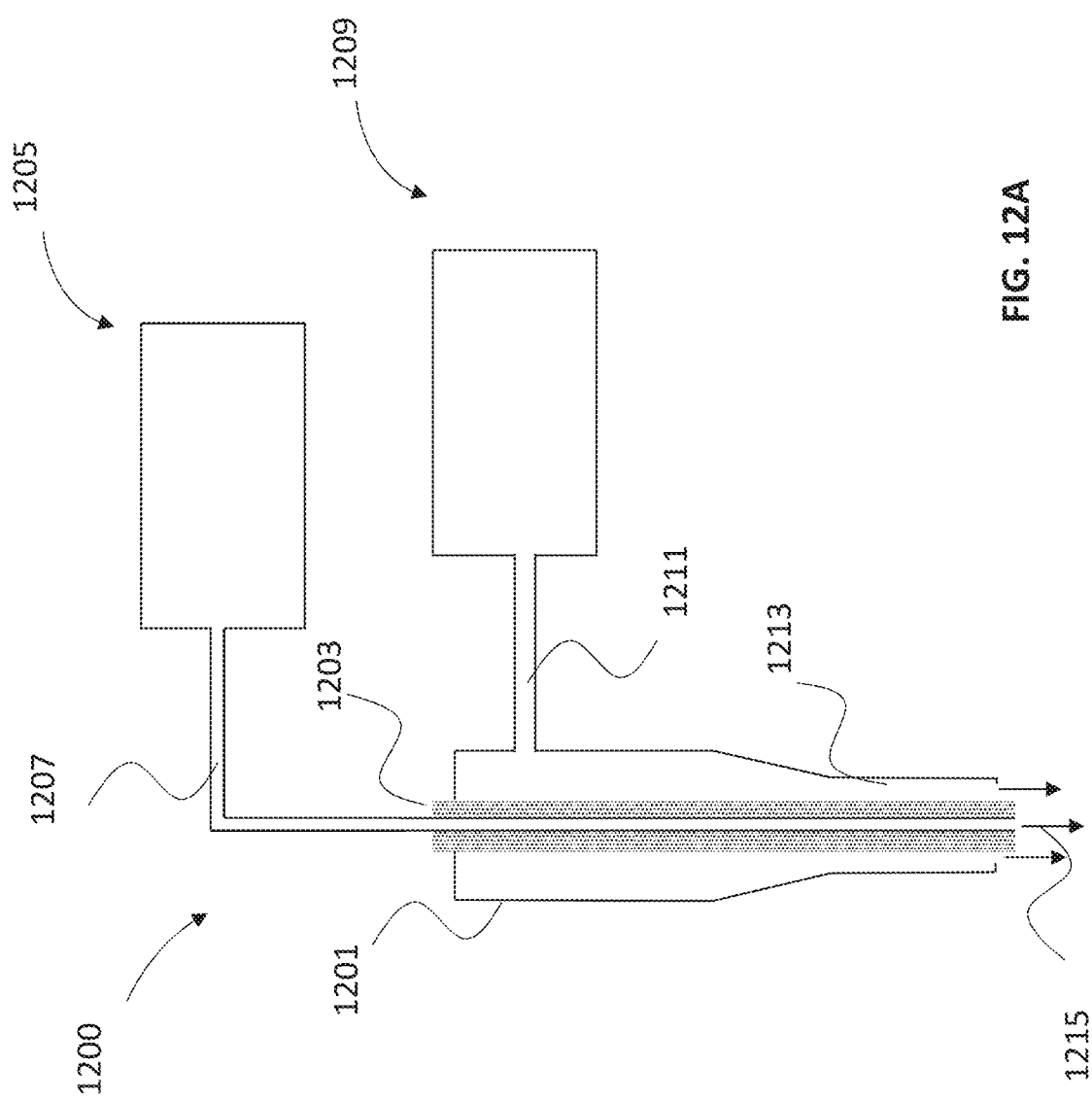

A simple bi-channel nozzle 1200 is illustrated in FIG. 12A, which includes a core channel 1215 separated by a core channel plate (cover) 1203 from a shell channel 1213, which is enclosed by a shell plate (cover) 1201. The core channel is connected, through a tube 1207, to a core polymer tank 1205 that supplies a core polymer. Likewise, the shell channel is connected, through a tube 1211, to a shell polymer tank 1209. When in use, the core polymer and the shell polymer flow out of the channels in a manner that the shell polymer surrounds the core polymer, and forming a bi-component fiber containing both.

Figure 12B:
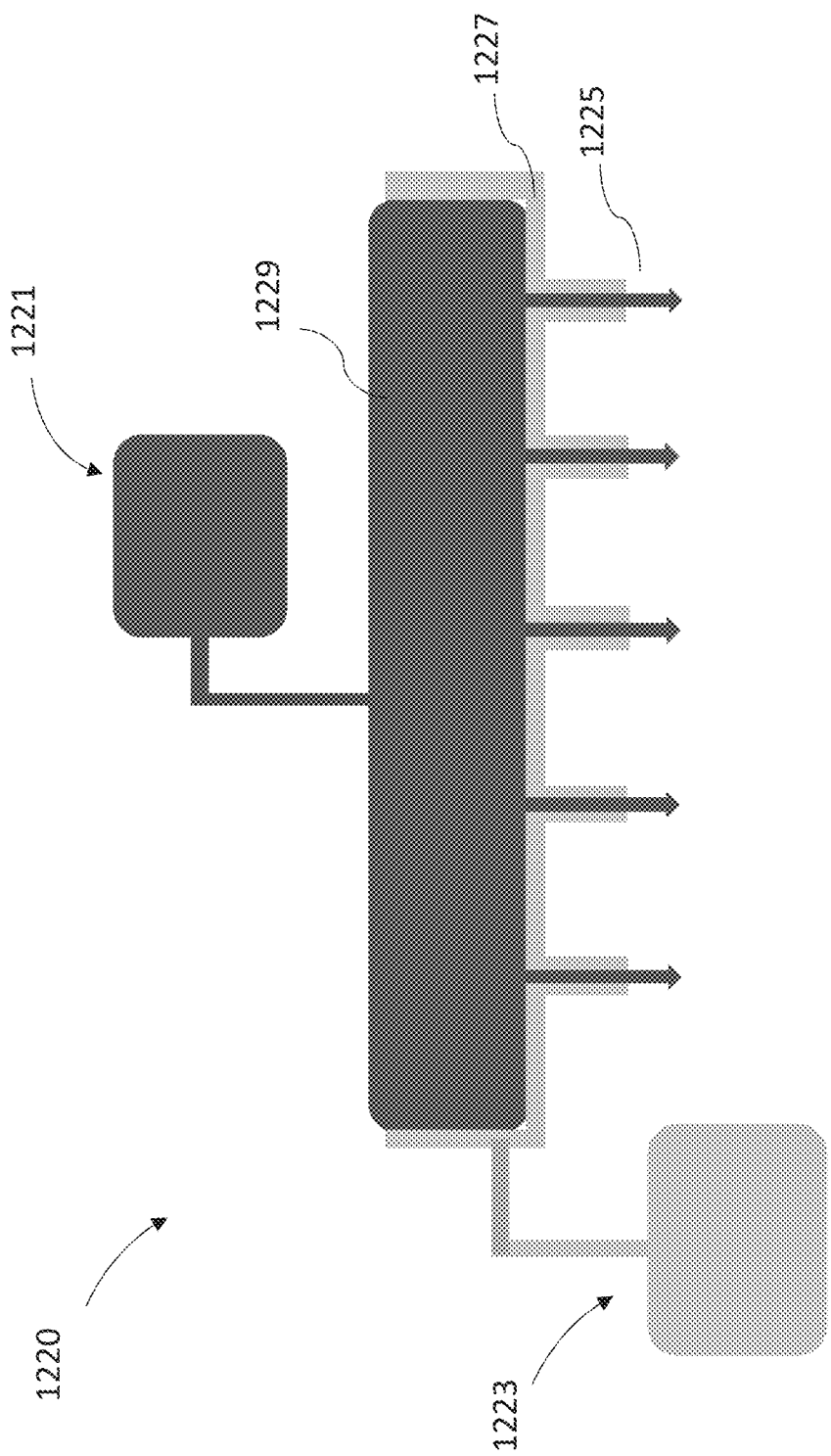

High-throughput arrangement of bi-channel nozzles can be prepared, in some embodiments, as illustrated as 1220 in FIG. 12B. A plurality of bi-channel nozzles 1225 are connected to each other through a joint shell channel cover—forming a shell plate 1227, which contains a hollow space allowing fluid communication between the shell channels of the nozzles and a shell polymer tank 1223. A core polymer reservoir 1229 is disposed above (and within as shown in FIG. 12B) the shell plate 1227, which receives the core polymer fluid from the core polymer tank 1221 and supplies it to the core channels of the nozzles 1225.

In some embodiments, the arrangement of the bi-channel nozzles can be two-dimensional, as illustrated in FIG. 12C. The system 1240 in this figure includes a shell plate 1247 on which four rows and seven columns of bi-channel nozzles are disposed. Each nozzle has a core channel 1251 and a shell channel 1249 and has fluid communication with the shell polymer tank 1245 (through the shell plate 1247) and the core polymer tank 1241 (through the core polymer reservoir 1243).

Figure 12D:
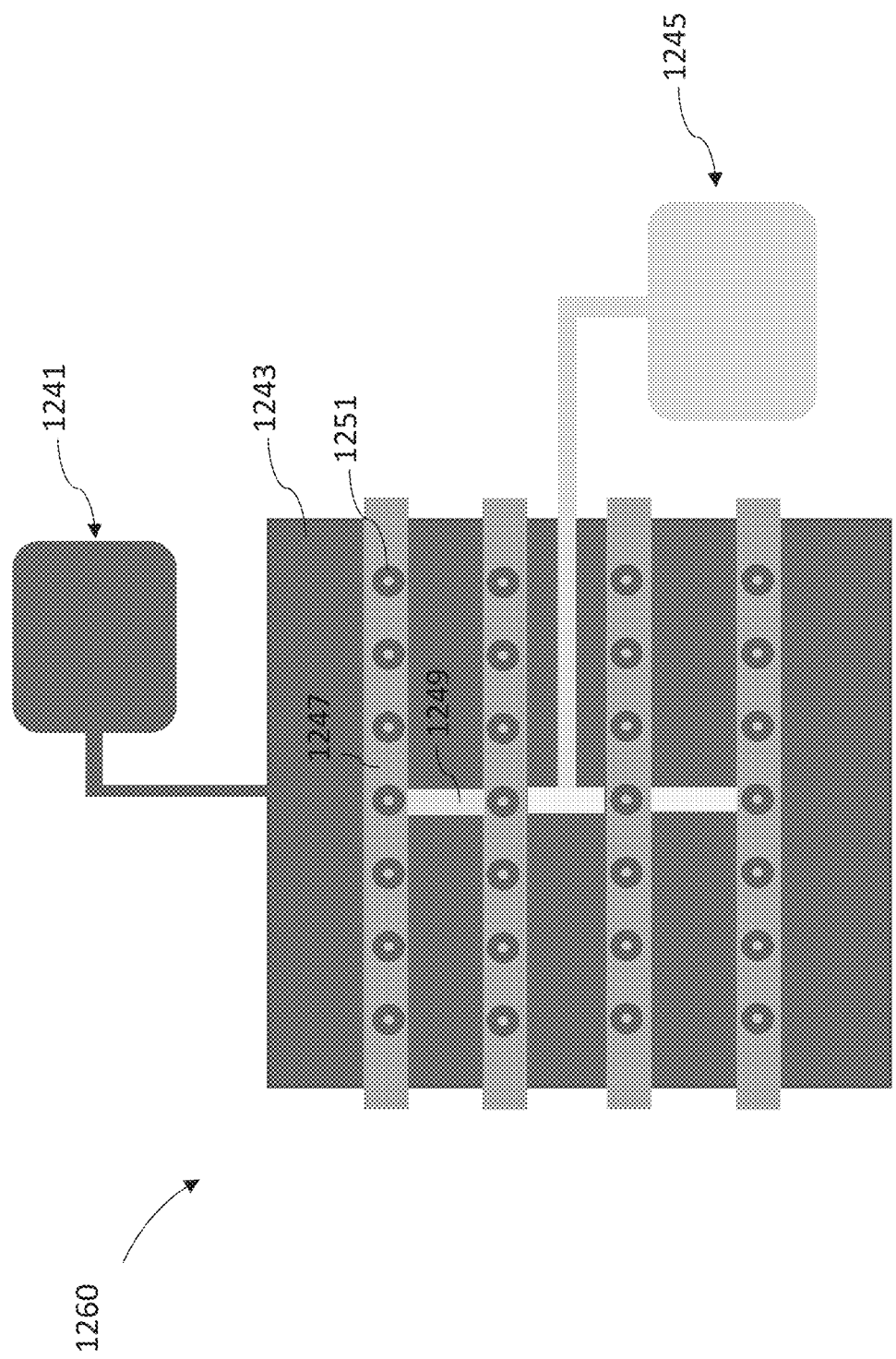

An improved version of the two-dimensional system 1260 is illustrated in FIG. 12D. Like in 1240, this system includes a shell polymer tank 1245, a core polymer tank 1241, a core polymer reservoir 1243, and a plurality of bi-channel nozzles 1251. Different from 1240, however, the system 1260 includes a plurality of parallel tubes 1247 that are connected by a tube 1249 which then connects to the shell polymer tank 1245. These tubes are arranged to effect fluid communication between the shell polymer tank 1245 and the shell channel of each of the nozzles.

Referring back to FIG. 12A, the bi-channel nozzle 1200 can be one piece or two pieces. A two-piece design has its advantages over the one-piece design as a two-piece nozzle allows replacement of each piece and cleaning thereof as well. For the two-piece design, however, inserting the "core" piece into the "shell" can be challenging as both can be fairly thin. This challenge is even greater when both pieces are affixed to plates as illustrated in FIG. 12C, at least because any mis-alignment within one unit can blocks assembly of the system. In this respect, the design in FIG. 12D is superior to that in FIG. 12C, at least because the separation of each strip (1247) enables them to be individually adjusted to allow better alignment.

Figure 13:
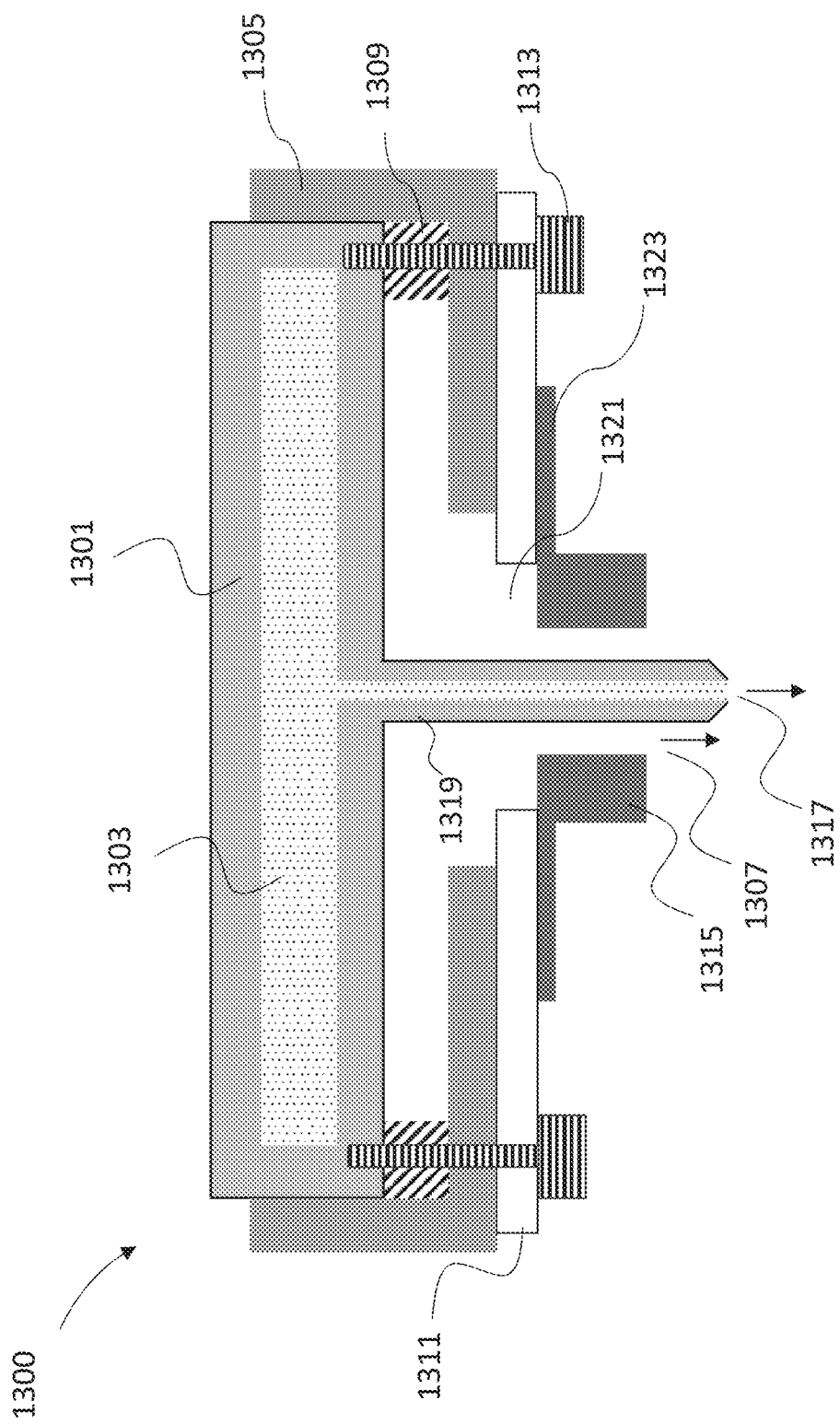
FIG. 13 shows an example bi-channel nozzle.

Another example bi-channel nozzle is illustrated in FIG. 13. The nozzle 1300 includes a core unit and a shell unit. The core unit includes a core channel 1317 connected with a core polymer reservoir 1303, formed by a core channel cover 1319 and a core polymer reservoir cover 1301, respectively. The core unit further includes a shell polymer cover 1305 which, together with the core channel cover 1319 and the core polymer reservoir cover 1301, form a shell polymer reservoir 1321. The core polymer reservoir cover 1301 can be connected to the shell polymer cover 1305 with one or more screws 1313 and associated gaskets 1309. Also part of the core unit is one or more magnetic plates 1311 disposed below the shell polymer cover 1305. These magnetic plates can be attached to the core unit by magnetic forces or screws (as shown in the figure).

The shell unit has an inner space that allows passing of the core channel cover 1319 and forms a shell channel 1307 between the shell cover 1315. The top portion 1323 of the shell cover 1315 can include a material that is able to attach the shell unit to the magnetic plates 1311 of the core unit. Such an attachment mechanism, which at the same time seals the shell channel, allows each shell unit (without directly being connected to a shell polymer tank) to be individually aligned and assembled to the core unit. Therefore, in a high-throughput system like in FIG. 12C and FIG. 12D, each shell unit can be individually assembled to system, without misalignment problems.

Figure 14A:
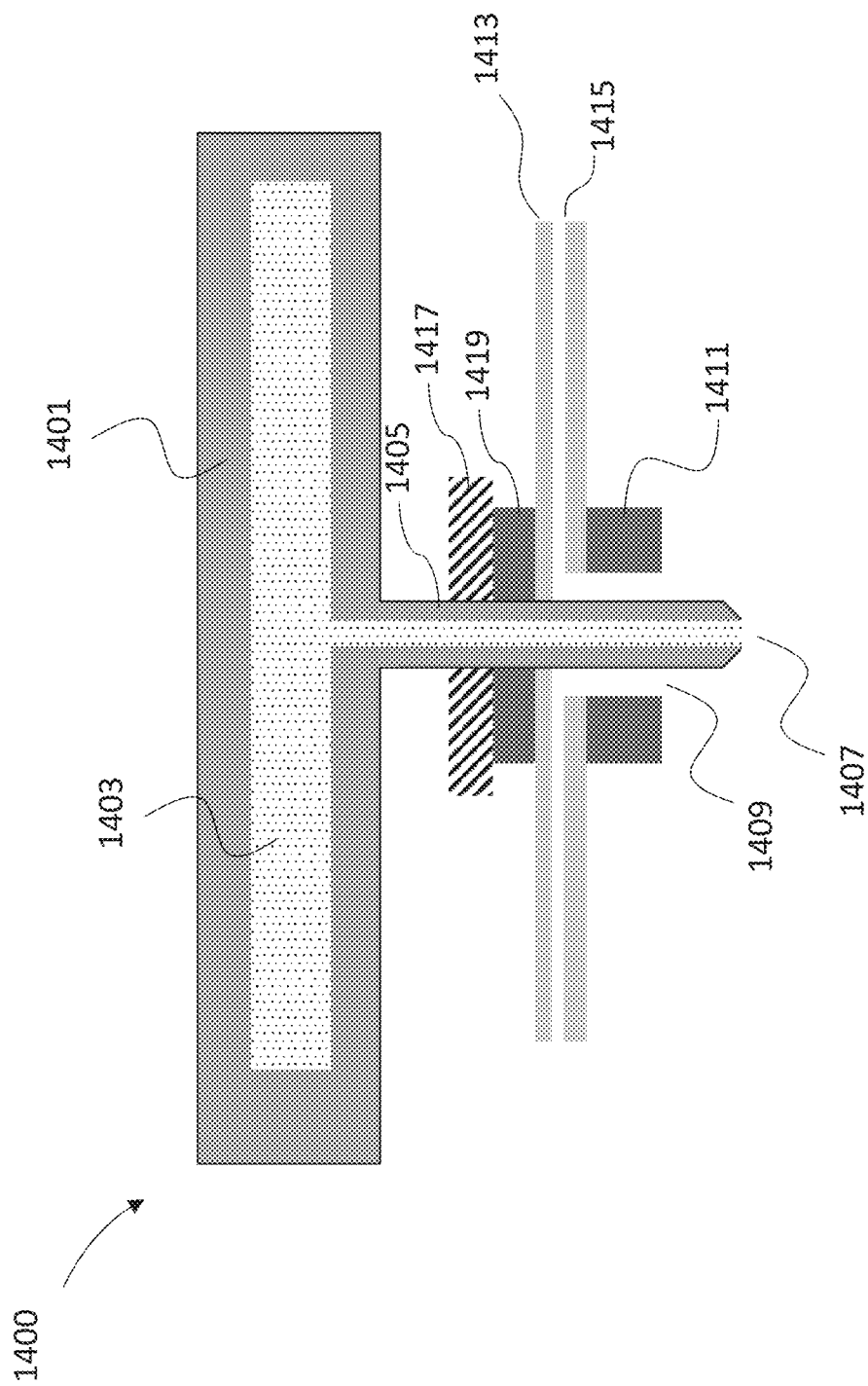
FIG. 14A shows another example bi-channel nozzle and FIG. 14B shows how multiple such bi-channel nozzles can be connected.

Yet another example bi-channel nozzle 1400 is illustrated in FIG. 14A, which also includes a core unit and a shell unit. The core portion includes a core channel 1407 connected to a core polymer reservoir 1403, surrounded by a core channel cover 1405 and a core polymer reservoir cover 1401. The shell unit includes a shell channel cover 1411 having a top portion 1419 which can slideably accommodate the core channel cover 1405 to go through. A shell channel 1409 is then formed between the shell channel cover 1411 and the core channel cover 1405. On top of the top portion 1419 of the shell channel cover, an attachment plate 1417 can be included, which is made of a flexible material. Non-limiting examples of flexible materials include Styrofoam™ closed-cell extruded polystyrene foam (XPS), rubbers (natural or synthetic), and cork. The attachment plate 1417, which is attached to 1419, can help secure the shell unit to the core unit.

Figure 14B:
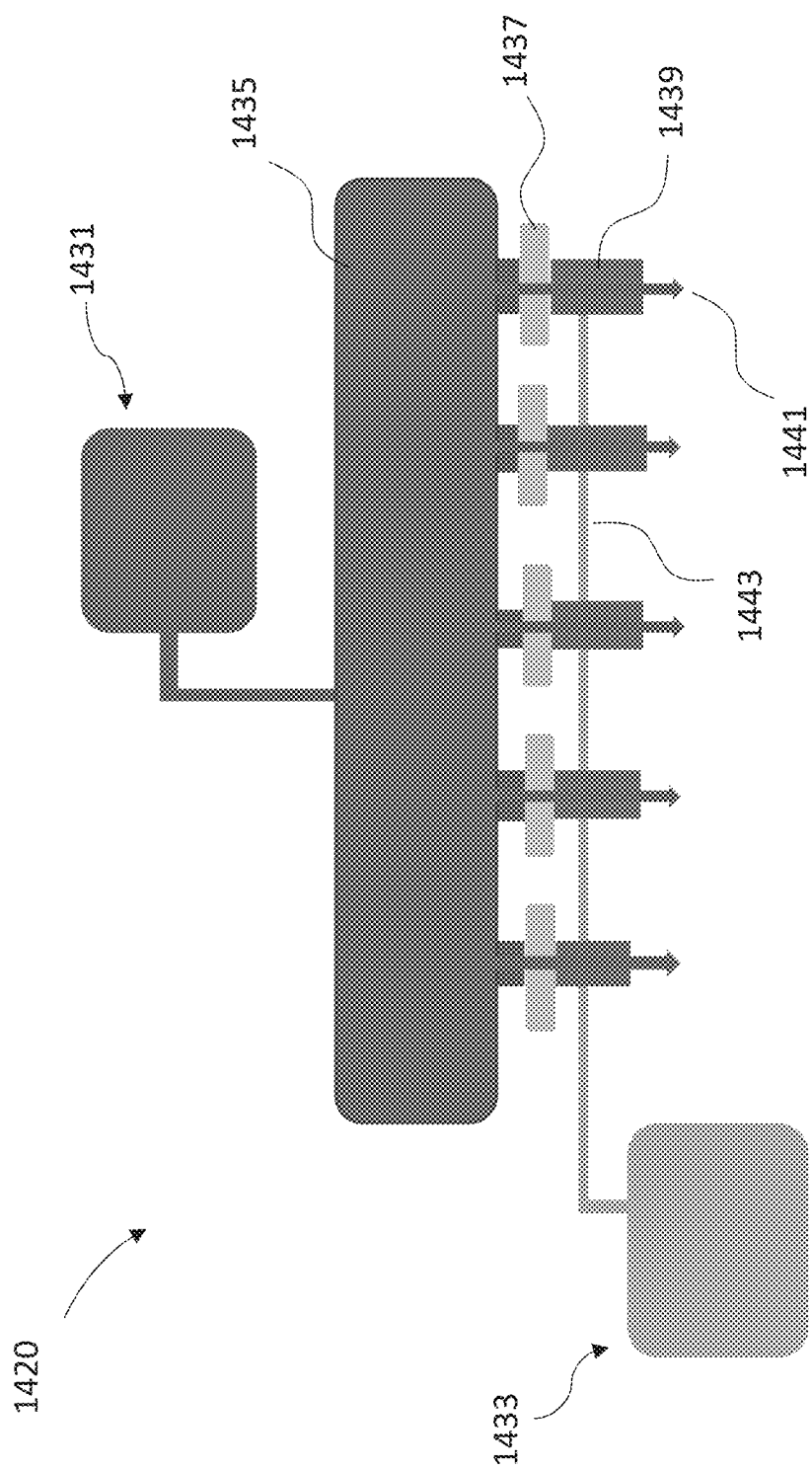

Also included in the shell unit is a tube 1413, having a channel 1415, that can connect to the shell channel 1409 to a shell polymer tank. Such a design also allows each shell unit to be individually assembled to a high-throughput system, as illustrated in FIG. 14B. The high-throughput system 1420 includes a core polymer tank 1431, a shell polymer tank 1433, a core polymer reservoir 1435, multiple core units 1441, multiple shell units 1439, and a tube 1443 connecting all shell units. Each shell unit 1439 is securely attached to a corresponding core unit 1441 by a flexible attachment plate 1437. Apparently, even though the shell units are connected together by the tube 1443, which is preferably flexible, the connecting tube brings about sufficient flexibility to allow room for each shell unit to be adjusted, as needed, to fit onto the core units.

Figure 15:
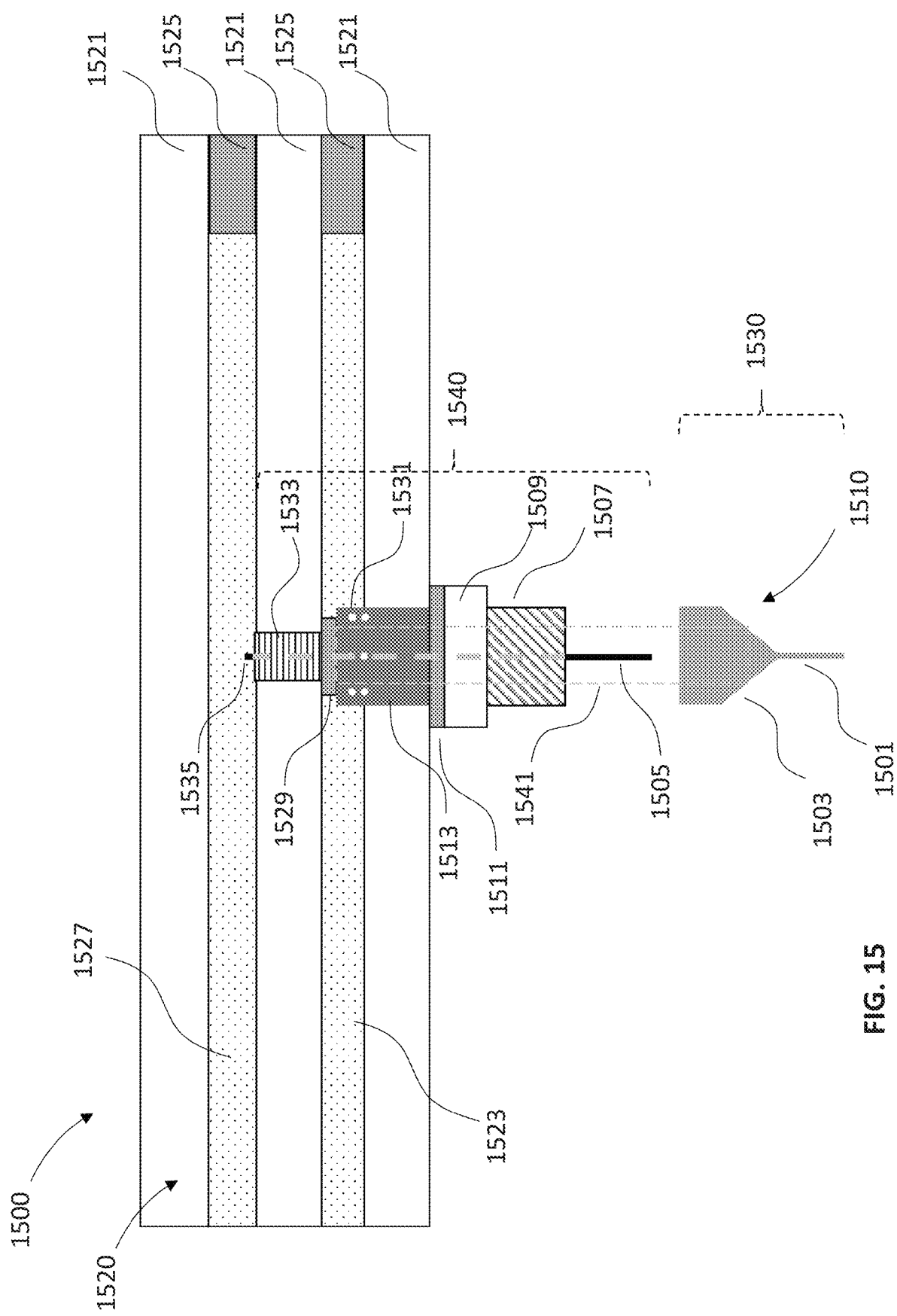
FIG. 15 shows a bi-channel nozzle and a nozzle plate to which the nozzle can be connected.

FIG. 15 also illustrates a nozzle assembly that solves the mis-alignment problem in high-throughput systems. The nozzle assembly 1500 includes one or more nozzles 1510 disposed on a nozzle plate (scaffold) 1520. The nozzle 1510 is comprised of two pieces, a shell unit 1530 and a core unit 1540. The shell unit 1530 includes a shell channel cover 1501 (in the shape of a needle) disposed on the lower end of a shell base 1503.

The core unit 1540 includes a core channel at least partially formed by the core channel cover 1505, which optionally extends to the opposite end (shown with tip 1535) of the core unit. From the bottom to the top surrounding the core channel are a top connector 1507, a fasten screw 1509, a first gasket 1511, a shell channel cover 1513, a second gasket 1529, and a spacer 1533. A shell channel 1541 (illustrated with dotted lines) is formed between the core channel cover 1505 and the shell channel cover 1513. Likewise, the shell channel 1541 forms in the shell unit 1530 when the shell unit is assembled to the core unit, between the core channel cover 1505 and the shell channel cover 1501 and 1503.

The top connector 1507 is configured to be securely connected to the shell base 1503. For instance, the external surface of the top connector 1507 can have grooves that match grooves on the internal surface of the shell base 1503, so that the shell base can be screwed on the top connector. Alternatively, the internal surface of the top connector 1507 can have grooves that match grooves on the external surface of the shell base 1503, so that the shell base can be screwed inside the top connector. Yet in another non-limiting example, the top connector 1507 and the shell base 1503 can be attached to each other by magnetic force, or with additional locking mechanisms. The shell channel cover 1513 can likewise have grooves on the external surface allowing it to be securely inserted/screwed into the nozzle plate 1520. The fasten screw 1509 and first gasket 1511, on the other hand, enable a person to hold the core unit and securely insert it into the nozzle plate. Alternatively, secure insertion of the core unit into the nozzle plate 1520 can be achieved by screw grooves on the external surface of the spacer 1533 which is in fluid communication with a core polymer reservoir 1527.

The nozzle plate 1520 includes a core polymer reservoir 1527 and a shell polymer reservoir 1523 which is configured to receive core polymer and shell polymer from respective tanks (not shown). Three solid plates 1521 and two gaskets 1525 are shown in the figure to insulate the two reservoirs. These solid plates are further configured to allow either or both of shell channel cover 1513 and spacer 1533 to be securely attached to the nozzle plate (such as by screwing). Once secured, the core channel inside the spacer 1533 is in fluid connection with the core polymer reservoir while the spacer seals the opening on the core polymer reservoir to prevent leaking. In this context, the spacer 1533 can be seen as a means to block fluid communication between the core polymer reservoir 1527 and the shell channel 1541 while allowing fluid communication between the core polymer reservoir 1527 and the core channel inside core channel cover 1505.

It can therefore be readily understood that the configuration of the spacer 1533, the core channel opening 1535 and the core polymer reservoir 1527 can be adjusted as needed. In one embodiment, neither the spacer 1533 nor the core channel opening 1535 extends into the core polymer reservoir 1527, and the core polymer enters into the core channel opening 1535 through a hollow space within the spacer 1533. In another embodiment, the spacer 1533 but not the core channel opening 1535 extends into the core polymer reservoir 1527, and the core polymer enters into the core channel opening 1535 through a hollow space within the spacer 1533. In another embodiment, the core channel opening 1535 extends beyond the spacer 1533 and into the core polymer reservoir 1527; hence the core polymer enters into the core channel opening 1535 directly.

When secured, the shell channel cover 1513 has an external area that is exposed to the shell polymer in the shell polymer reservoir 1523. One or more openings (e.g., perforations 1531) on the shell channel cover 1513 can allow the shell polymer from the shell polymer reservoir 1523 to enter the shell channel (illustrated with dotted line 1541) inside the shell channel cover 1513 (outside the core channel cover).

As such, when the shell unit 1530 is secured to the core unit 1540 which is in turn secured to the nozzle plate 1520, the core polymer in the core polymer reservoir 1527 can flow, through the internal space of the spacer 1535 and/or the core channel opening 1535, into the core channel and be ejected at the top end of the core channel cover 1505, which is now inside the shell channel cover 1501. At the same time, the shell polymer can flow, through the perforations 1531, into the shell channel and ejected from the top of the shell channel cover 1501, surrounding the core polymer ejected from inside the core channel cover 1505, forming a bi-component polymer thread.

The nozzle plate can include multiple slots to receive insertion of bi-channel nozzles as shown in FIG. 15. Since each bi-channel nozzle is individually assembled (connecting the shell unit and the core unit) and installed (connecting the core unit to the nozzle plate), misalignment due to multiple alignments can be prevented.

4. Kits

Provided herein, in some embodiments, are kits comprising any of the components described herein. For instance, provided herein is a kit of parts comprising a scaffold comprising first and second opposite surfaces and one or more pores extending through the first and second surfaces, wherein each pore comprises a first channel and a first conjunction interface. The kit of parts additionally comprises a plurality of nozzles, wherein each nozzle comprises a second channel and a second conjunction interface, and wherein the second interface can be removably and stably coupled to the first conjunction interface of each pore, while allowing a fluid through the first channel and the second channel. The kit further comprises a plurality of closure structures, wherein each closure structure comprises a third conjunction interface, and wherein the third interface can be removably and stably coupled to the first conjunction interface of each pore and thereby sealing the pore. In some embodiments, at least the second channel of each nozzle has an internal diameter configured to allow formation of a fiber.

5. Systems/Devices

Also provided herein, in some embodiments, are systems, devices, apparatuses, etc. comprising any of the components described herein.

In some embodiments, provided herein, is a system comprising a scaffold, as described herein, comprising first and second opposite surfaces and a plurality of pores extending through the first and second surfaces, wherein each pore comprises a first channel and a first conjunction interface. The system additionally comprises a plurality of nozzles, as described herein, wherein each nozzle comprises a second channel and a second conjunction interface, and wherein the second interfaces are removably and stably coupled to the first conjunction interfaces of a portion of the pores, while allowing a fluid through the first channel and the second channel. The system further comprises a plurality of closure structures, as described herein, wherein each closure structure comprises a third conjunction interface, and wherein the third interfaces are removably and stably coupled to the first conjunction interface of the remaining pores and thereby sealing the remaining pores. In some embodiments, at least the second channel of each nozzle has an internal diameter configured to allow formation of a fiber.

Additionally provided herein, in some embodiments, is an apparatus comprising a scaffold, as described herein, comprising first and second opposite surfaces, wherein the first surface is in fluidic communication with at least one source of a fluid (e.g., a polymer material). The apparatus also comprises a plurality of pores, as described herein, extending through the scaffold from the first surface to the second surface and configured to transport the fluid, wherein each pore comprises a conjunction system individually/independently configured to permit or prevent extrusion of the polymer material therefrom, as described herein.

6. Methods of Use/Applications

The present disclosure provides unique, customizable devices (e.g., nozzle plates, scaffolds, etc.) configured for fiber formation. In some embodiments, the fiber forming/spinning devices described herein may be configured to form micron or nanometer diameter fibers. In some embodiments, the nozzle plates, scaffolds, etc. described herein may be configured to form fibers having diameters in a range including and between any two of the following: about 1 nm, about 5 nm, about 10 nm, about 15 nm, about 20 nm, about 30 nm, about 40 nm, about 50 nm, about 60 nm, about 70 nm, about 80 nm, about 90 nm, about 100 nm, about 120 nm, about 130 nm, about 140 nm, about 150 nm, about 160 nm, about 170 nm, about 180 nm, about 190 nm, about 200 nm, about 320 nm, about 330 nm, about 340 nm, about 350 nm, about 360 nm, about 370 nm, about 380 nm, about 390 nm, about 400 nm, about 420 nm, about 430 nm, about 440 nm, about 450 nm, about 460 nm, about 470 nm, about 480 nm, about 490 nm, about 500 nm, about 520 nm, about 530 nm, about 540 nm, about 550 nm, about 560 nm, about 570 nm, about 580 nm, about 590 nm, about 600 nm, about 620 nm, about 630 nm, about 640 nm, about 650 nm, about 660 nm, about 670 nm, about 680 nm, about 690 nm, about 700 nm, about 820 nm, about 830 nm, about 840 nm, about 850 nm, about 860 nm, about 870 nm, about 880 nm, about 890 nm, about 900 nm, about 920 nm, about 930 nm, about 940 nm, about 950 nm, about 960 nm, about 970 nm, about 980 nm, about 990 nm, about 1 µm, about 5 µm, about 10 µm, about 15, µm, about 20 µm, about 30 µm, about 40 µm, about 50 µm, about 60 µm, about 70 µm, about 80 µm, about 90 µm, about 100 µm, about 110 µm, about 120 µm, about 130 µm, about 140 µm, about 150 µm, about 160 µm, about 170 µm, about 180 µm, about 190 µm, about 200 µm, about 210 µm, about 220 µm, about 230 µm, about 240 µm, about 250 µm, about 260 µm, about 270 µm, about 280 µm, about 290 µm, about 300 µm, about 310 µm, about 320 µm, about 330 µm, about 340 µm, about 350 µm, about 360 µm, about 370 µm, about 380 µm, about 390 µm, about 400 µm, about 4110 µm, about 420 µm, about 430 µm, about 440 µm, about 450 µm, about 460 µm, about 470 µm, about 480 µm, about 490 µm, and about 500 µm.

Exemplary polymer materials for use in the fiber forming/spinning devices and methods described herein may include, but are not limited to, polypropylene, polyethylene, poly(ethylene oxide), polyethylene terephthalate, nylon, polyvinyl alcohol, polyvinylpyrrolidone, polyvinylidene fluoride, polystyrene, polypropylene, polyethylene, poly(ethylene oxide), polyethylene terephthalate, polyacrylonitrile, polyimide, polyvinyl chloride, polycarbonate, polyurethane, polysulfone, polyactic acid, polytetrafluoroethylene, polybenzoxazoles, polyaramid, poly(phenylene sulfide), polyphenylene terephthalamide, polytetrafluoroethylene, and combinations thereof.

Figure 16:
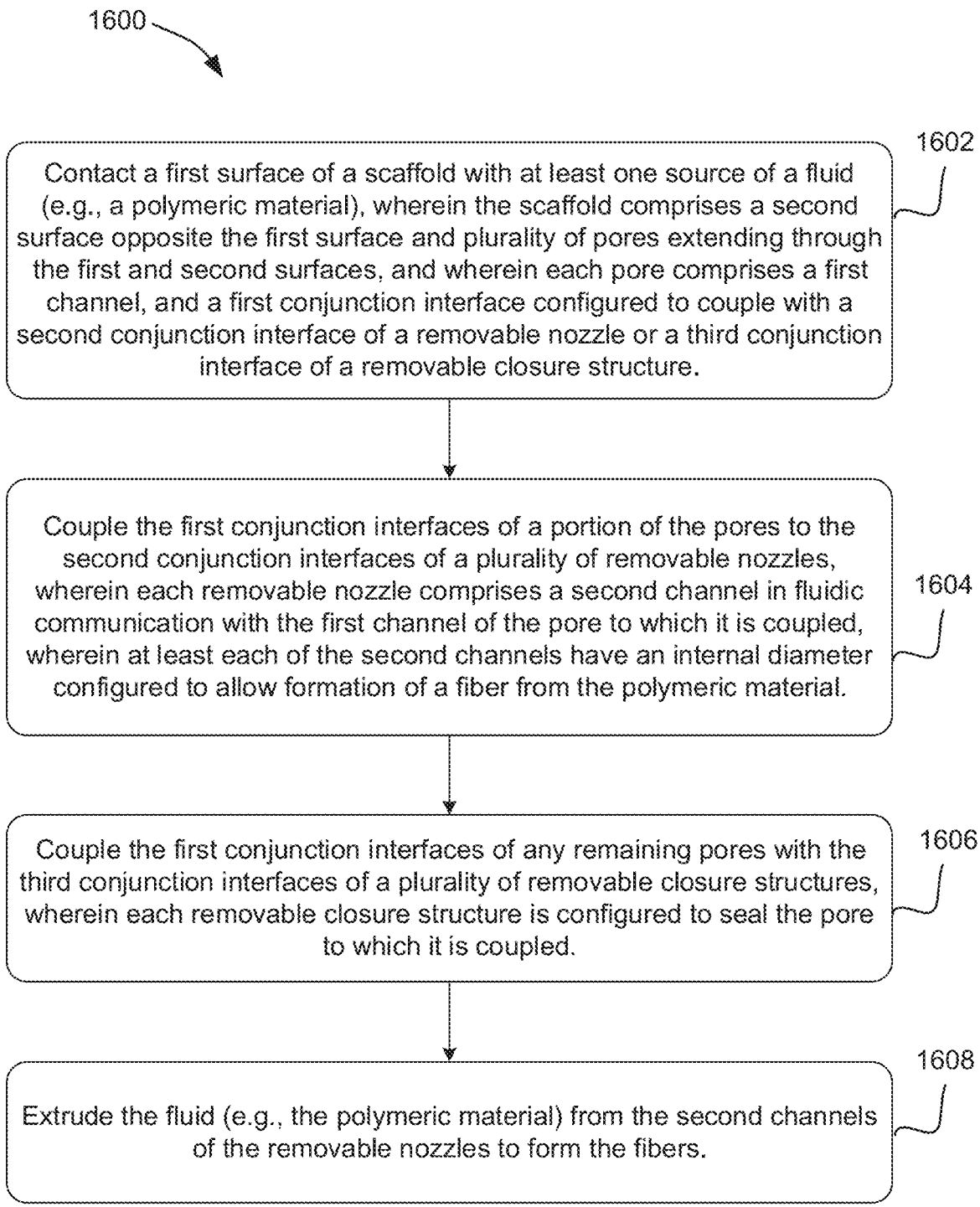
FIG. 16 shows a flowchart of a method for using a fiber forming device as described herein, according to one embodiment.

Referring now to FIG. 16, a flowchart of an exemplary method 1600 for forming a fiber is shown according to one embodiment. The method 1600 may be implemented in conjunction with any of the features/components described herein, such as those described with reference to other embodiments and FIGS. The method 1600 may also be used for various applications and/or according to various permutations, which may or may not be noted in the illustrative embodiments/aspects described herein. For instance, the method 1600 may include more or less operations/steps than those shown in FIG. 16, in some embodiments. Moreover, the method 100 is not limited by the order of operations/steps shown therein.

As shown in FIG. 16, the method 1600 comprises contacting a first surface of a scaffold, as described herein, with at least one source of a fluid (e.g., a polymeric material), wherein the scaffold comprises a second surface opposite the first surface and plurality of pores extending through the first and second surfaces, and wherein each pore comprises a first channel, and a first conjunction interface configured to couple with a second conjunction interface of a removable nozzle or a third conjunction interface of a removable closure structure. See Step 1602. The method 1600 additionally comprises coupling the first conjunction interfaces of a portion of the pores to the second conjunction interfaces of a plurality of removable nozzles, wherein each removable nozzle comprises a second channel in fluidic communication with the first channel of the pore to which it is coupled, and wherein at least the second channels of the nozzles have an internal diameter configured to allow formation of a fiber from the polymeric material. See Step 1604. The method 1600 also comprises coupling the first conjunction interfaces of any remaining pores with the third conjunction interfaces of a plurality of removable closure structures, wherein each removable closure structure is configured to seal the pore to which it is coupled; and extruding the polymeric material from the second channels of the removable nozzles to form the fibers. See Steps 1606 and 1608.

It is note that the method 1600 may also be implemented with respect to a single nozzle plate, as described herein, for the formation of polymeric fibers, in some embodiments.

Unless otherwise defined, all technical and scientific terms used herein have the same meaning as commonly understood by one of ordinary skill in the art to which this invention belongs.

Throughout the present specification and claims, unless the context requires otherwise, the word "comprise" and variations thereof (e.g., "comprises" and "comprising") are to be construed in an open, inclusive sense, that is as "including, but not limited to." Additionally, the singular forms "a," "an" and "the" include plural referents unless the context clearly dictates otherwise.

Recitation of numeric ranges of values throughout the specification is intended to serve as a shorthand notation of referring individually to each separate value falling within the range inclusive of the values defining the range, and each separate value is incorporated in the specification as it were individually recited herein.

Reference to "about" a value or parameter herein includes (and describes) embodiments that are directed to that value or parameter per se. In some embodiments, the term "about" includes the indicated amount ±10%.

Reference throughout this specification to "one embodiment" or "an embodiment" means that a particular feature, structure or characteristic described in connection with the embodiment is included in at least one embodiment of the present invention. Thus, the appearances of the phrases "in one embodiment" or "in an embodiment" in various places throughout this specification are not necessarily all referring to the same embodiment, but may be in some instances. Furthermore, the particular features, structures, or characteristics may be combined in any suitable manner in one or more embodiments.

In addition, where features or aspects of the invention are described in terms of Markush groups, those skilled in the art will recognize that the invention is also thereby described in terms of any individual member or subgroup of members of the Markush group.

All publications, patent applications, patents, and other references mentioned herein are expressly incorporated by reference in their entirety, to the same extent as if each were incorporated by reference individually. In case of conflict, the present specification, including definitions, will control.

The invention described and claimed herein is not to be limited in scope by the specific embodiments disclosed herein, as these embodiments are intended as illustrations of several aspects of the invention. Indeed, various modifications of the invention in addition to those shown and described herein will become apparent to those skilled in the art from the foregoing description. Such modifications include the substitution of known equivalents for any aspect of the invention in order to achieve the same result in substantially the same way. Such modifications are also intended to fall within the scope of the appended claims.

What is claimed is:

1. A system comprising:
 a scaffold comprising first and second opposite surfaces and pores extending through the first and second surfaces, wherein each of the pores comprises a first channel and a first conjunction interface;
 a plurality of nozzles, wherein each of the nozzles comprises a second channel and a second conjunction interface, wherein the second conjunction interfaces are removably and stably coupled, respectively, to the first conjunction interfaces of first pores of the pores, while allowing a fluid through the first channel and the second channel; and
 a plurality of closure structures, wherein each of the closure structures comprises a third conjunction interface, wherein the third conjunction interfaces are removably and stably coupled, respectively, to the first conjunction interface of remaining pores of the pores other than the first pores, thereby sealing the remaining pores;
 wherein at least the second channel has an internal diameter configured to allow formation of a fiber, and wherein each of the pores comprises a removable connector comprising the first conjunction interface.

2. The system of claim 1, wherein the scaffold comprises one or more sections, and each of the one of more sections comprises at least one of the pores.

3. The system of claim 2, wherein each of the one of more sections independently has a shape selected from a rectangle, a triangle, a parallelogram, an echelon, a hexagon, an octagon, or an irregular shape.

4. The system of claim 1, wherein the first conjunction interface comprises a male or a female threaded fitting, a Luer Taper fitting, a ground joint, a male or female national pipe thread (NPT) fitting, or a male or female push-in connector, and each of the second conjunction interfaces and the third conjunction interfaces comprises a corresponding female or male threaded fitting, a Luer Taper fitting, a ground joint, a female or male NPT fitting, or a female or male push-in connector.

5. The system of claim 4, wherein an average distance between adjacent pores is at least 100 micrometers.

6. The system of claim 4, wherein at least one of the first channel and the second channel has an internal diameter less than 3 centimeters.

7. A method, comprising:
contacting a first surface of a scaffold with at least one source of a polymeric material, the scaffold comprising a second surface opposite the first surface and plurality of pores extending through the first and second surfaces, wherein each of the pores comprises (i) a first channel, and (ii) a first conjunction interface configured to couple with a second conjunction interface of a removable nozzle or a third conjunction interface of a removable closure structure wherein each of the pores comprises a removable connector comprising the first conjunction interface;
coupling the first conjunction interfaces of a portion of the pores to second conjunction interfaces of a plurality of removable nozzles, wherein each of the removable nozzles comprises a second channel in fluidic communication with the first channel of the pore to which it is coupled, wherein at least each of the second channels has an internal diameter configured to allow formation of a fiber from the polymeric material;
coupling the first conjunction interfaces of remaining pores of the pores other than the portion of the pores with third conjunction interfaces of a plurality of removable closure structures, wherein each of the removable closure structures is configured to seal the pore to which it is coupled; and
extruding the polymeric material from the second channels of the removable nozzles to form the fibers.

8. The method of claim 7, wherein each of the first conjunction interfaces comprises a male or female threaded fitting, a Luer Taper fitting, a ground joint, a male or female national pipe thread (NPT) fitting, or a male or female push-in connector, and each of the second conjunction interfaces and the third conjunction interfaces comprises a corresponding female or male threaded fitting, a Luer Taper fitting, a ground joint, a female or male NPT fitting, or a female or male push-in connector.

9. The method of claim 7, wherein an average distance between adjacent pores is at least 100 micrometers.

10. The system of claim 1, wherein one of the nozzles comprising a core unit and a shell unit, wherein:
the core unit comprises:
a core channel cover enclosing a core channel, wherein the core channel cover has a proximal end and a distal end;
a spacer surrounding a distal portion of the core channel cover; and
a first shell channel cover enclosing a first shell channel and surrounding a proximate portion of the core channel cover, wherein an internal surface of the first shell channel cover and an external surface of the core channel cover form a shell channel, and wherein a distal portion of the first shell channel cover comprises one or more openings connecting the first shell channel and the external space; and
the shell unit comprises a second shell channel cover comprising a proximal end and a distal portion that is configured to be removably attached to a proximal portion of the first shell channel cover while allowing the proximal end of the core channel cover to go through an internal shell channel of the shell unit.

11. The system of claim 10,
wherein the scaffold comprises a shell polymer reservoir embedded between a first plate and a second plate, and a core polymer reservoir embedded between the second plate and a third plate,
wherein the spacer is inserted into an opening in the second plate such that the distal end of the core channel is in fluid communication with the core polymer reservoir, and
wherein the first shell channel cover is partially disposed in the first plate such that the one or more openings of the first shell channel allow the first shell channel to be in fluid communication with the shell polymer reservoir.

* * * * *